United States Patent [19]
Nakabayashi

[11] Patent Number: 5,619,499
[45] Date of Patent: Apr. 8, 1997

[54] PROTOCOL PROCESSOR IN COMMUNICATION NETWORK TRANSFERRING DATA IN ASYNCHRONOUS TRANSFER MODE

[75] Inventor: Takeo Nakabayashi, Hyogo, Japan

[73] Assignee: Mitsubishi Denki Kabushiki Kaisha, Tokyo, Japan

[21] Appl. No.: 439,751

[22] Filed: May 12, 1995

[30] Foreign Application Priority Data

May 13, 1994 [JP] Japan .................................. 6-099806

[51] Int. Cl.$^6$ ................................................. H04J 3/16
[52] U.S. Cl. ............................................ 370/469; 370/395
[58] Field of Search .......................... 370/17, 58.1, 58.2, 370/60, 60.1, 79, 94.1, 94.2, 110.1

[56] References Cited

U.S. PATENT DOCUMENTS

| | | | |
|---|---|---|---|
| 5,067,123 | 11/1991 | Hyodo et al. | 370/58.1 |
| 5,280,476 | 1/1994 | Kojima et al. | 370/60.1 |
| 5,387,927 | 2/1995 | Look et al. | 370/60.1 |
| 5,414,707 | 5/1995 | Johnston et al. | 370/79 |
| 5,490,141 | 2/1996 | Lai et al. | 370/60.1 |
| 5,519,689 | 5/1996 | Kim | 370/60.1 |

OTHER PUBLICATIONS

"Schnittstellen in der Telekommunikation", Part 8: Schnittstellen in paketvermittelten Datennetzen, IN: Nachrichtentech, Elektron, Berlin 43 (1993), pp. 29 to 33.

Primary Examiner—Benedict V. Safourek
Assistant Examiner—Ricky Ngo
Attorney, Agent, or Firm—Lowe, Price, LeBlanc & Becker

[57] ABSTRACT

A plurality of ATM layer receiving blocks to which different applications are allocated are provided for a physical layer receiving part receiving data from an ATM transmission line and carrying out prescribed physical layer processing. The plurality of ATM layer receiving blocks incorporate data from the physical layer receiving allocated thereto are supplied to execute prescribed ATM block only when data utilized by the applications layer processing, for transmitting the processed data to corresponding higher layer processing functional blocks. A plurality of ATM layer transmission blocks responsible for different applications are provided in parallel with each other and coupled to a common ATM layer transmission block for data communication between a terminal and a network data transmission line. Thus implemented is a generic interface between an ATM layer and a physical layer in a terminal-to-network interface unit in a network in which data communication is carried out in an asynchronous transfer mode.

32 Claims, 28 Drawing Sheets

PROTOCOL PROCESSOR IN COMMUNICATION NETWORK TRANSFERRING DATA IN ASYNCHRONOUS TRANSFER MODE

BACKGROUND OF THE INVENTION

1. Field of the Invention

The present invention relates to a protocol process for for carrying out data communication through an ATM (asynchronous transfer mode) technique. More specifically, it relates to a protocol processor for implementing an interface between a physical layer and an ATM layer in a data communication system utilizing the ATM technique.

2. Description of the Background Art

A data communication system transmits various types of data including voice data of relatively low speeds and narrow bands, image data (still and moving image data) of high speeds and wide bands, intercomputer communication data of high speeds and high burstabilities. In particular, terminal units such as engineering work stations (EWS) recently support voice and image data processing functions in addition to a numeric data processing function. When such terminals are utilized, various data such as numeric, voice and image data are transmitted between terminals and between a host computer and terminals. For example, moving image data such as screen images may be transferred from a certain server (host) to a terminal and edited for forming new moving images (screen images). Numeric, voice and image (still and moving image) data have different transmission speeds and bands. The ATM (asynchronous transfer mode) technique is contrived to construct a communication system efficiently transmitting such various data. The ATM technique is now briefly described. In the following description, a method for carrying out data communication through the ATM technique is called an ATM mode.

FIG. 50 illustrates an exemplary structure of a data communication system employing the ATM technique. Referring to FIG. 50, the communication system includes 1a broadband ISDN (integrated service digital communication network (B-ISDN)) 900, a low-speed LAN (Local Area Network) 902 including terminals such as personal computers and work stations, a relatively high-speed LAN 904 such as Ethernet, for example, and an ATM switch 906 for serving as an exchange for data communication between these LANs 902 and 904 and the broadband ISDN 900. The LANs 902 and 904 transfer data in a synchronous communication mode in units of frames, and the transmission data are synchronously switched on transmission and receiving sides. The data are time-divisionally multiplexed to be transmitted. The broadband ISDN 900 transmits the data in the ATM mode, as described later in detail. The LAN 902 and the ATM switch 906 execute data transfer in the ATM mode through ATM interfaces 908a and 908b respectively. The LAN 902 is provided with the ATM interface 908a, since the data are not transmitted in the ATM mode in this LAN 902.

The LAN 904 is connected to the ATM switch 906 through an ATM hub/router 909 and ATM interfaces 908d and 908c. When the LAN 904 includes only one network, the ATM hub/router 909 transmits data received from the ATM switch 906 to a corresponding terminal in this network. When the LAN 904 includes a plurality of networks, on the other hand, the ATM hub/router 909 routes data in the plurality of networks, to transmit the same to the corresponding network.

The ATM switch 906 transmits data supplied through the ATM interfaces 908b, 908c and 908e through a corresponding port (interface). This ATM switch 906 forms a network-to-network node. For example, an interface (user network interface) between a terminal and a network in the broadband ISDN 900 has a structure shown in FIG. 51.

Referring to FIG. 51, a terminal 910 which is an engineering work station (EWS), for example, is connected to a protocol processor 914 through a user data transmission line 912. The protocol processor 914 is connected to an ATM data transmission line 916. This protocol processor 914 implements an interface between the ATM transmission line (ATM network) 916 and the terminal 910. The content of protocol processing which is executed by the protocol processor 914 is hierarchized as shown in FIG. 52.

Referring to FIG. 52, the ATM interface (ATM protocol) which is implemented by the protocol processor 914 shown in FIG. 51 includes a physical layer (PHY), an ATM layer, and an ATM adaptation layer (AAL). Protocols which are higher in level than the ATM adaptation layer are defined by a user in an end-to-end manner.

The physical layer (PHY) includes a physical media dependent (PMD) sublayer and a transmission convergence (TC) sublayer. The physical media dependent sublayer converts frame data transmitted from the transmission convergence sublayer into a bit train for transmitting the same onto a transmission line, and incorporates data supplied through this transmission line in units of cells for transmitting the same to the transmission convergence sublayer. In the ATM mode, data are transmitted in units of cells as described later in detail. The transmission convergence sublayer reconstructs frames from data supplied from the PMD sublayer. The respective cells include headers indicating destinations and contents thereof. The structure of the cells is described later in detail.

The ATM layer executes formation/removal of the headers and multiplexing segmentation of the cells.

The ATM adaptation layer (AAL) includes a common part (CP) sublayer. This common part sublayer implements functions common to five types of ATM adaptation layer protocols AAL1 to AAL5 which are prepared depending on services (applications). The common part sublayer includes a convergence sublayer (CS) and a segmentation/reassembly (SAR) sublayer. The convergence sublayer (CS) adds headers and trailers (described later) to user data supplied from a higher protocol to form variable-length packet data units (CPCS-PDU: common part convergence sublayer-packet data units) in transmission, and executes a reverse operation in receiving. The segmentation/reassembly (SAR) sublayer forms packet data units (SAR-PDU) each of a fixed length (48 bytes) from the packet data formed by the convergence sublayer in transmission, and executes reverse processing in receiving.

The ATM layer adds headers to fixed-length data supplied from the ATM adaptation layer in transmission to form ATM cells each of a fixed length (53 bytes), and transmits the same to the transmission convergence sublayer. In receiving, on the other hand, the ATM later carries out a reverse operation, to extract ATM cells from transmission frames supplied from the transmission convergence sublayer in accordance with header information.

FIG. 53 illustrates an exemplary structure of a header region. Referring to FIG. 53, data of a channel #n are cellularized and transmitted onto a transmission line. Data of other channels #A and #B are also converted to cells and transmitted onto the transmission line. The data of the channel #n is divided into cells, which comprise information fields called payloads, including data transmitted to terminals.

The header region includes various control data, as hereafter described in order.

(a) Path and Channel Identifying Data:

A path is a set of a plurality of channels between specific terminals. All cells related to a specific call between the terminals are identified in relation to numbers of the path and channels. A virtual path identifier VPI identifies this path. A virtual channel identifier VCI identifies a specific channel in this path.

(b) Flow Control Data:

In a communication system transmitting data in the ATM mode, an image terminal such as a television camera generating a large quantity of data (cells) is connected. When transmission data are concentrated by such image terminal communication, traffic density of cells is extremely increased in the network. In this case, data transfer control at the terminal which is an information source is effective in cooperation with a flow control function (data transfer control) in a network node (network-to-network interface). A flow control GFC is utilized to make the flow control at the terminal.

In data communication, it may be necessary to discard received cell data, due to data concentration in the network. In this case, priority levels of cells to be discarded are previously set and data indicating the priority are transmitted from the terminal serving as an information source with the cells. A cell loss priority CLP is utilized for indicating the priority level in this discard.

(c) Information Field Identification:

A payload type PT indicates the type of the content of the information field in the cell and overcrowding of data on the transmission line.

(d) Header Error Control and Synchronization:

In the ATM mode, information is transferred every generation thereof. Information transfer is executed asynchronously with data transfer through physical transmission channels. Observing the data transfer in units of the individual cells, transmission and receiving of the data must be synchronized in transmission and receiving terminals. When headers of the cells are erroneous, communication cannot be guaranteed. Thus, a header error control HEC is provided for implementing detection and correction of a header error and cell synchronization.

In the ATM mode, data of a plurality of channels are multiplexed in units of the cells in the transmission line, as shown in FIG. 53. When no transfer information is present, vacant cells are transmitted. The payload type PT identifies whether or not the cell is vacant.

In the ATM mode, all data are divided into cells of the same form and subjected to processing such as multiplexing, segmentation or exchange. Thus, all of a plurality of media (voices, images and data) can be transmitted by a single network in a unified manner. Thus, it is possible to implement a data communication system accommodating multimedia.

As to the aforementioned network carrying out data communication in the ATM mode, efforts are recently made to implement the network as a system for constructing a network accommodating multimedia, with development of standardization of the system.

In the network utilizing the ATM mode, data transfer is executed in the following procedure: First, connection is set between source and destination terminals in advance of the data transfer, by specifying a route coupling the source and destination terminals in the network, i.e., switching points (exchanges and cross-connector groups) for passing the data and deciding values of identifiers for identifying the connection. After such setting of the connection, the process enters a data transfer phase, whereby cells are routed in the respective switching points through predetermined paths in accordance with the values of the identifiers (VPI and VCI) included in the headers of the respective cells. In this data transfer, all data are transmitted in units of the cells, as hereinabove described. In the protocol processor, it is necessary to divide the data into units of cells in advance of cell transfer, assemble the same as cells and thereafter transmit the data successively through transmission lines, and to disassemble the cells of received data into cells to restore original user data in receiving. In such reassembly/segmentation of the cells, control operations depending on the type of the medium such as flow control, error control and absorption of cell delay fluctuation are carried out at the same time.

As shown in FIG. 53, the cell header region stores only data required for cell transfer. Data required for reassembling and segmentizing the cell are stored in a cell payload region. Namely, the physical layer depends on the transmission medium, i.e., the communication medium, and transmitted/received data are different in speed and density from each other. On the other hand, processing in the ATM layer is decided by the data stored in cell header portions, and varied with the contents of the received cells. Referring to FIG. 52, the header portion stores identifiers, starting tags and allocation size data of buffers, while a trailer portion stores data indicating a trailer length thereof, an end tag and a payload length (in protocols AAL3 and AAL4 of the ATM adaptation layer: a protocol AAL5 has no header portion, while its trailer portion stores control data, data indicating a payload length and error (checking data). in the ATM layer, a 5-byte header is added to form a cell of a fixed length (53 bytes) in transmission. Thus, the processing of the ATM layer is varied with the contents of the headers.

A single protocol processor transmits data which are utilized by applications corresponding to a plurality of media. The ATM layer implements call transfer of all services (applications). This ATM layer executes generic flow control, formation and elimination of cell headers, conversion of virtual path identifiers and virtual channel identifies for cells, and multiplexing and segmentation of the cells.

The network utilizing the ATM mode is a developing technique, which is not yet established.

SUMMARY OF THE INVENTION

An object of the present invention is to provide a protocol processor which efficiently implements an interface between an ATM layer and a physical layer.

A protocol processor according to one aspect of the present invention includes a plurality of ATM layer transmission units which are provided in correspondence to different applications for executing previously allocated ATM layer processing on supplied data respectively, and a physical layer transmission unit receiving output data from the plurality of transmission units for executing physical layer processing on the supplied data and transmitting the same onto a transmission line.

Preferably, the physical layer transmission unit includes an activation block for successively activating output blocks of the plurality of ATM layer transmission units.

Preferably, the activation block periodically activates the output blocks of the plurality of ATM layer transmission units at time periods which are independently predetermined for the respective ones of the plurality of ATM layer transmission units.

Preferably, the time periods which are predetermined for the respective ones of the plurality of ATM layer transmission units are a common time period which is common to the plurality of ATM layer transmission units Alternatively, the predetermined time periods are so set that at least two ATM layer transmission units have predetermined time periods which are different from each other.

Alternatively, the activation block successively activates the output blocks of the plurality of ATM layer transmission units at time periods which are dynamically changed depending on an occupation state of the transmission line.

In the protocol processor, the applications are allocated to the plurality of ATM layer transmission units independently of each other, whereby each ATM layer transmission units may simply be in charge of a single processing. Thus, the structure of the ATM layer transmission unit is simplified and the processing in the ATM layer is dispersed, whereby loads of the respective ATM layer transmission units can be reduced.

When the activation block of the physical layer transmission unit activates the ATM layer transmission units at prescribed timings respectively, it is possible to transmit necessary data depending on respective data transmission situations. When the ATM layer transmission units carry out transmission in accordance with transmission right data, the physical layer transmission unit may not control the transmission timings of the ATM layer transmission units, whereby its load is reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Receiving System

[Embodiment 1]

Figure 1:
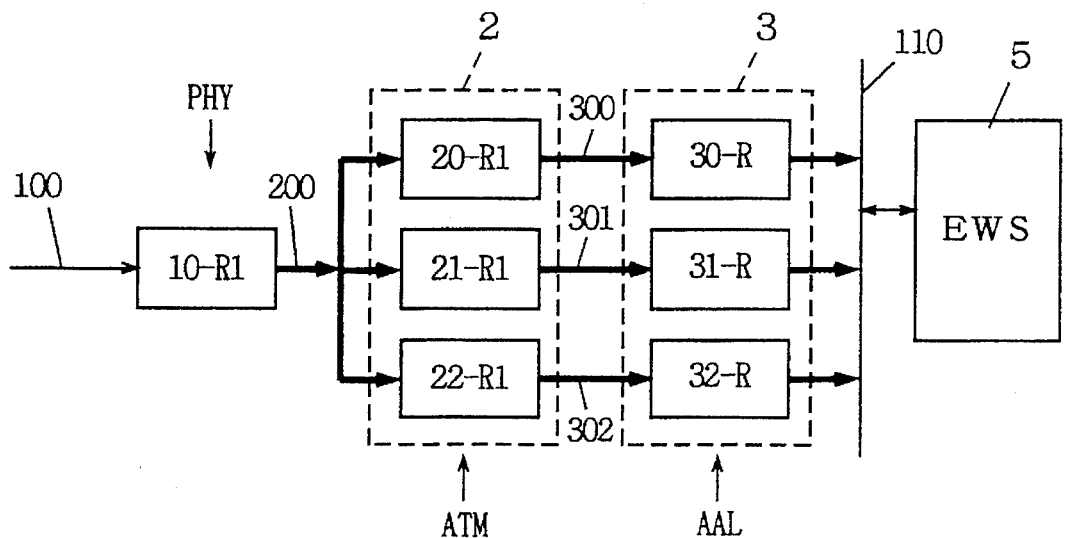
FIG. 1 illustrates the structure of a protocol processor according to a first embodiment of the present invention.

FIG. 1 schematically illustrates the structure of a receiving part of a protocol processor according to a first embodiment of the present invention. Referring to FIG. 1, the protocol processor includes a physical layer receiving block 10-R1 which is coupled to an ATM transmission line 100 for executing the physical layer processing on received data, an ATM layer processing block 2 which is connected to the physical layer receiving block 10-R1 through a bus 200 for executing an ATM layer processing on data received from the physical layer receiving block 10-R1, and a higher layer processing block 3 for executing an AAL layer processing, for example, on data from the ATM layer processing block 2. The higher layer processing block 3 is connected to a terminal 5 which is an engineering work station (EWS), for example, through a user data bus 110.

The ATM layer processing block 2 includes a plurality of ATM layer receiving blocks 20-R1, 21-R1 and 22-R1 which are related to individual applications respectively. The ATM layer receiving blocks 20-R1, 21-R1 and 22-R1 are provided in parallel with each other, and connected to the same physical layer receiving block 10-R1 through the bus 200.

The higher layer processing block 3 includes higher layer processing functional blocks 30-R, 31-R and 32-R which are provided in correspondence to the ATM layer receiving blocks 20-R1 to 22-R1 respectively. These higher layer processing functional blocks 30-R, 31-R and 32-R are connected to the ATM layer receiving blocks 20-R1, 21-R1 and 22-R1 through signal lines (bus lines) 300, 301 and 302 respectively.

Figure 52:
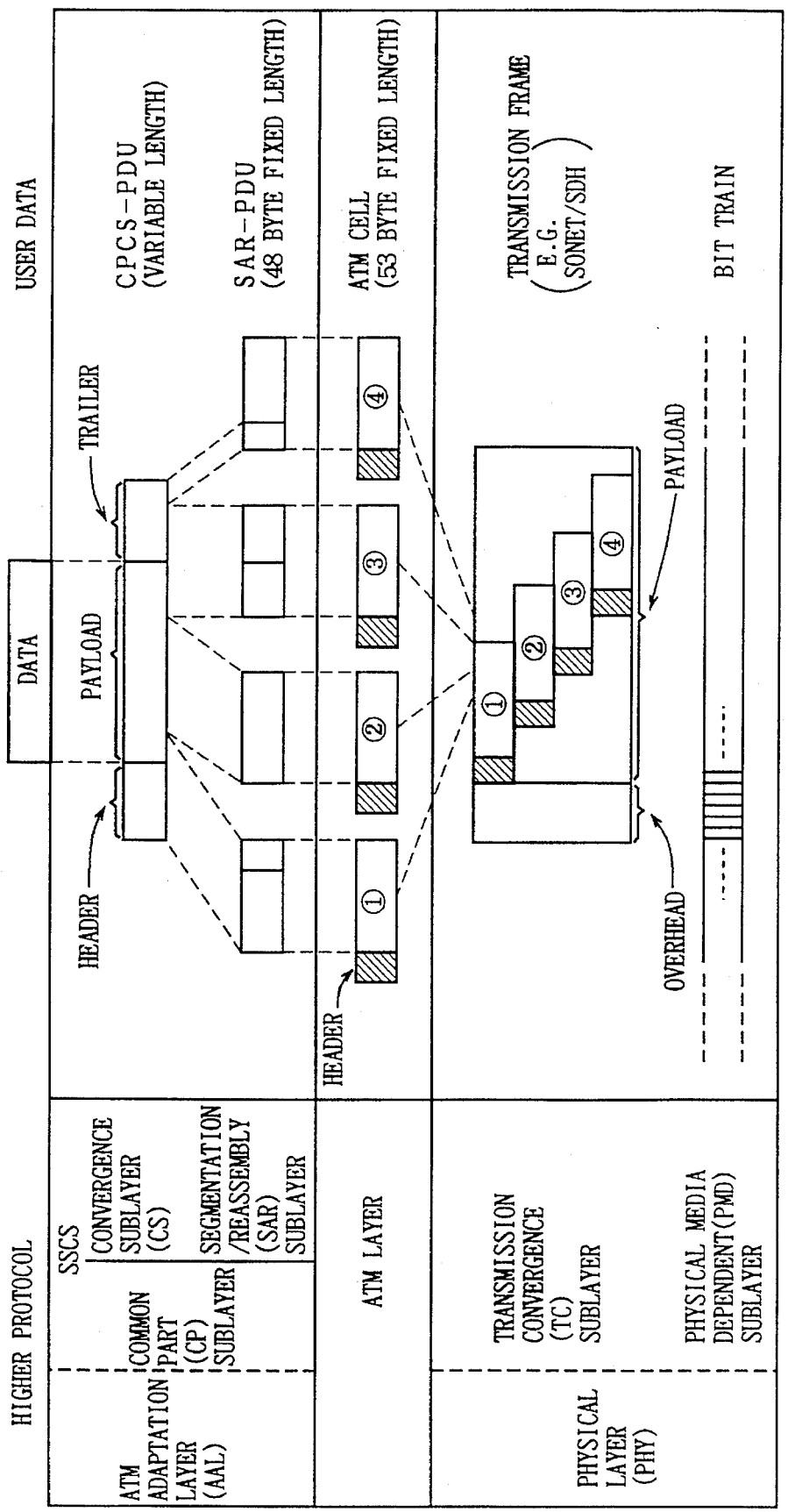
FIG. 52 is an illustration for explaining protocols between terminals and a network in an ATM mode.

The physical layer receiving block 10-R1 executes various processing operations described above with reference to FIG. 52.

Figure 2:
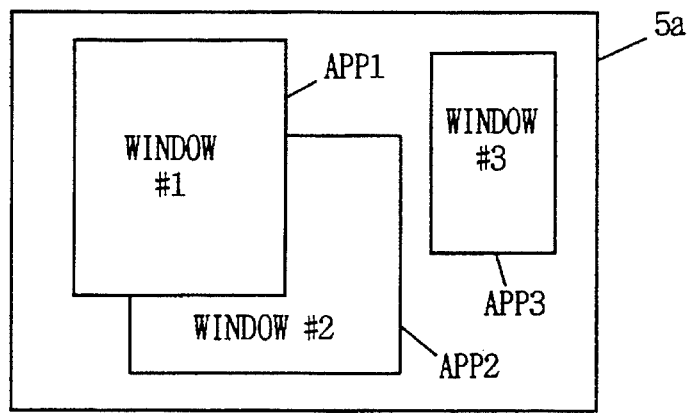
FIG. 2 illustrates an example of applications employed in the present invention.

The ATM layer receiving blocks 20-R1 to 22-R1 are adapted to process a plurality of applications which are utilized by the terminal 5 respectively. In other words, individual applications which are utilized by the terminal 5 are allocated to the ATM layer receiving blocks 20-R1 to 22-R1 respectively. FIG. 2 shows exemplary applications which are utilized by the terminal 5.

Referring to FIG. 2, a plurality of windows #1 to #3 are displayed on a display screen 5a of the terminal 5, for example. These windows #1 to #3 correspond to applications APP1 to APP3 respectively. These applications APP1 to APP3 may utilize the same medium (the same channel) or different media. Namely, the applications APP1 to APP3 may have the same or different types of cells. When the applications APP1 to APP3 have different types of cells, the ATM layer performs different processing operations, as described above with reference to FIG. 52. Namely, the ATM layer executes generic flow control, formation and elimination of cell header information, conversion of cell identifiers VPI and VCI, and multiplexing/segmentation of cells. The contents of processing executed by the ATM layer are varied with the contents of headers of the cells. Therefore, the respective applications are distributed into the plurality of ATM layer receiving blocks 20-R1 to 22-R1, for reducing loads of the respective receiving blocks 20-R1 to 22-R1.

Figure 3:
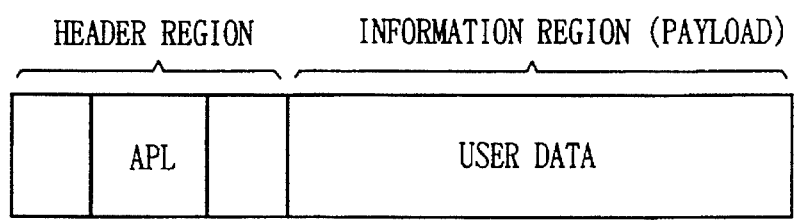
FIG. 3 illustrates a structure of data (cell) utilized in the protocol processor according to the present invention.
Figure 53:
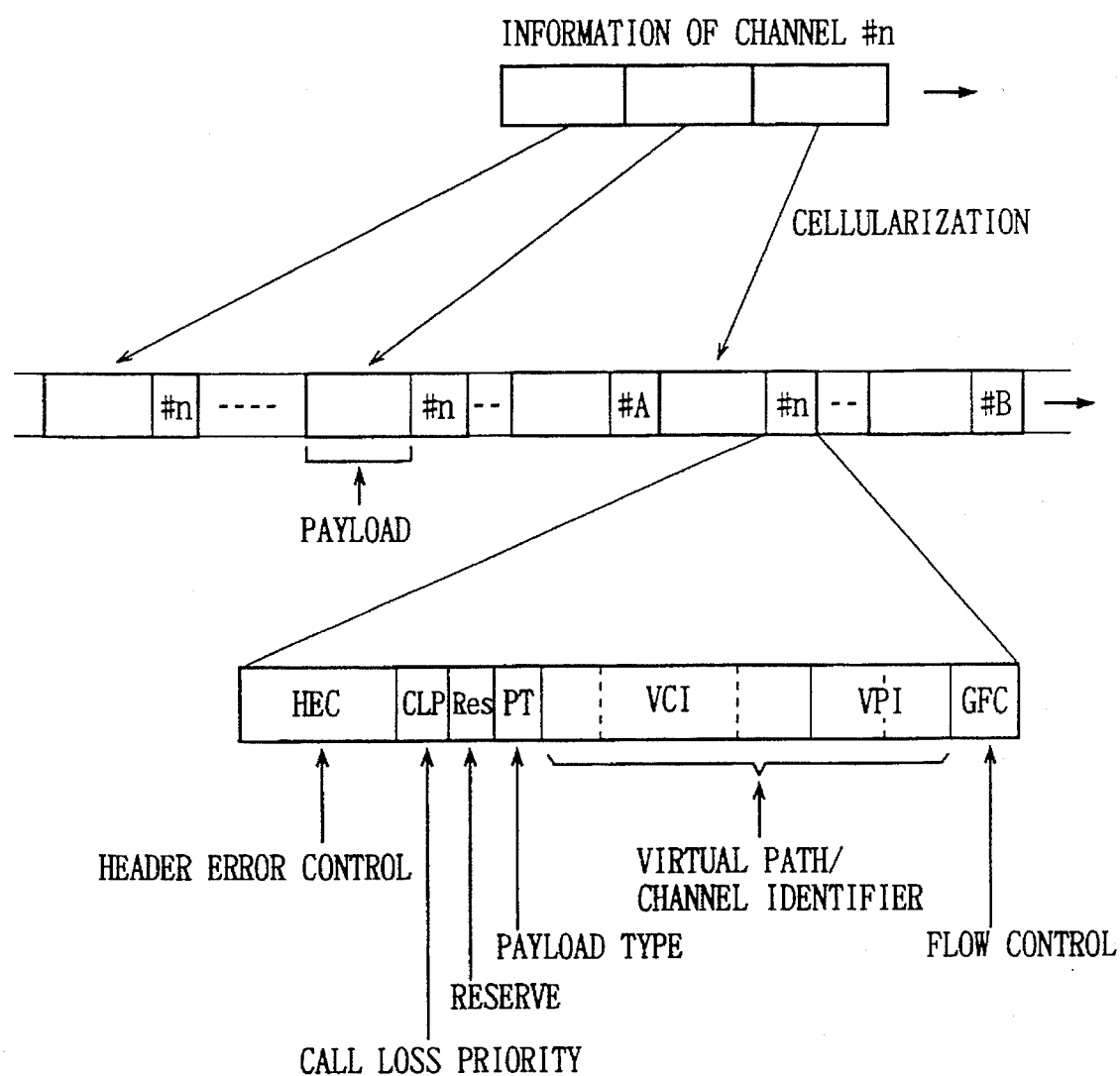
FIG. 53 is an illustration for explaining an ATM mode and cells.

In order to implement the dispersion or distribution of processing, the ATM layer receiving blocks 20-R1 to 22-R1 shown in FIG. 1 store data for specifying the related applications respectively. The data specifying the applications include virtual path identifies and channel identifiers and payload types PT as described above with reference to FIG. 53. The applications may also be specified by data such as file names included in information regions, and hence FIG. 3 generally indicates application specifying information APL. The application specifying information APL shown in FIG. 3 has a bit pattern which is specific to the application, for specifying the application utilizing data of a payload (information region) in a related cell.

Each of the plurality of ATM layer receiving blocks 20-R1 to 22-R1 executes the processing when cell data received from the physical layer receiving block 10-R1 through the signal line 200 is that of the application related thereto. The functional blocks 30-R to 32-R of the higher layer processing block 3 have processing contents which are varied with the applications. Thus, the blocks executing processing are switched according to the applications, so that the numbers of the processing operations which are carried out by the respective functional blocks are reduced to simplify the circuit configuration. Even if a long time is required for processing cell data of a specific application, the communication throughput is not reduced since data processing of another application is executed in another block.

Figure 4:
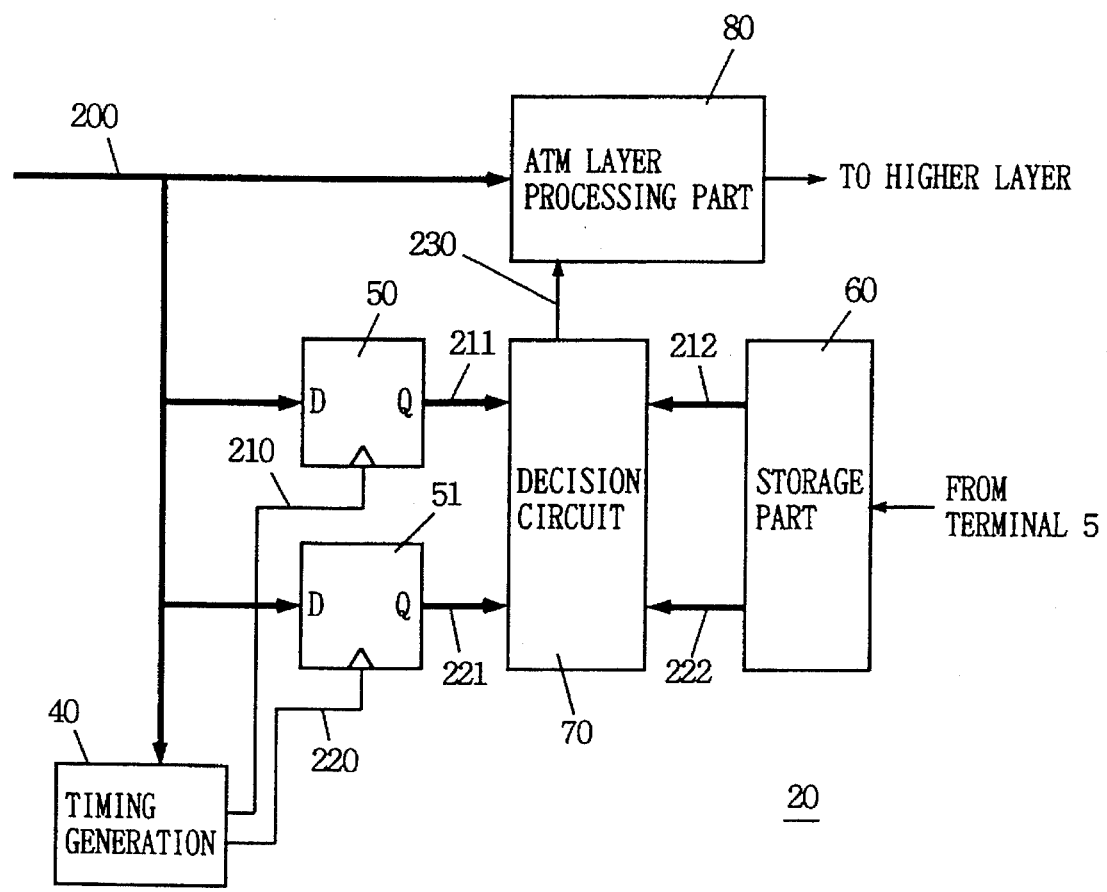
FIG. 4 illustrates the structure of an ATM layer receiving block shown in FIG. 1.

FIG. 4 illustrates an exemplary structure of each ATM layer receiving block shown in FIG. 1. Referring to FIG. 4, the ATM layer receiving block includes a timing generation part 40 which identifies the heads of a cell transmitted through the signal line 200 through its bit pattern for generating various types of timing signals in accordance with information included in this cell, and registers 50 and 51 for incorporating and storing data on the signal line 200 in accordance with timing signals 210 and 220 which are supplied from the timing generation part 40. The registers 50 and 51 have an 8-bit capacity in total. This is because the signal line 200 incorporates respective 8-bit parallel data (byte data) which are transmitted from the physical layer receiving block 10-R1 shown in FIG. 1 through the timing signals 210 and 220 respectively to store the application specifying information APL. When the application specifying information APL is stored in a predetermined position of the header region, the registers 50 and 51 extract and store the application specifying information APL in the header region included in the cell which is supplied from the signal line 200 in accordance with the timing signals 210 and 220 from the timing generation part 40.

The ATM layer receiving block further includes a storage part 60 for storing application specifying information APL which is supplied from the terminal 5 shown in FIG. 1, specifying the application to be processed by this functional block, a decision circuit 70 which compares the application specifying information stored in the storage part 60 with that stored in the registers 50 and 51 to decide whether or not the received cell is processed, and an ATM layer processing part 80 for carrying out predetermined ATM layer processing on the cell supplied through the signal line 200 in accordance with an output signal 230 of the decision circuit 70. The ATM layer processing part 80 separates the cell from that supplied through the signal line 200 for eliminating the header of each cell and carrying out conversion of virtual identifiers VPI/VCI (conversion of application specifying information) at need and thereafter transmits the same to the corresponding higher layer processing functional block.

The storage part 60 stores the application specifying information which is supplied from the terminal 5 shown in FIG. 1 upon power supply or starting of individual communication. The application specifying information can be stored in the storage part 60 in the following method: Destination information specifying the ATM layer receiving block and the application specifying information are transmitted from the terminal 5 with control information indicating the application specifying information through the user data bus 110 (see FIG. 1) or a dedicated control signal line. A control unit such as a layer control unit (not shown) which is included in the protocol processor stores the application specifying information in the storage part 60 of the ATM layer receiving block which is specified on the basis of the control information. The protocol of the layer control unit is defined to control maintenance and operation of the system in B-ISDN (broadband ISND), for example.

When the protocol processor shown in FIG. 1 has the structure of a slot-in card which is inserted in an extended board region of a computer, the storage part 60 may be in the form of a DIP switch so that the user sets the application specifying information through the DIP switch when he inserts the card. In this case, the application which is processed by each ATM layer receiving block is semifixedly set for specifying processing of voice data, image data or ordinary data. Also when the applications utilize the same type of cells, i.e., when a plurality of applications utilize the same channel, it is possible to semifixedly set the applications by the DIP switch.

The ATM layer processing part 80 executes ATM layer processing on the cell corresponding to the previously allocated application. The operation is now described.

Figure 5:
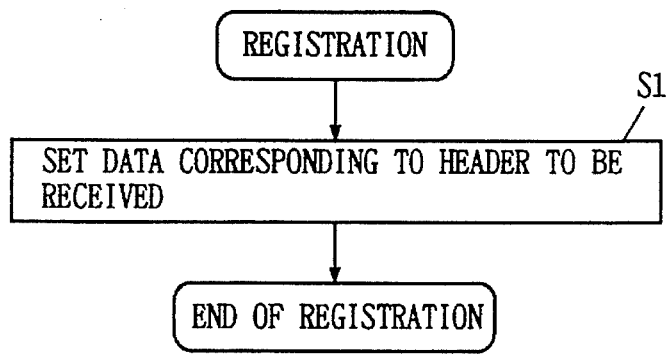
FIG. 5 is a flow chart for illustrating an operation of the first embodiment of the present invention.

As shown in FIG. 5, data as to cells to be processed (data required by the applications) are registered in the storage parts 60 of the ATM layer receiving blocks 20-R1, 21-R1 and 22-R1 in advance of communication starting (step S1). The data may be registered in the storage parts 60 of all ATM layer receiving blocks 20-R1, 21-R1 and 22-R1, or the data may alternatively be registered only in the corresponding ATM layer receiving block in starting of individual communication.

In receiving of the cell data, the physical layer receiving block 10-R1 shown in FIG. 1 refers to the respective header data in the frame data supplied through the ATM transmission line 100, extracts the data utilized by the terminal 5, and executes predetermined physical layer processing on the extracted data. After completion of the physical layer processing, the physical layer receiving block 10-R1 converts the processed data to 8-bit parallel data (byte data) and transmits the same to the ATM layer receiving blocks 20-R1, 21-R1 and 22-R1 through the signal line 200.

Each of the ATM layer receiving blocks 20-R1, 21-R1 and 22-R1 executes the following processing: The timing generation part 40 regularly monitors the data supplied from the physical layer receiving block 10-R1 through the signal line 200. The timing generation part 40 identifies the head position of the cell from the cell data supplied from the signal line 200 through the bit pattern provided on the head portion of the cell or the pattern of a header error control HEC in the header region (see FIG. 53). In accordance with this identifier and the head position of the cell, the timing generation part 40 generates necessary timing signals. The registers 50 and 51 extract the application specifying information from the cell supplied from the signal line 200 and store the same. A receiving processing flow shown in FIG. 6 is executed in accordance with the application specifying information stored in the registers 50 and 51, as described in the following.

Figure 6:
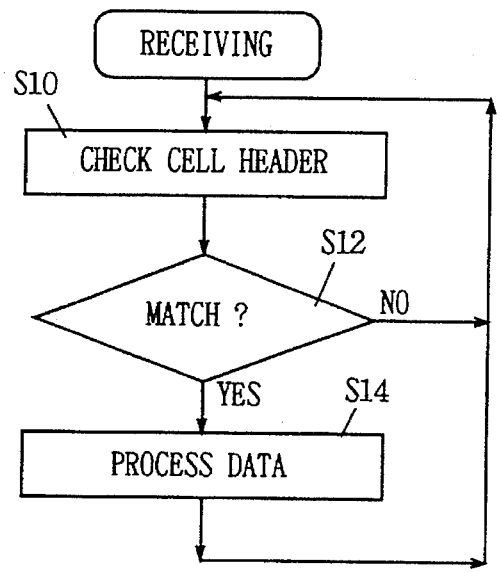
FIG. 6 is a flow chart for illustrating the operation of the first embodiment of the present invention.

The decision circuit 70 reads the application specifying information stored in the registers 50 and 51 through signal lines 211 and 221 while reading that stored in the storage part 60 through signal lines 212 and 222, to decide match/mismatch thereof (step S10 in FIG. 6). When the decision indicates a match, the decision circuit 70 supplies a signal indicating the match to the ATM layer processing part 80 through a signal line 230 (step S12 in FIG. 6). The ATM layer processing part 80 is activated when the signal indicating the match is supplied from the decision circuit 70 through the signal line 230, to execute prescribed ATM layer processing on the cell supplied on the signal line 200 (step S14 in FIG. 6). When the prescribed ATM layer processing such as elimination of the header and segmentation of the cell is completed, the ATM layer processing part 80 transmits the completed data to a functional block of the corresponding higher layer.

When the signal supplied from the decision circuit 70 through the signal line 230 indicates a mismatch, on the other hand, the ATM layer processing part 80 executes no processing (step S12 in FIG. 6).

In the deciding operation, the decision circuit 70 may read all data held by the registers 50 and 51 in parallel with each other while reading the application specifying information from the storage part 60 in a parallel manner, to decide match/mismatch of the data. Alternatively, the decision circuit 60 may successively read the data held in the registers 50 and 51 while successively reading the corresponding application specifying information from the storage part 60 for carrying out the deciding operation. In the case of the successive reading structure, it is possible to execute extraction of the application specifying information from the header region of the cell, holding of the same in the registers 50 and 51 and comparison (decision) in a pipeline manner.

The timing generation part 40 also generates timing signals deciding operation timings of the decision circuit 70 and the ATM layer processing part 80 although this timing operation is not shown in FIG. 6. The physical layer receiving block 10-R1, which extracts and reproduces a clock signal from the input cell, transmits 8-bit parallel data as well as a synchronous bit for providing the timing for transmission of the 8-bit parallel data onto the signal line 200 in accordance with the reproduced clock. The timing generation part 40 develops internal clocks in accordance with the synchronous bit, to generate various timing signals. The 8-bit parallel data are synchronously transferred between the ATM layer and the physical layer. The asynchronous transfer mode (ATM mode) is called "asynchronous" in such a point that data are generated on the user data bus asynchronously with the ATM transmission line when a call is generated.

The ATM layer processing block includes the plurality of ATM layer receiving blocks which are in charge of different applications, whereby the following advantages can be attained as compared with the structure of executing all ATM layer processing operations by a single ATM receiving layer block:

The contents of the processing operations executed in the ATM layer are varied with the data stored in the header regions, i.e., the types of the cells (channels). One application includes one or several types of cells. Thus, it is possible to reduce the necessity for a single ATM layer receiving block for executing processing operations which are varied with the cells, thereby simplifying the structures of the ATM layer receiving blocks.

Further, the processing is distributed every application in the ATM layer processing block, whereby no bottleneck such as overcrowding of the transmission line in transfer of large quantity of data or file data between computers, for example, is caused in relation to processing of a single application, and the communication throughput is improved.

Further, the higher layers such as AAL layers are provided in correspondence to the respective ATM layer receiving blocks and processing operations for these higher layers are distributed, whereby the higher layer functional blocks are also simplified in structure.

[Embodiment 2]

Figure 7:
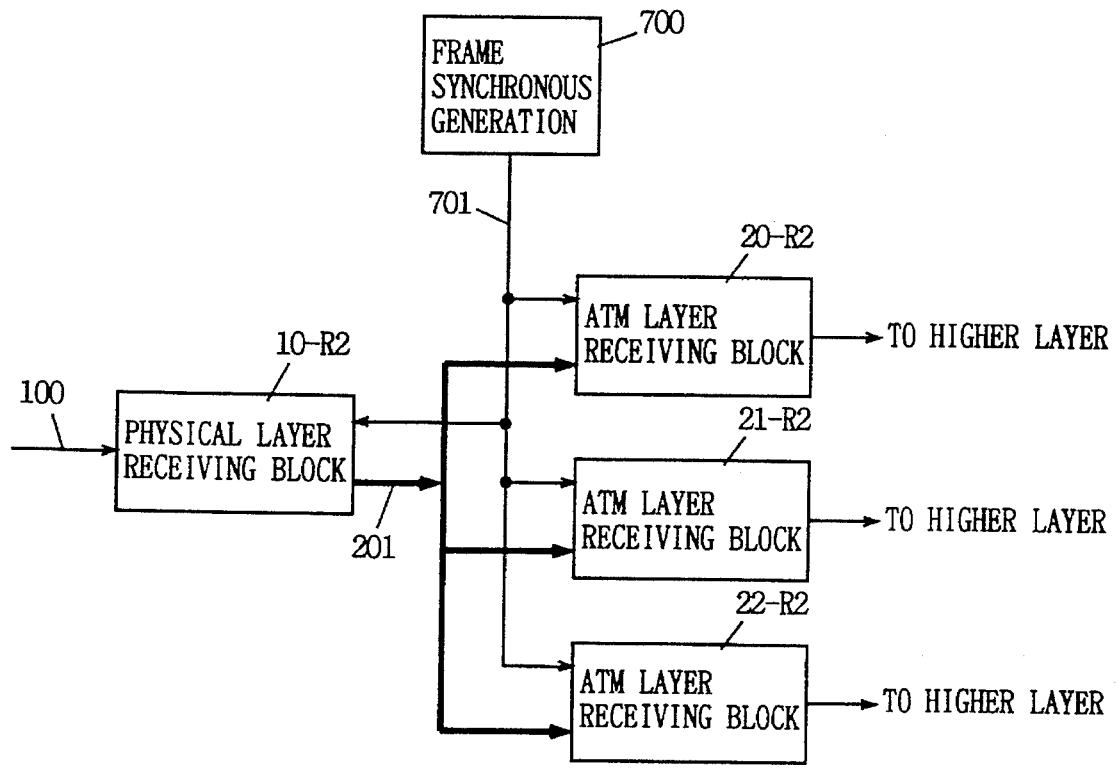
FIG. 7 illustrates the structure of a protocol processor according to a second embodiment of the present invention.

FIG. 7 schematically illustrates the structure of a protocol processor according to a second embodiment of the present invention. This figure shows the structure of an ATM layer processing block, which includes a plurality of ATM layer receiving blocks 20-R2, 21-R2 and 22-R2. Similarly to the structure shown in FIG. 1, processing functional blocks of higher layers are provided in correspondence to the ATM layer receiving blocks 20-R2 to 22-R2, to which applications are allocated independently of each other.

A physical layer receiving block 10-R2 receives data utilized by a terminal (see FIG. 1) from data supplied through an ATM transmission line 100, to execute predetermined physical layer processing. After completion of the physical layer processing, the physical layer receiving block 10-R2, the structure of which is described later, converts the data to 8-bit parallel data and transfers the same to the ATM layer receiving blocks 20-R2 to 22-R2 in the form of frame data through a signal line 201. The ATM layer receiving blocks 20-R2 to 22-R2 incorporate the frame type data supplied through the signal line 201 in synchronization with frame synchronizing signals from a frame synchronous generation part 700 respectively.

Figure 8:
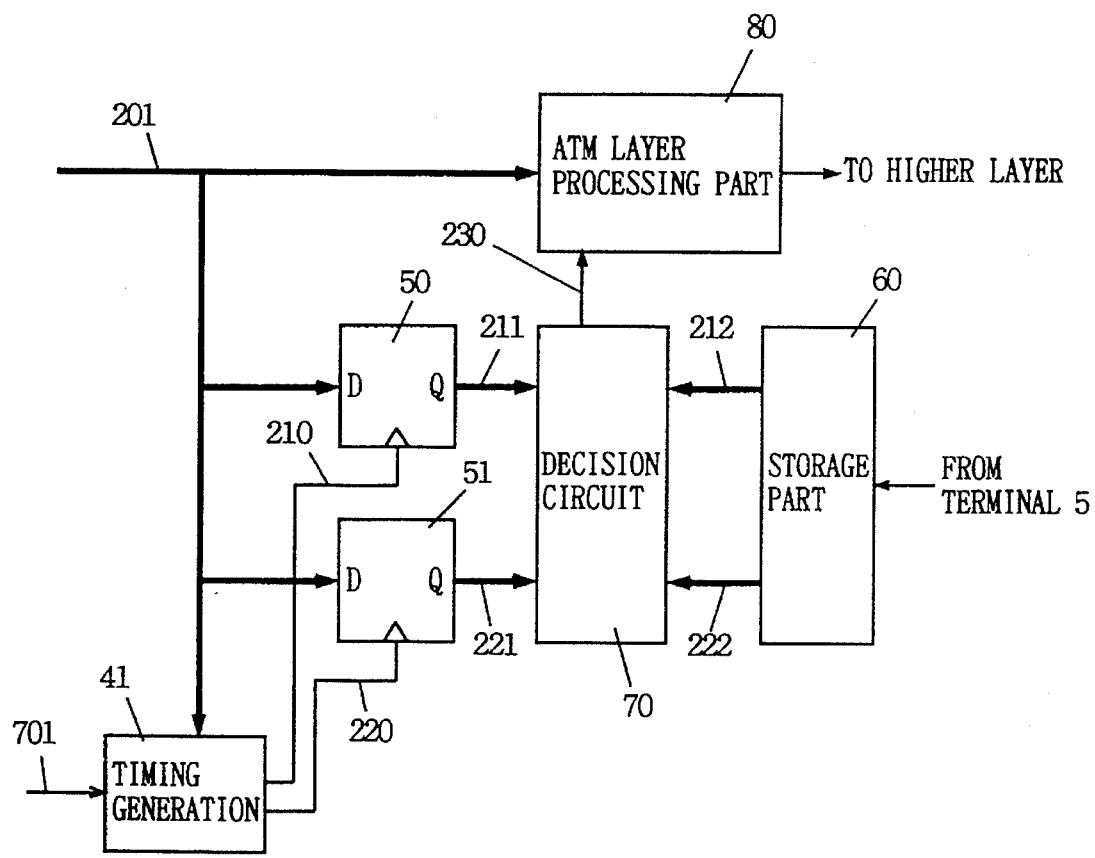
FIG. 8 schematically illustrates the structure of an ATM layer receiving block shown in FIG. 7.

FIG. 8 illustrates the structure of each ATM layer receiving block shown in FIG. 7. The ATM layer receiving block shown in FIG. 8 is different in structure from that shown in FIG. 4 in such a point that a timing generation part 41 generates various internal timing signals in synchronization with the frame synchronization signal which is supplied from the frame synchronous generation part 700 through a signal line 701. In the structure of the ATM layer receiving block shown in FIG. 8, parts corresponding to those of the ATM layer receiving block shown in FIG. 4 are denoted by the same reference numerals. An ATM cell has a fixed length (53 bytes). When the timing generation part 41 detects the head of the frame type data (including the ATM cells) supplied on the signal line 200 in synchronization with the frame synchronizing signal which is supplied through the signal line 701, therefore, it is possible to readily detect heads of remaining cells (transfer timing for individual cell data (8-bit parallel data) is supplied by a clock which is reproduced by the physical layer from received data). Therefore, it is not necessary to identify a bit pattern indicating the head of each cell, whereby the structure of the timing generation part 41 can be readily simplified.

Figure 9:
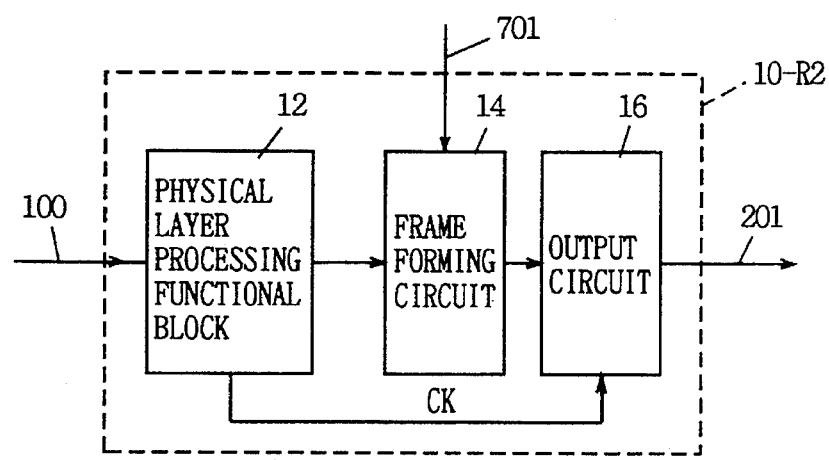
FIG. 9 schematically illustrates the structure of a physical layer receiving block shown in FIG. 7.

FIG. 9 schematically illustrates the structure of the physical layer receiving block 10-R2 shown in FIG. 7. Referring to FIG. 9, the physical layer receiving block 10-R2 includes a physical layer processing functional block 12 which executes prescribed physical layer processing on data transferred through ATM transmission line 100, a frame forming circuit 14 which receives the data processed by the physical layer processing functional block 12 and forms frame format data in accordance with the frame synchronizing signal supplied through the signal line 701, and an output circuit 16 which successively outputs the frame format data formed by the frame forming circuit 14 onto a signal line 201 as 8-bit parallel data on the basis of a clock CK extracted in the physical layer processing functional block 12. The clock signal CK supplied to the output circuit 16 is formed on the basis of a clock signal which is extracted from input data ant formed in the physical layer processing functional block 12.

Figure 10:
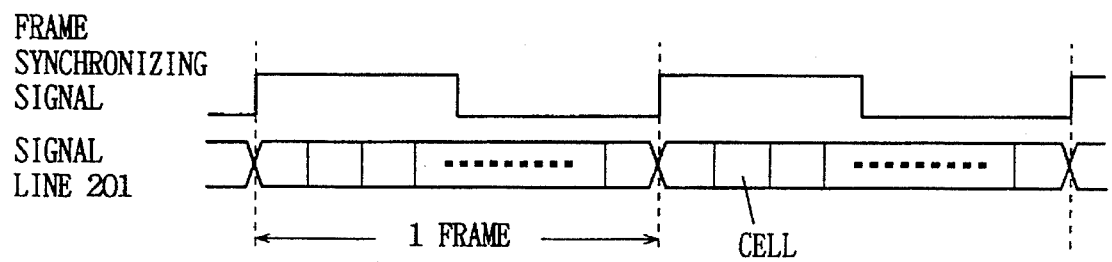
FIG. 10 is a timing chart showing an operation of the second embodiment of the present invention.

Through the structure shown in FIG. 9, frame format data (including the ATM cells) is transmitted onto the signal line 201, as shown in FIG. 10. The frame type (format) data transmitted onto the signal line 201 includes the ATM cells. Since the ATM cell is transmitted onto the signal line 201 in synchronization with the frame synchronizing signal, the head thereof can be readily identified, while heads of subsequent ATM cells can also be readily identified due to the fixed length feature in the timing generation part 41, therefore, it is not necessary to regularly monitor the bit pattern of each ATM cell for identifying the head thereof as shown in FIG. 8, and the circuit structure is simplified.

Each of the ATM layer receiving blocks 20-R2 to 22-R2 executes the same operation as that shown in FIGS. 1 and 4, except the operation of the timing generation part 41 The timing generation part 41 (see FIG. 8) generates the internal timing signals not by regularly monitoring the bit patterns of the data on the signal line 201 and detecting the head position of the cell but in synchronization with the frame synchronizing signal which is supplied through the signal line 701. Head positions of subsequent cells are detected by counting the number of the 8-bit parallel data (byte data) transmitted from the physical layer receiving block 10-R2 onto the signal line 201 by a counter, for example. This detection is readily implemented through the clock CK shown in FIG. 9.

Due to employment of the frame synchronizing signal, it is not necessary to regularly monitor the bit pattern on the signal line 201 for detecting the head position of the cell, and the circuit structure is simplified.

[Embodiment 3]

Figure 11:
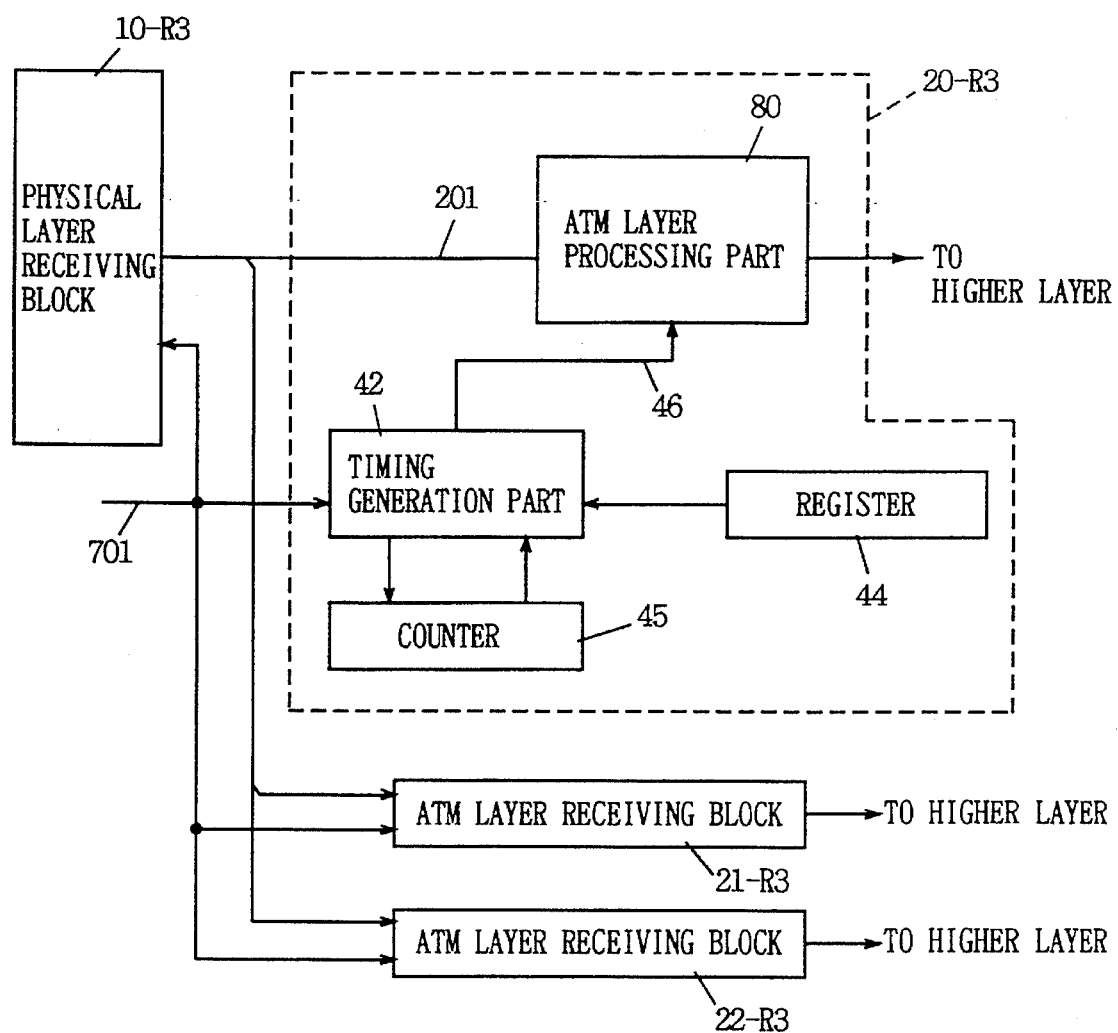
FIG. 11 schematically illustrates the structure of a protocol processor according to a third embodiment of the present invention.

FIG. 11 illustrates the structure of a protocol processor according to a third embodiment of the present invention. Referring to FIG. 11, a physical layer receiving block 10-R3 transmits frame type data, which are formed by ATM cells, onto a signal line 201 in synchronization with a frame synchronizing signal which is transmitted from a frame synchronous generation part (not shown) onto a signal line 701, similarly to the structure shown in FIG. 7.

ATM layer receiving blocks 20-R3, 21-R3 and 22-R3 are coupled in parallel with the signal line 201. The ATM layer receiving blocks 20-R3 to 22-R3 are supplied with the frame synchronizing signal from the frame synchronous generation part (not shown) through the signal line 701. The ATM layer receiving blocks 20-R3 to 22-R3 are provided with corresponding higher layer processing functional blocks respectively, similarly to the structure shown in FIG. 1.

As to the ATM layer receiving blocks 20-R3 to 22-R3 which are identical in structure to each other, FIG. 11 specifically illustrates the structure of the ATM layer receiving block 20-R3.

The ATM layer receiving block 20-R3 includes a register 44 for storing positional information with respect to the frame synchronizing signal which is supplied onto the signal line 701, and a timing generation part 42 which starts a counter 45 in synchronization with the frame synchronizing signal on the signal line 701 for supplying an activation signal to an ATM layer processing part 80 for a prescribed period when the count value of the counter 45 is equal to the positional information stored in the register 44. When the signal supplied from the timing generation part 42 through a signal line 46 enters an active state, the ATM layer processing part 80 incorporates the data supplied onto the signal line 201 and executes ATM layer processing. Alternatively, the register 44 may hold data indicating starting and termination of the active period of the ATM layer processing part 80 in one frame period so that the timing generation part 42 receives the data held by the register 44 and transmits the activation signal onto the signal line 46 in accordance with the count value of the counter 45. The counter 45 counts a signal (the clock CK shown in FIG. 9, for example) defining the transmission timing for 8-bit parallel data transmitted to the signal line 201. The positional information can be stored in the register 44 through the method described above with reference to the first embodiment.

Figure 12:
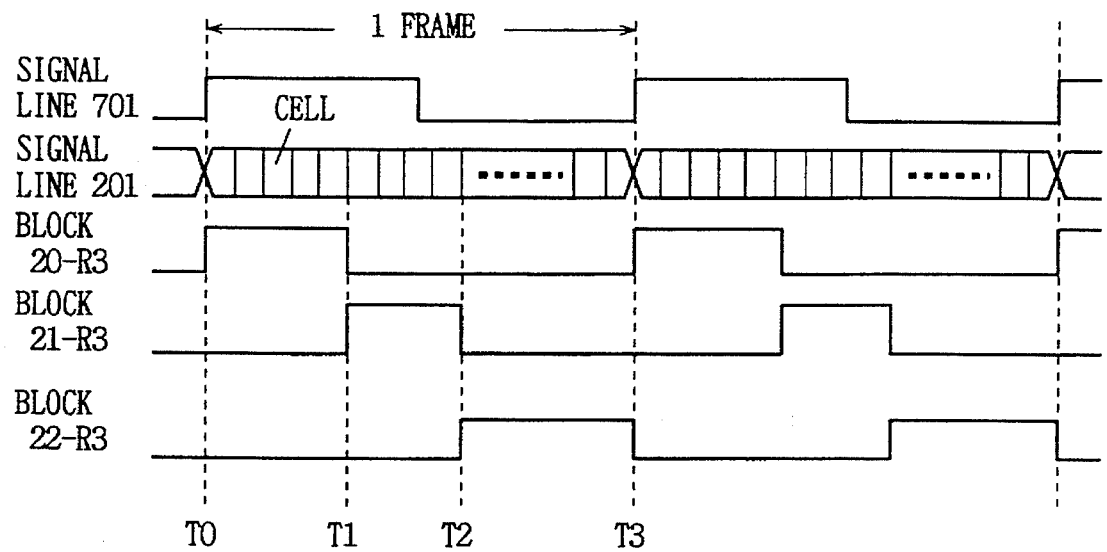
FIG. 12 is a timing chart for illustrating an operation of the third embodiment of the present invention.

FIG. 12 shows exemplary processing executing timings of the ATM layer receiving blocks 20-R3 to 22-R3. Referring to FIG. 12, the ATM layer receiving block 20-R3 is activated between times T0 and T1 for incorporating the data (ATM cells) supplied from the physical layer receiving block 10-R3 onto the signal line 201 and executing previously allocated ATM layer processing. The ATM layer receiving block 21-R3 is activated between times T1 and T2 for incorporating the data (ATM cells) supplied from the physical layer receiving block 10-R3 onto the signal line 201 and executing previously allocated ATM layer processing. The ATM layer receiving block 22-R3 is activated between times T2 and T3 (=T0) for incorporating the data (ATM cells) supplied from the physical layer receiving block 10-R3 onto the signal line 201 and executing necessary processing. Each of the ATM layer receiving blocks 20-R3 to 22-R3 simply incorporates data existing on a single specific position (period) and executes processing in synchronization with an internal synchronizing signal which is supplied onto the signal line 701, whereby it is not necessary for the blocks 20-R3-22-R3 to regularly decide whether or not the data on the signal line 201 must be processed by the same, and hence the circuit scale can be reduced. On a transmission side, data are transmitted from the ATM layer to the physical layer in the frame mode as described later in detail, so that the ATM layer receiving blocks 20-R3 to 22-R3 can receive and process only data to be processed by their own when the processing positions are specified.

When data specifying positions in a frame are also produced and transmitted as control information on the transmission side, it is also possible for a receiver side to rearrange frame data depending on specific positions which are allocated to the ATM layer receiving blocks 20-R3 to 22-R3 in accordance with the transmitted positional information in the physical layer (see the frame generation circuit in FIG. 9).

According to the structure of the third embodiment, as hereinabove described, the ATM layer receiving blocks require no circuits for and procedure of storing the cells to be processed and no decision as to whether each cell is data to be processed therein, whereby the circuit scale can be reduced. Further, it is not necessary to retard the processing until establishment of the decision, and the processing can be executed at a high speed.

[Embodiment 4]

Figure 13:
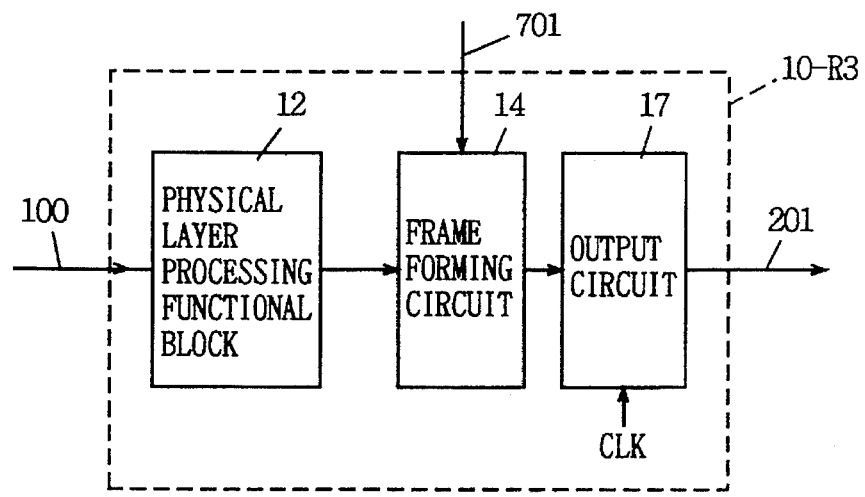
FIG. 13 schematically illustrates the structure of a physical layer receiving block shown in FIG. 11.

FIG. 13 illustrates the structure of a protocol processor according to a fourth embodiment of the present invention. This figure shows the structure of a physical layer receiving block 10-R3. Frame type data which are transmitted from the physical layer receiving block 10-R3 onto a signal line 201 are transmitted to ATM layer receiving blocks which are similar to those shown in FIG. 11. In the structure shown in FIG. 13, an output circuit 17 transmits frame data (frame format (type) data) which are formed in a frame forming circuit 14 in accordance with a clock CLK. This clock signal CLK is formed by frequency-multiplying a frame synchronizing signal on a signal line 701, for example. The speed of the clock signal CLK is set at a value corresponding to transmission speed as high as possible among those employable as data transmission speeds in an ATM transmission line 100. For example, the clock signal CLK which is supplied to the output circuit 17 is also supplied to a counter which is similar to the counter 45 shown in FIG. 11.

Figure 14:
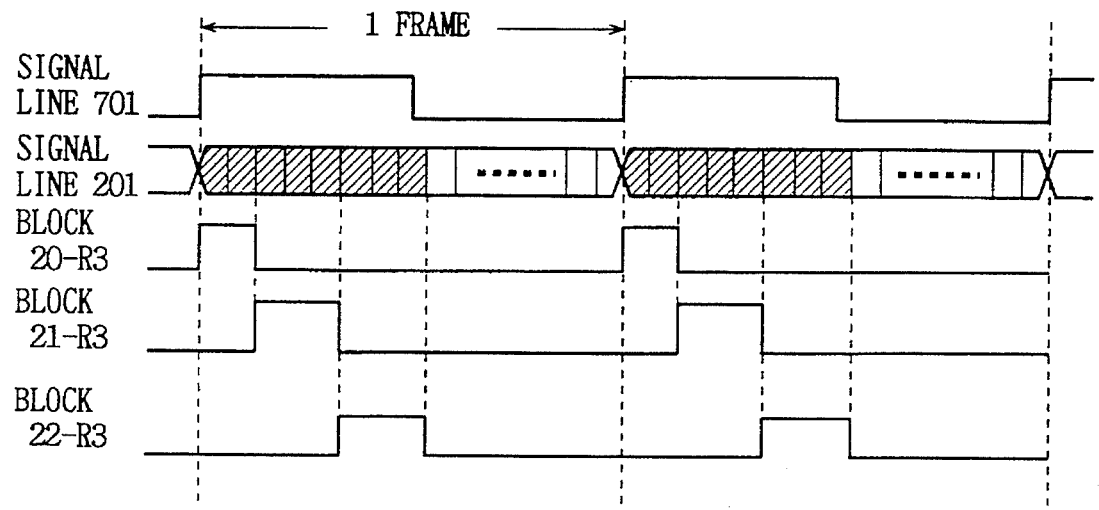
FIG. 14 is a timing chart for illustrating an operation of a protocol processor according to a fourth embodiment of the present invention.

When the transmission speed of the frame data from the output circuit 17 onto the signal line 201 is higher than the data transmission speed at the ATM transmission line 100, a free area is caused in one frame period as shown in FIG. 14. Referring to FIG. 14, regions of valid cells are shown by slant lines. When a speed of 100 Mbps (megabit per bit) is selected as the frame transmission speed, for example, data are transferred between a physical layer and an ATM layer only through half a region in one frame if the ATM transmission line 100 is at a speed of 50 Mbps. Therefore, it is possible to select the physical layer receiving block 10-R3 and the ATM layer receiving blocks independently of each other.

In other words, ATM layer receiving blocks of the same structure can cope with a plurality of types of physical layer receiving blocks. Different types of physical layers have different structures due to different speeds and density values of data to be processed. In each ATM layer receiving block, on the other hand, a receiving block activation period which is decided by the counter corresponds to the number of cells in other words, and it is possible to identify the position for storing necessary cells included in a frame by the count value of the counter even if the frame transmission speed is increased, whereby necessary data can be incorporated and processed with the same structure receiving block.

According to the structure of the fourth embodiment, as hereinabove described, it is possible to cope with a plurality of types of physical layer receiving blocks by ATM layer receiving blocks of common structures.

[Embodiment 5]

Figure 15:
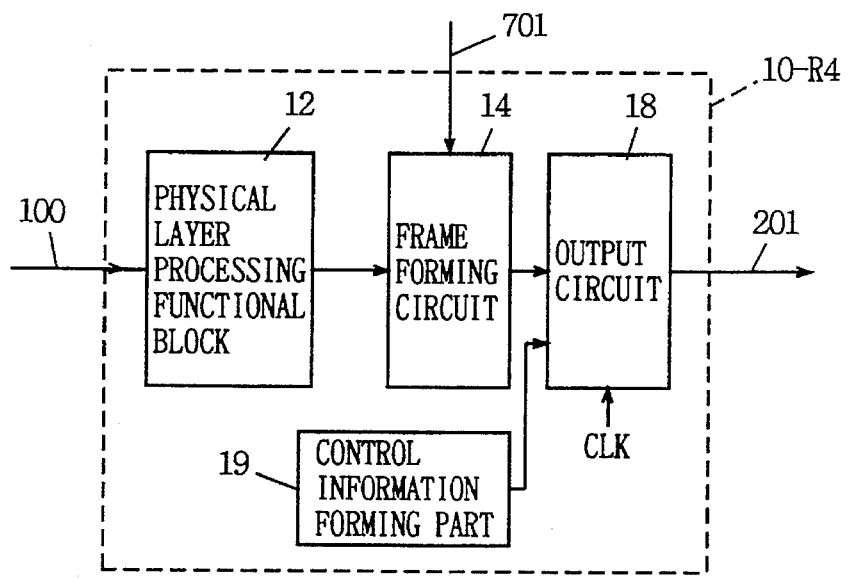
FIG. 15 schematically illustrates the structure of a physical layer receiving block which is employed in a protocol processor according to a fifth embodiment of the present invention.
Figure 16:
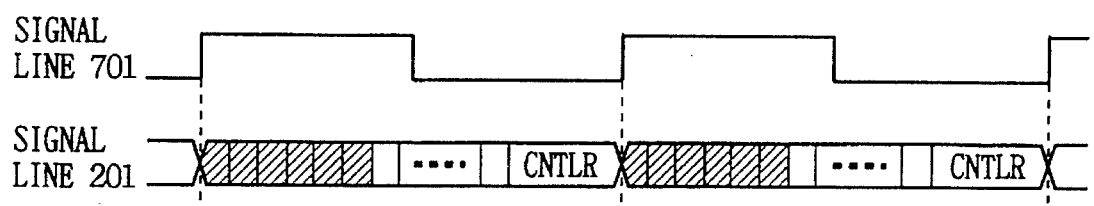
FIG. 16 is a time chart illustrating an operation of the protocol processor according to the fifth embodiment of the present invention.

FIG. 15 illustrates the structure of a protocol processor according to a fifth embodiment of the present invention. This figure shows the structure of a physical layer receiving block 10-R4. Each ATM layer receiving block has a structure which is identical to that shown in FIG. 11. Referring to FIG. 15, the physical layer receiving block 10-R4 includes a physical layer processing functional block 12 which executes prescribed physical layer processing on data supplied through an ATM transmission line 100, a frame forming circuit 14 which forms frame data from 8-bit parallel data received from the physical layer processing functional block 12 in synchronization with a frame synchronizing signal which is supplied from a signal line 701, a control information forming part 19 forming control information which is utilized in the ATM layer (or higher AAL layer), and an output circuit 18 which multiplexes the frame data from the frame forming circuit 14 and the control information from the control information forming part 19 in accordance with a clock signal CLK and transmits the same onto a signal line 201.

The output circuit 18 transmits the frame data onto the signal line 201 at a clock speed which is higher than the transmission speed of the data supplied through the ATM transmission line 100. In this case, a free area exists in each frame. The output circuit 18 multiplexes control information CNTLR from the control information forming part 19 in this free area and transmits the same onto the signal line 201. The control signal CNTLR transmitted onto the signal line 201, which is control information utilized by the ATM layer (or the AAL layer), may include a synchronous bit for attaining synchronization of the data transmission speed, the number of valid cells, or self diagnosis information for the ATM layer, for example. Since the control information CNTLR is multiplexed with the ATM cell data and transmitted onto the signal line 201, no signal line is required for transmitting the control signal, and the device structure is simplified. The control information CNTLR may be incorporated by a timing generation part (not shown in FIG. 15), for example, so that a control part which is included in the timing generation part carries out necessary control in accordance with the control information CNTLR.

According to the fifth embodiment, as hereinabove described, a region for inserting the control information in one frame data is so provided that no signal line is required for transmitting the control signal from the physical layer to the ATM layer, whereby the system layout is simplified.

[Modification]

In the structure shown in FIG. 11, the register 44 provided in each ATM layer receiving block decides the period for activating the corresponding ATM layer receiving block (executing the processing) in a frame. This structure may be replaced by such a structure that the frame synchronous generation part 700 supplies an activation signal to each ATM layer receiving block. Also in this case, the timing generation part 42 shown in FIG. 11 generates various internal timing control signals in accordance with the frame synchronizing signal supplied through the signal line 701, and generates necessary control signals in accordance with the activation signal from the synchronizing signal generation part 701. This is because it is necessary to generate information indicating the frame data transmission speed or the like, which cannot be obtained from the frame synchronous generation part (synchronizing signal generation part) 700, from this timing generation part 42. Also according to this structure, it is possible to attain an effect similar to those of the first to fifth embodiments.

Transmission System

[Embodiment 6]

Figure 17:
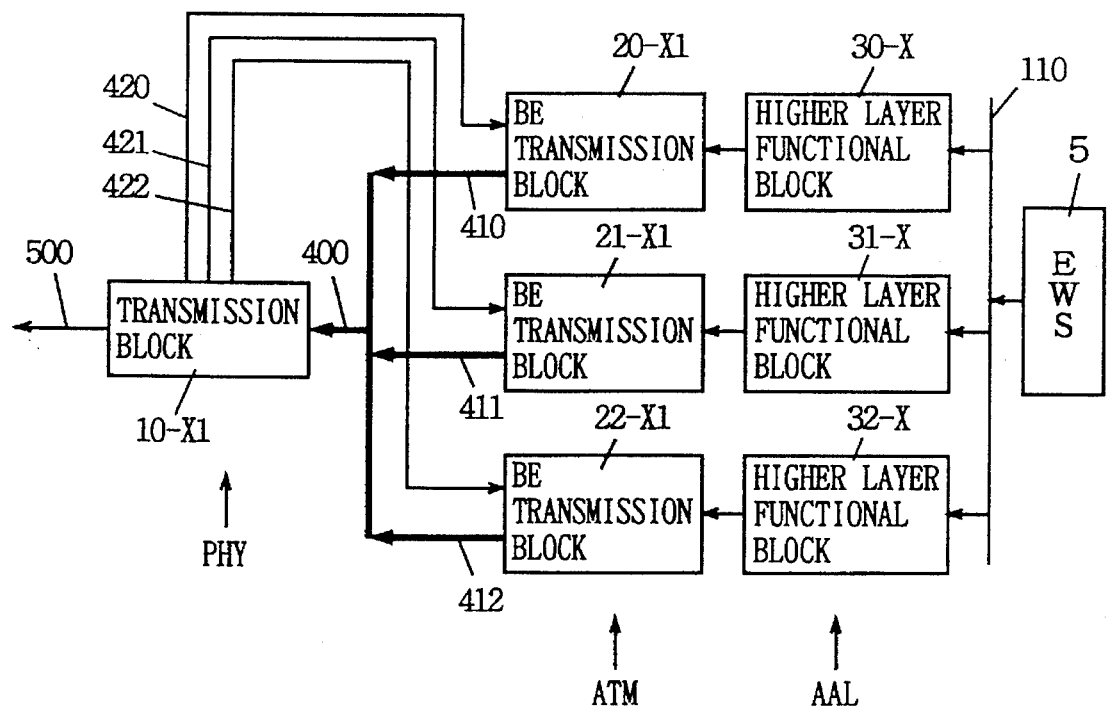
FIG. 17 schematically illustrates the structure of a protocol processor according to a sixth embodiment of the present invention.

FIG. 17 schematically illustrates the structure of a protocol processor according to a sixth embodiment of the present invention. This figure shows the structure of a transmission processing part for transmitting ATM cells from a terminal 5, which is an engineering work station (EWS), for example, connected to an ATM network through an ATM transmission line 500. Referring to FIG. 17, a physical layer (PHY) includes a transmission block 10-X1 which is coupled to the ATM transmission line 500 for carrying out prescribed physical layer processing on ATM cells supplied through a signal line (bus line) 400 and transmitting the same onto the ATM transmission line 500. The physical layer transmission block 10-X1 comprises a function of mapping the ATM cells supplied through the signal line 400 in frames for forming transmission frames and successively transmitting the same to the transmission line 500 as a bit train (see FIG. 52).

An ATM layer includes ATM layer transmission blocks 20-X1, 21-X1 and 22-X1 which are connected to the signal line 400 through signal lines 410, 411 and 412 respectively. These ATM layer transmission blocks 20-X1 to 22-X1 are activated in accordance with a call (data transmission) request from the terminal 5 to execute prescribed ATM layer processing, as described later. Further, the ATM layer transmission blocks 20-X1 to 22-X1 receive buffer enable signals which are supplied from the physical layer transmission block 10-X1 through the signal lines 420, 421 and 422 at buffer enable inputs BE thereof respectively, and transmit the ATM cells onto the corresponding signal lines 410, 411 and 412 only when the received buffer enable signals are in active states. The signal lines 410, 411 and 412 are wired-OR connected to the signal line 400, as described later.

A higher layer, which is an ATM adaptation layer (AAL), for example, includes higher layer processing functional blocks 30-X, 31-X and 32-X which are provided in correspondence to the ATM layer transmission blocks 20-X1, 21-X1 and 22-X2 respectively. The higher layer processing functional blocks 30-X to 32-X receive data from the terminal 5 through a user data transmission line 110, and execute prescribed higher layer processing such as formation of variable length unit data and ATM cells.

When an application executed by the terminal 5 requires data transmission, the terminal 5 transmits a data transmission request to any one of the ATM layer transmission blocks 20-X1 to 22-X1. As to a transmission path for the data transmission request, upon generation of a cell any one of the higher layer processing functional blocks 30-X to 32-X may be specified through the user data transmission path 110 in accordance with specific control information to execute higher layer processing, and "primitive" indicating that transmission data is prepared is transmitted from the higher layer functional block to the corresponding ATM layer transmission block for activating the corresponding ATM layer transmission block. Alternatively, the terminal 5 may transmit a control signal for activating the corresponding ATM layer transmission block as well as the corresponding higher layer processing functional block with the transmission request through a particular path (not shown). In ordinary ATM mode data transmission, a call is generated so that data transfer is executed in the ATM mode after connection is established. One block may be activated in each of the higher layer (AAL) and the ATM layer in setting of the connection in response to the call generation according to the application.

When the data transmission request is supplied, the corresponding one of the ATM layer transmission blocks 20-X1 to 22-X1 segmentizes data supplied from the corresponding higher layer processing functional block into cells to prepare for transmission, and maintains an output high impedance state until a transmission authorizing (enable) signal from the physical layer transmission block 10-X1 enters an active state. When the signal supplied from the physical layer transmission block 10-X1 to the buffer enable input BE is activated, the enabled ATM layer transmission block transmits ATM cell data to the physical layer transmission block 10-X1 through the corresponding signal line.

The ATM layer transmission blocks as activated are varied with applications, whereby the ATM layer transmission blocks need not carry out different processing on different cells and are simplified in structure (in cell segmentation, processing modes are varied with data in information fields). Further, processing in the ATM layer in transmission differs application by application, whereby it is possible to execute transmission in another ATM layer transmission block even if processing of cells employed for a specific application requires a long time and the communication throughput is not deteriorated. Structures and operations of the respective parts are now described.

Figure 18:
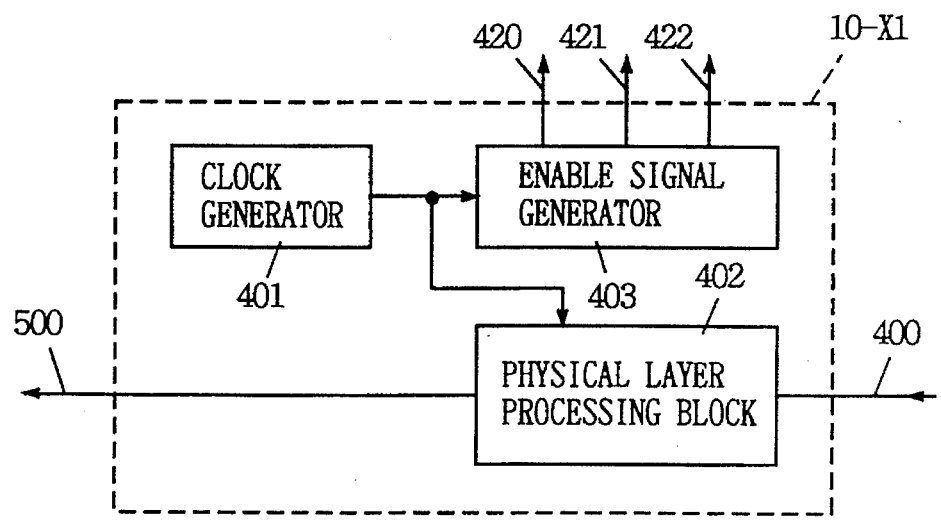
FIG. 18 schematically illustrates the structure of a physical layer transmission block shown in FIG. 17.

FIG. 18 schematically illustrates the structure of the physical layer transmission block 10-X1 shown in FIG. 17. Referring to FIG. 18, the physical layer transmission block 10-X1 includes a clock generator 401 which generates a clock signal providing a timing for transmitting data to the ATM transmission line 500, an enable signal generator 403 which successively generates enable signals to the signal lines 420, 421 and 422 at regular intervals in response to the clock signal received from the clock generator 401, and a physical layer processing block 402 which performs prescribed physical layer processing on ATM cells supplied through the signal line 400 and successively transmits the processed data to the ATM transmission line 500 in response to the clock signal received from the clock generator 401. The enable signal generator 403 comprises a counter, for example, and counts the clock signal received from the clock generator 401, to successively generate the enable signals onto the signal lines 420, 421 and 422 at regular intervals.

Figure 19:
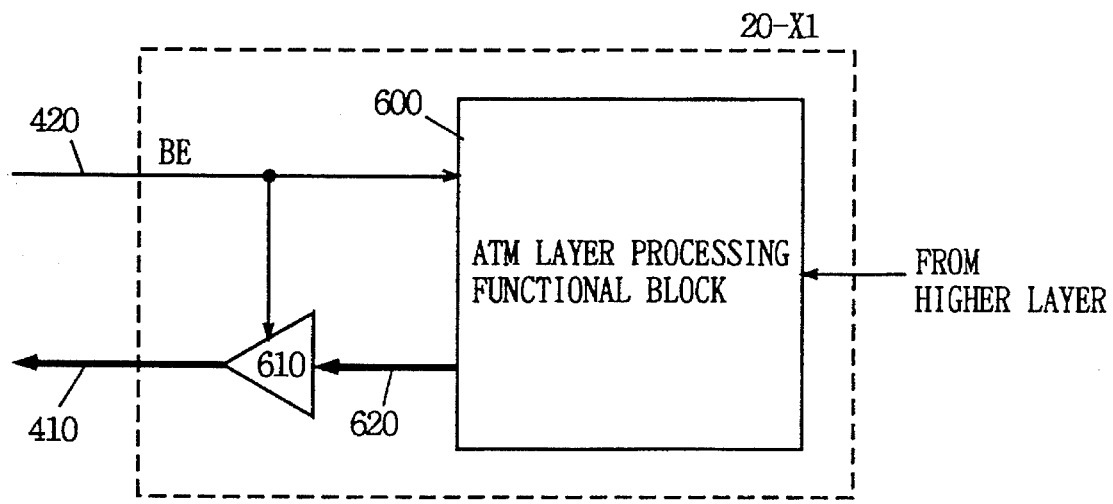
FIG. 19 schematically illustrates the structure of an ATM layer transmission block shown in FIG. 17.

FIG. 19 schematically illustrates the structure of each ATM layer transmission block shown in FIG. 17. This figure typically shows the structure of the ATM layer transmission block 20-X1. The remaining ATM transmission layer blocks 21-X1 and 22-X1 are identical in structure to that shown in FIG. 19. Referring to FIG. 19, the ATM layer transmission block 20-X1 includes an ATM layer processing functional block 600 which is activated in response to the data transmission request from the terminal 5 for performing prescribed ATM layer processing on the data transmitted from the higher layer processing functional block and forming the ATM cells, and an output buffer 610 which is activated in response to the signal supplied to the buffer enable input BE through the signal line 420 for transmitting the ATM cells, which are supplied from the ATM layer processing functional block 600 to a signal line 620, onto the signal line 410. The output buffer 610 is a tri-state buffer which enters an output high impedance state when not activated. The operation is now described.

When an application requests data transmission, the terminal 5 activates the ATM layer transmission block corresponding to the application. When a plurality of applications are executed in parallel with each other in the terminal 5, the ATM layer transmission blocks 20-X1 to 22-X1 are activated in correspondence to the applications.

Figure 20:
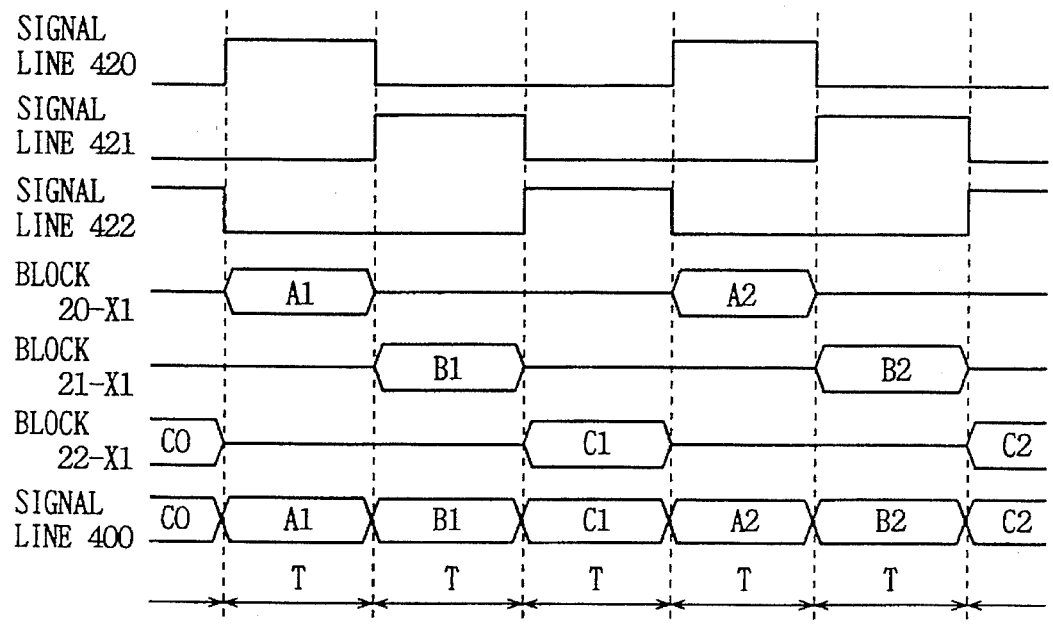
FIG. 20 is a timing chart for illustrating an operation of the protocol processor shown in FIG. 17.

The activated ATM layer transmission block receivers data from the corresponding higher layer processing functional block, and performs ATM layer processing for forming a cell. As shown in FIG. 20, the physical layer transmission block 10-X1 successively generates signals which are activated at regular or common intervals (periods T) onto the signal lines 420, 421 and 422. In each ATM layer transmission block, the ATM layer processing functional block 600 (see FIG. 19) performs prescribed ATM layer processing and forms the ATM cell, to prepare for transmission. The output buffer 610 is activated when the enable signal which is supplied to the buffer enable input BE enters an active state, to transmit the data (ATM cell), supplied from the ATM layer processing functional block 600 onto the signal line 620, onto the signal line 410.

As shown in FIG. 20, the ATM layer transmission blocks 20-X1 to 22-X1 transmit the ATM cells as formed to the signal line 400 when the buffer enable signals supplied through the signal lines 420, 421 and 422 are in active states (high levels in FIG. 20). The ATM layer transmission blocks 20-X1 to 22-X1 are successively activated at common intervals (periods T), so that ATM cell data A1, B1, C1, A2, B2 and C2 are successively transmitted from the ATM layer transmission blocks 20-X1 to 22-X1 to the signal line 400 and transmitted to the physical layer transmission block 10-X1. Also when processing by one application is complicated and requires a long time, transmission data of another application is transferred in response to an enable signal therefor, whereby the application requiring a long time will not bottleneck the communication, and the communication throughput can be improved.

Further, the ATM layer transmission blocks 20-X1 to 22-X1 are in charge of different applications so that processing in the ATM layer is distributed, whereby the ATM layer transmission blocks 20-X1 to 22-X1 may not perform different processing for every cell and the circuit structure is simplified, since the processing contents are fixed to some extent. The types of the cells which are required for the applications executed by the terminal 5 may be identical to or different from each other. The aforementioned effect can be attained regardless of the cell types.

According to the structure of the sixth embodiment, as hereinabove described, the ATM layer transmission blocks 20-X1 to 22-X1 are allocated to different applications so that no ATM layer transmission block is in charge of a plurality of applications, whereby the processing contents of the ATM layer transmission blocks 20-X1 to 22-X1 are simplified to simplify in the circuit structures, while the communication throughput can be improved since the processing in the ATM layer is distributed.

[Embodiment 7]

Figure 21:
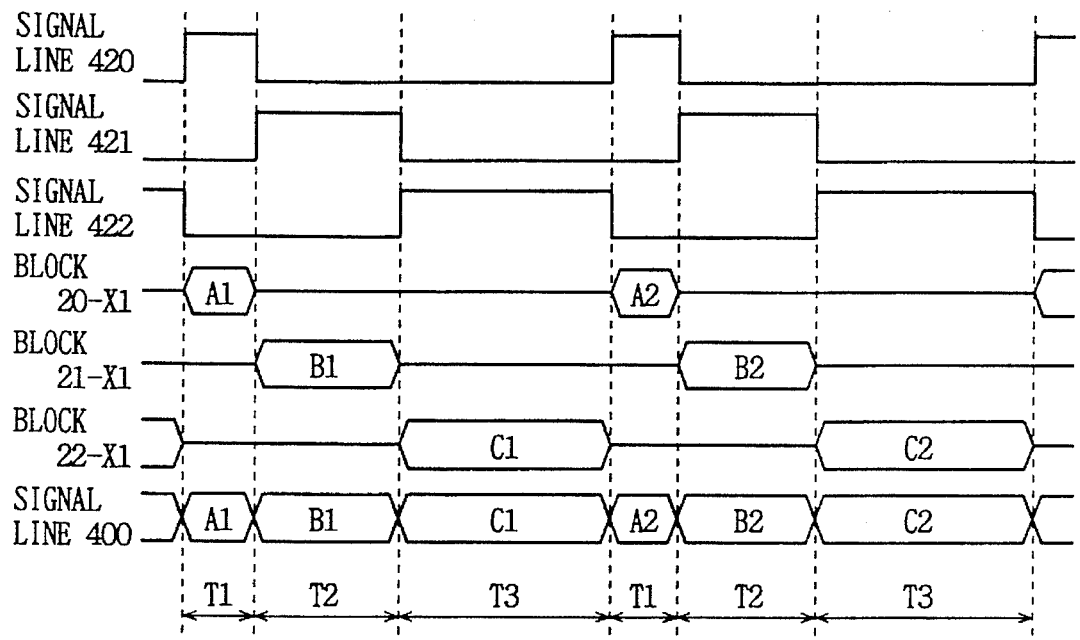
FIG. 21 is a timing chart for illustrating an operation of a protocol processor according to a seventh embodiment of the present invention.

FIG. 21 is a timing chart showing the operation of a protocol processor according to a seventh embodiment of the present invention. In the structure of the protocol processor according to the seventh embodiment, activation periods of enable signals which are transmitted from a physical layer transmission block to a plurality of ATM layer transmission blocks are varied with the ATM layer transmission blocks. Referring to FIG. 21, an ATM layer transmission block 20-X1 is supplied with an enable signal on signal line 420 for a period T1. An ATM layer transmission block 21-X1 receives an enable signal through signal line 421 for a period T2. An ATM layer transmission block 22-X1 is supplied with an enable signal which is in an active state on signal line 422 for a period T3. The signal lines 420, 421 and 422 are successively activated. The structure shown in FIGS. 17 to 19 can be employed for the seventh embodiment. The enable signal generator 403 shown in FIG. 18 successively activates the signal lines 420, 421 and 422 at different intervals in accordance with the clock signal from the clock generator 401.

Bands and quantities of transmission data required by applications requesting data communication may be different from application to application. In image data transmission, it is necessary to transmit broadband data of a large quantity at a high speed. Voice data are at a low speed, in a narrow band and in a small quantity. Thus, data communication quantities of the ATM layer transmission blocks to which applications are allocated may be different from transmission block to transmission block. In this case, it is possible to efficiently carry out data communication by predetermining applications or cell types processed by the respective ATM layer transmission blocks and making the transmission block having a large communication quantity execute data transmission for a longer period. Referring to FIG. 21, the ATM layer transmission block 22-X1 has the largest communication quantity and the longest activation period T3, while the ATM layer transmission block 20-X1 has the smallest communication quantity and the shortest activation period T1, for example.

The operation of the seventh embodiment is substantially identical to that of the sixth embodiment, except that the activation periods T1 to T3 for the ATM layer transmission blocks 20-X1 to 22-X1 are different from each other.

According to the seventh embodiment, it is possible to improve communication efficiency when the quantities of transmitted data are varied with the applications, by previously deciding the activation periods for the ATM layer transmission blocks in accordance with the communication quantities (when there are no valid transmission data, free or vacant cells are transmitted to an ATM transmission line).

[Embodiment 8]

Figure 22:
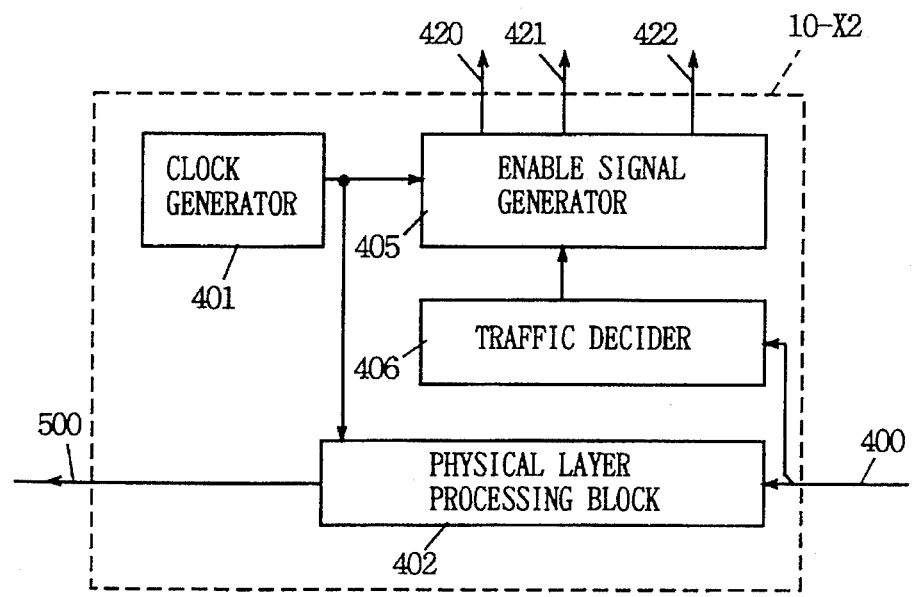
FIG. 22 schematically illustrates the structure of a physical layer transmission block which is employed for a protocol processor according to an eighth embodiment of the present invention.

FIG. 22 illustrates the structure of a protocol processor according to an eighth embodiment of the present invention. This figure shows only the structure of a physical layer transmission block 10-X2. Each ATM layer transmission block is identical in structure to that shown in FIG. 19, while arrangement of the overall device is identical to that shown in FIG. 17.

Referring to FIG. 22, the physical layer transmission block 10-X1 includes a clock generator 401 generating a clock signal deciding the speed for transmitting data to an ATM transmission line 500 and internal operation timings, a physical layer processing block 402 which operates in accordance with the clock signal from the clock generator 401 for performing necessary physical layer processing on ATM cells supplied onto a signal line 400 and transmitting the processed data to the ATM transmission line 500, a traffic decider 406 which extracts flow control information or payload identifying information PT included in header regions of the ATM cells on the signal line 400 for deciding an overcrowded situation of the traffic of the ATM transmission line 500, and an enable signal generator 405 which outputs enable signals on signal lines 420, 421 and 422 in accordance with the clock signal from the clock generator 401 and traffic information from the traffic decider 406. The enable signal generator 405 changes activation periods for the enable signals in accordance with the traffic information from the traffic decider 406 and successively outputs the signals onto the signal lines 420, 421 and 422. More specifically, the activation periods for the enable signals are shortened when data transmission of the ATM transmission line 500 is overcrowded. The operation of the eighth embodiment is now described with reference to a timing chart shown in FIG. 23.

A corresponding ATM layer transmission block is activated in an ATM layer by a transmission request from an application, to execute prescribed ATM layer processing thereby forming an ATM cell. The ATM layer transmission block is in an output high impedance state and holds the ATM cell as formed while an input signal which is supplied to its buffer enable input BE is in an inactive state. In the physical layer transmission block 10-X2, the enable signal generator 405 successively transmits active enable signals to the signal lines 420, 421 and 422 in accordance with the clock signal from the clock generator 401. The ATM layer transmission block which is supplied with the active enable signal transmits the ATM cell onto the signal line 400. The physical layer processing block 402 performs prescribed physical layer processing on the ATM cell received through the signal line 400, and transmits the processed data to the ATM transmission line 500.

The traffic decider 406 extracts flow control information (GFC) or payload type identifying information PT included in the header region from the ATM cell provided on the signal line 400, to decide the communication situation of the ATM transmission line 500. The flow control information (GFC) reflects the communication situation (data flow control information) in a network node (network-to-network interface), while the payload type identifying information PT reflects an overcrowded situation of the network communication. Therefore, the communication situation in the ATM transmission line 500 can be identified through the information GFC and PT.

The enable signal generator 405 adjusts the activation period of the active enable signal in accordance with the result of decision in the traffic decider 406. More specifically, the enable signal generator 405 reduces the activation period when the traffic decider 406 decides that the ATM transmission line 500 is in an overcrowded situation, while increasing the activation period for the enable signal when the traffic decider 406 decides that the ATM transmission line 500 has a room (a number of vacant cells are present).

Figure 23:
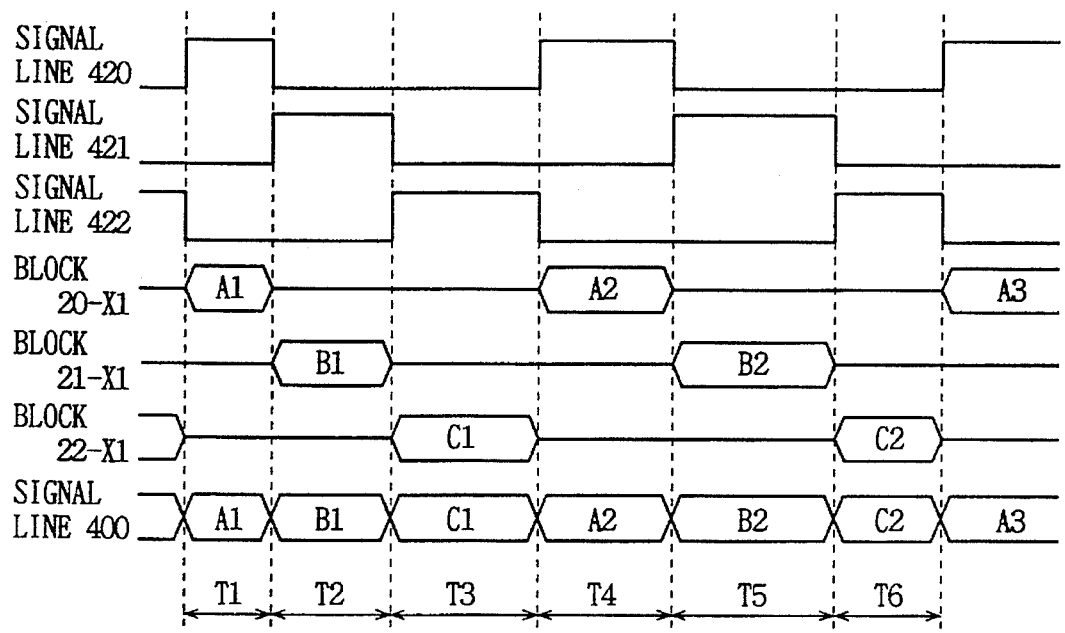
FIG. 23 is a timing chart for illustrating an operation of the protocol processor according to the eighth embodiment of the present invention.

A plurality of stages of values between the minimum value and the maximum value may be previously set for the activation period of the enable signal which is generated from the enable signal generator 405, so that the enable signal generator 405 selects one of the plurality of stages of enable signal activation periods in accordance with the traffic decision information from the traffic decider 406. The communication can be efficiently performed in response to the communication situation in the ATM transmission line 500. FIG. 23 shows such a case that activation periods for enable signals with respect to ATM layer transmission blocks 20-X1, 21-X1 and 22-X1 are successively set at T1, T2, T3, T4, T5 and T6 of different periods. Data transmission can be efficiently performed in response to the communication situation by dynamical changing these activation periods, i.e., the transmission periods for the ATM layer transmission blocks 20-X1 to 22-X1 in terms of time.

The traffic decider 406, which extracts the flow control information or the payload type identifying information from the header region of the ATM cell (may be vacant) on the signal line 400, may alternatively be coupled to a receiving line in the ATM transmission line 500 for extracting traffic information such as presence/absence of overcrowding of the transmission line 500 on the basis of flow control information transmitted from the network node.

According to the structure of the eighth embodiment, as hereinabove described, it is possible to set activation periods for enable signals in response to the quantities of transmission data even if the quantities of the transmission data for a plurality of ATM layer transmission blocks are different from each other (the quantities of the transmission data are reflected in the traffic decision information), thereby improving the communication efficiency. Also when the quantity of transmission data is changed from time to time in a certain ATM layer transmission block, it is possible to adjust the activation period for the enable signal in response to the change of the quantity of transmission data, while improving the communication efficiency.

[Embodiment 9]

Figure 24:
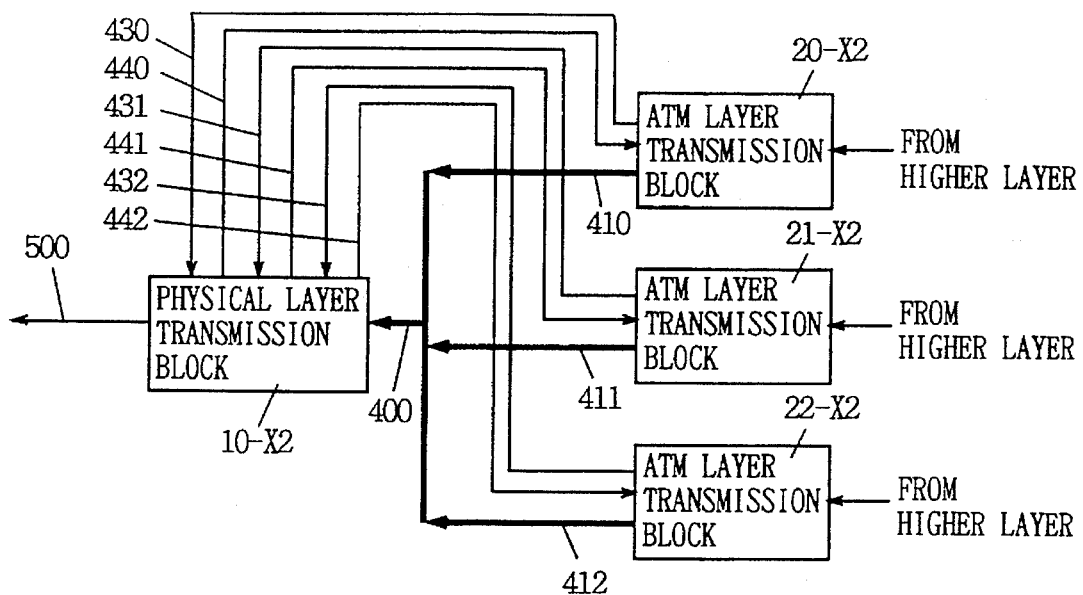
FIG. 24 schematically illustrates the structure of a protocol processor according to a ninth embodiment of the present invention.

FIG. 24 illustrates the structure of a protocol processor according to a ninth embodiment of the present invention. Referring to FIG. 24, the protocol processor comprises a plurality of ATM layer transmission blocks 20-X2, 21-X2 and 22-X2 which are provided in parallel with each other to be in charge of data transmission of different applications, and a physical layer transmission block 10-X2 which carries out prescribed physical layer processing on data (ATM cells) supplied on a signal line 400 and transmits the processed data to an ATM transmission line 500. The ATM layer transmission blocks 20-X2 to 22-X2 transmit transmission request signals through signal lines 430, 431 and 432 respectively, to carry out data transmission when transmission authorization signals are transferred from the physical layer transmission block 10-X2 through signal lines 440, 441 and 442 respectively. When the transmission authorization (enable) signals are supplied from the physical layer transmission block 10-X2, the ATM layer transmission blocks 20-X2 to 22-X2 supply transmission data to the physical layer transmission block 10-X2 through associated signal lines 410, 411 and 412 and a signal line 400. Further, higher layer functional blocks are provided to the ATM layer transmission blocks 20-X2 to 22-X2 respectively, similarly to the structure shown in FIG. 17.

Figure 25:
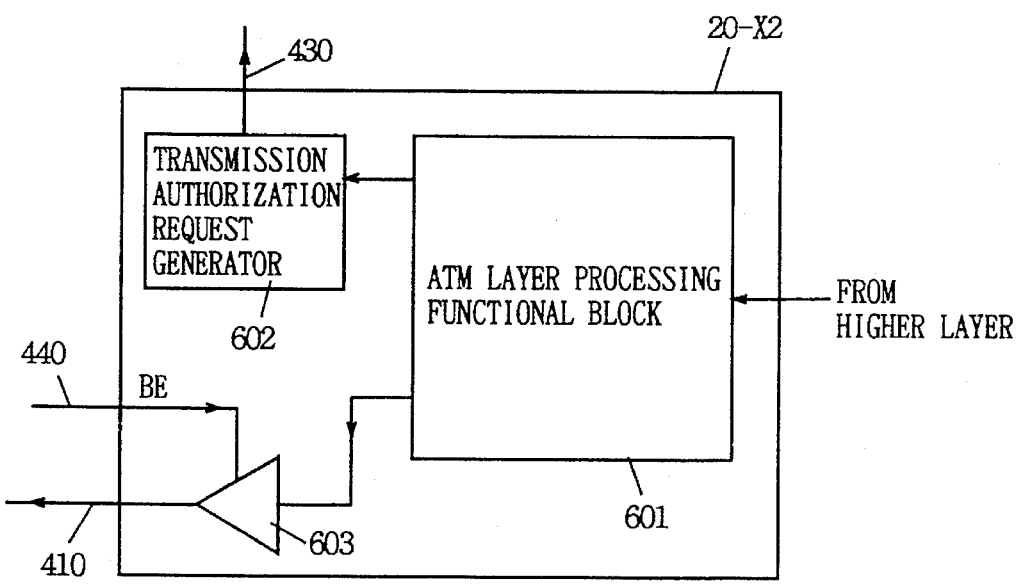
FIG. 25 schematically illustrates the structure of an ATM layer transmission block shown in FIG. 24.

FIG. 25 schematically illustrates the structure of each ATM layer transmission block represented in FIG. 24. The structure of the ATM layer transmission block 20-X2 is representatively shown in FIG. 25. The ATM layer transmission blocks 21-X2 and 22-X2 have structures similar to that of the ATM layer transmission block 20-X2

Referring to FIG. 25, the ATM layer transmission block 20-X2 includes an ATM layer processing functional block 601 for performing prescribed ATM layer processing on transmission data supplied from the higher layer and forming an ATM cell, a transmission authorization request generator 602 for generating a transmission authorization request signal on the signal line 430 in response to a signal indicating that the transmission data from the ATM layer processing functional block 601 is prepared, and tri-state buffer 603 which is activated in response to the transmission enable signal supplied from the physical layer transmission block 10-X2 through the signal line 440 for transmitting the transmission data from the ATM layer processing functional block 601 onto the signal line 410. The tri-state buffer 603 enters an output high impedance state when the enable signal which is supplied to a buffer enable input BE is in an inactive state.

Figure 26:
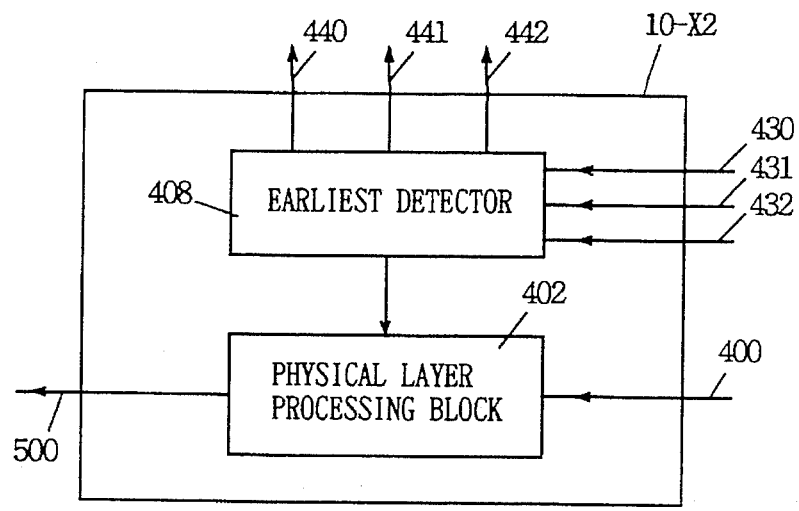
FIG. 26 schematically illustrates the structure of a physical layer transmission block shown in FIG. 24.

FIG. 26 schematically illustrates the structure of the physical layer transmission block 10-X2 shown in FIG. 24. Referring to FIG. 26, the physical layer transmission block 10-X2 includes a physical layer processing block 402 for performing prescribed physical layer processing on data (ATM cells) supplied through the signal line 400 and transmitting the processed data to the ATM transmission line 500, and an earliest detector 408 for detecting the earliest transmission authorization request signal, which is activated at the earliest timing, among the transmission authorization request signals supplied through the signal lines 430, 431 and 432. The earliest detector 408 supplies an active transmission enable signal to the ATM layer transmission block transmitting the earliest transmission authorization request signal. Enable signals for the ATM layer transmission blocks issuing the remaining transmission requests are inactivated. The earliest detector 408 may be formed either by a logic gate or by a processor etc. The operation of the protocol processor according to the ninth embodiment is now described with reference to a timing chart shown in FIG. 27.

An application (not shown) executed in a terminal issues a data transmission request to the ATM layer transmission block (20-X2, 21-X2 or 22-X2) in which the association to the application under execution is previously set. In the ATM layer transmission block receiving the data transmission request, the ATM layer processing functional block 601 executes prescribed ATM layer processing on data supplied from the corresponding higher layer. The ATM layer processing functional block 601 informs the transmission authorization request generator 602 of the fact that transmission data is generated when the prescribed ATM layer processing is completed and the data to be transmitted is formed. The transmission authorization request generator 602 generates a transmission authorization request signal to the physical layer transmission block 10-X2 in response to the signal from the ATM layer processing functional block 601.

Figure 27:
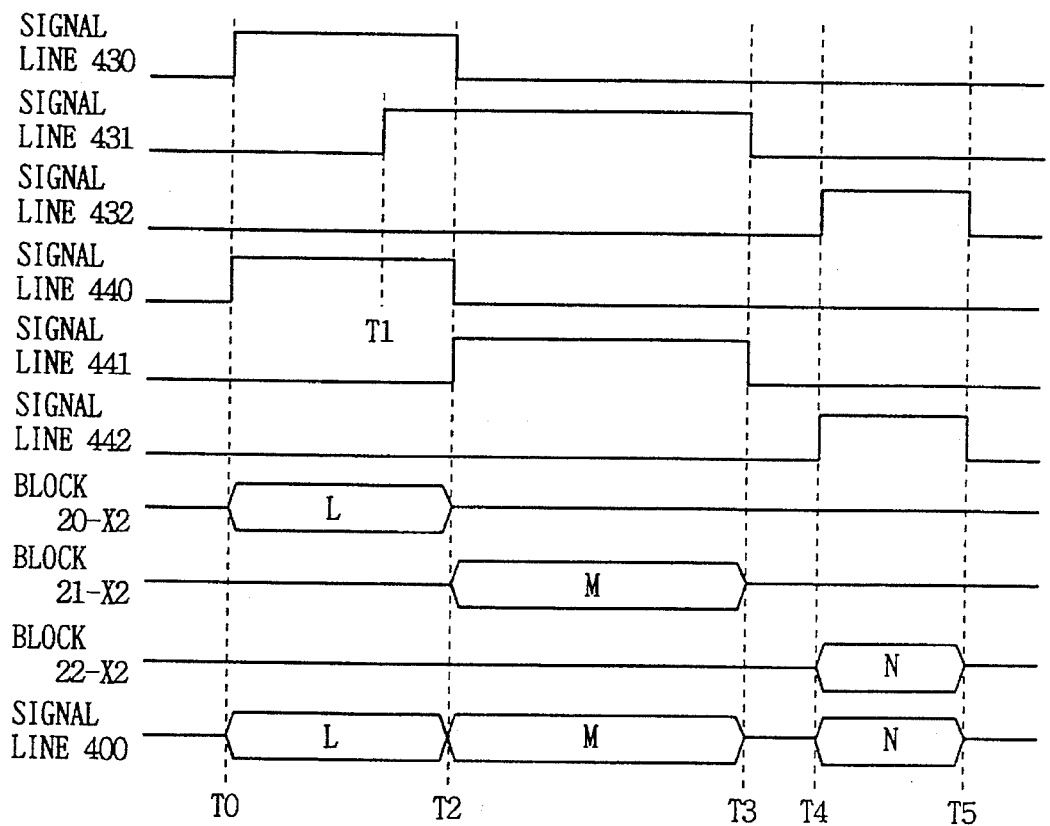
FIG. 27 is a timing chart for illustrating an operation of the protocol processor shown in FIG. 24.

FIG. 27 shows such a state that the ATM layer transmission block 20-X2 generates a transmission authorization request signal on the signal line 430 at a time T0. At this time, the remaining ATM layer transmission blocks 21-X and 22-X2 generate no transmission authorization request signals, and hence the ATM layer transmission block 10-X2 returns a transmission authorization enable signal to the ATM layer transmission block 20-X2 through the signal line 440 in response to the transmission authorization request signal received through the signal line 430. In response to the transmission authorization signal, i.e., the enable signal, supplied through the signal line 440, the tri-state buffer 603 of the ATM layer transmission block 20-X2 is enabled so that the transmission data from the ATM layer processing functional block 601 is transmitted onto the signal line 410 through the signal line 410 and supplied to the physical layer transmission block 10-X2.

On the other hand, the ATM layer transmission block 21-X2 which is supplied with a transmission request from another application executes prescribed ATM layer processing on data from a corresponding higher layer processing functional block, and forms an ATM cell. Upon formation of the data to be transmitted, the ATM layer transmission block 21-X2 supplies the physical layer transmission block 10-X2 with a transmission authorization request signal at a time T1 through the signal line 431. At the time T1, the transmission authorization request signal from the ATM layer transmission block 20-X2 is still in an active state and hence the data (L) from the ATM layer transmission block 20-X2 is supplied to the physical layer transmission block 10-X2. In this state, the transmission authorization request signal which is supplied from the ATM layer transmission block 21-X2 through the signal line 432 is neglected and no transmission authorization signal (no active enable signal) is supplied to the ATM layer transmission block 21-X2. The ATM layer transmission block 21-X2 keeps the transmission authorization request signal in an active state.

The data transmission from the ATM layer transmission block 20-X2 is completed at a time T2, whereby the transmission authorization request signal on the signal line 430 is inactivated and the transmission authorization (enable) signal which is supplied onto the signal line 440 from the physical layer transmission block 10-X2 is also inactivated. At this time, the transmission request signal which is supplied from the ATM layer transmission block 21-X2 onto the signal line 431 is in an active state and hence the physical layer transmission block 10-X2 supplies the transmission authorization signal to the ATM layer transmission block 21-X2 through the signal line 441 in response to the transmission authorization request signal on the signal line 431. Thus, transmission data (M) is transmitted from the ATM layer transmission block 21-X2, and supplied to the physical layer transmission block 10-X2 through the signal line 400.

At a time T3, the data transmission of the ATM layer transmission block 21-X2 is completed and the transmission authorization request signal on the signal line 431 is inactivated. At a time T4, the ATM layer transmission block 22-X2 forms transmission data in accordance with still another application, and outputs a transmission authorization request signal onto the signal line 432. In response to this, the physical layer transmission block 10-X2 supplies an active transmission authorization signal (enable signal) onto the signal line 442, so that transmission data (N) is transmitted from the ATM layer transmission block 22-X2 to the physical layer transmission block 10-X2 through the signal line 400.

The tri-state buffer 603 is in an output high impedance state in inactivation thereof (when the enable signal supplied to the buffer enable input BE is in an inactive state).

According to the structure of the ninth embodiment, data transmission of each ATM layer transmission block is authorized or enabled only when the ATM layer transmission block has data to be transmitted, whereby communication efficiency can be improved. It is also possible to readily cope with such a case that the quantities of data to be transmitted from the ATM layer transmission blocks are not regularly constant but dynamically changed.

[Embodiment 10]

Figure 28:
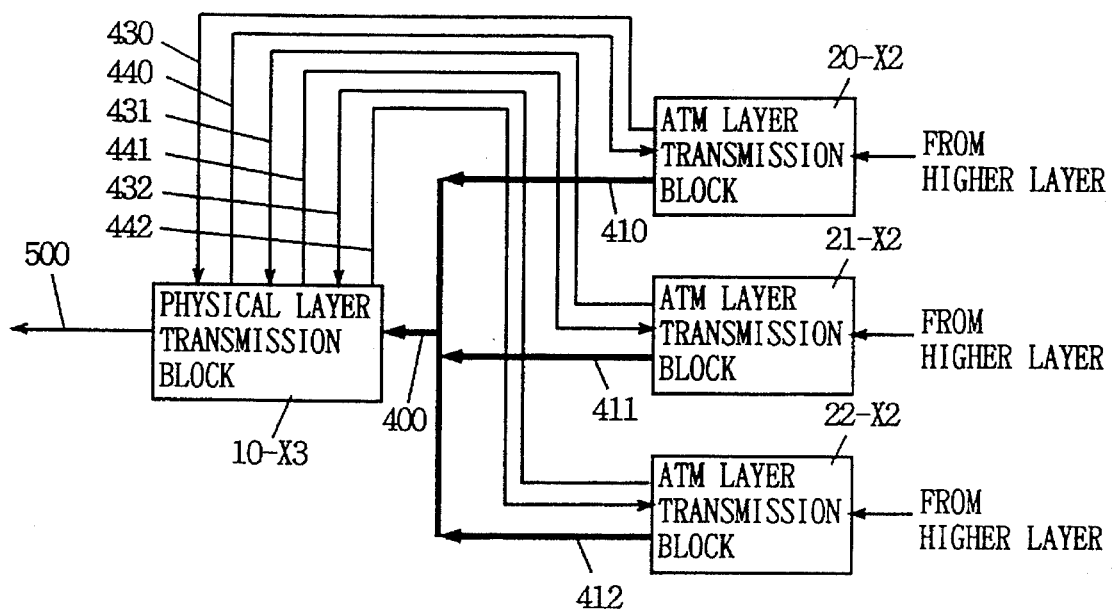
FIG. 28 schematically illustrates the structure of a protocol processor according to a tenth embodiment of the present invention.

FIG. 28 schematically illustrates the structure of a protocol processor according to a tenth embodiment of the present invention. In the structure shown in FIG. 28, priority levels in data transmission are predetermined for ATM layer transmission blocks 20-X2, 21-X2 and 22-X2. When transmission requests are supplied from a plurality of ATM layer transmission blocks, a physical layer transmission block 10-X3 outputs a transmission authorization signal to the one having the highest priority among the ATM layer transmission blocks requesting transmission, in accordance with the previously set priority levels. In the tenth embodiment, only the structure of an enable signal generation part of the physical layer transmission block 10-X3 is different from that of the ninth embodiment described above, and the remaining structure is similar to that of the ninth embodiment.

Figure 29:
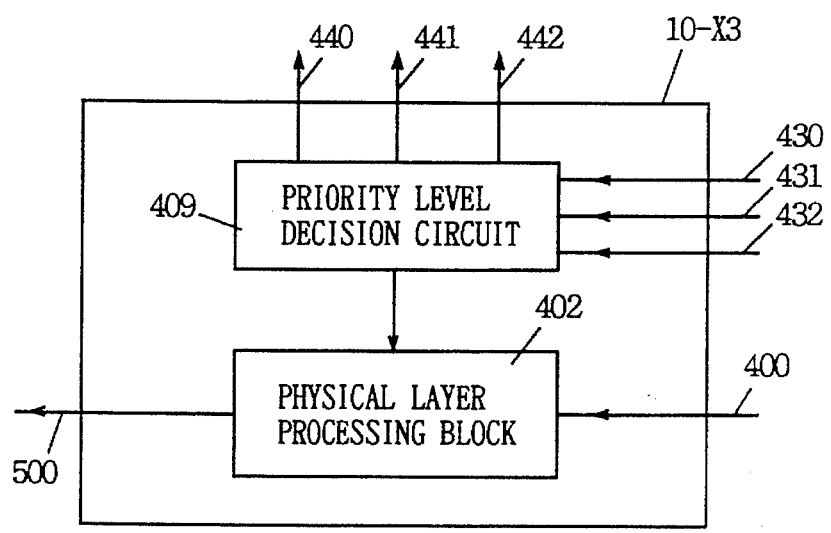
FIG. 29 schematically illustrates the structure of a physical layer transmission block shown in FIG. 28.
Figure 30:
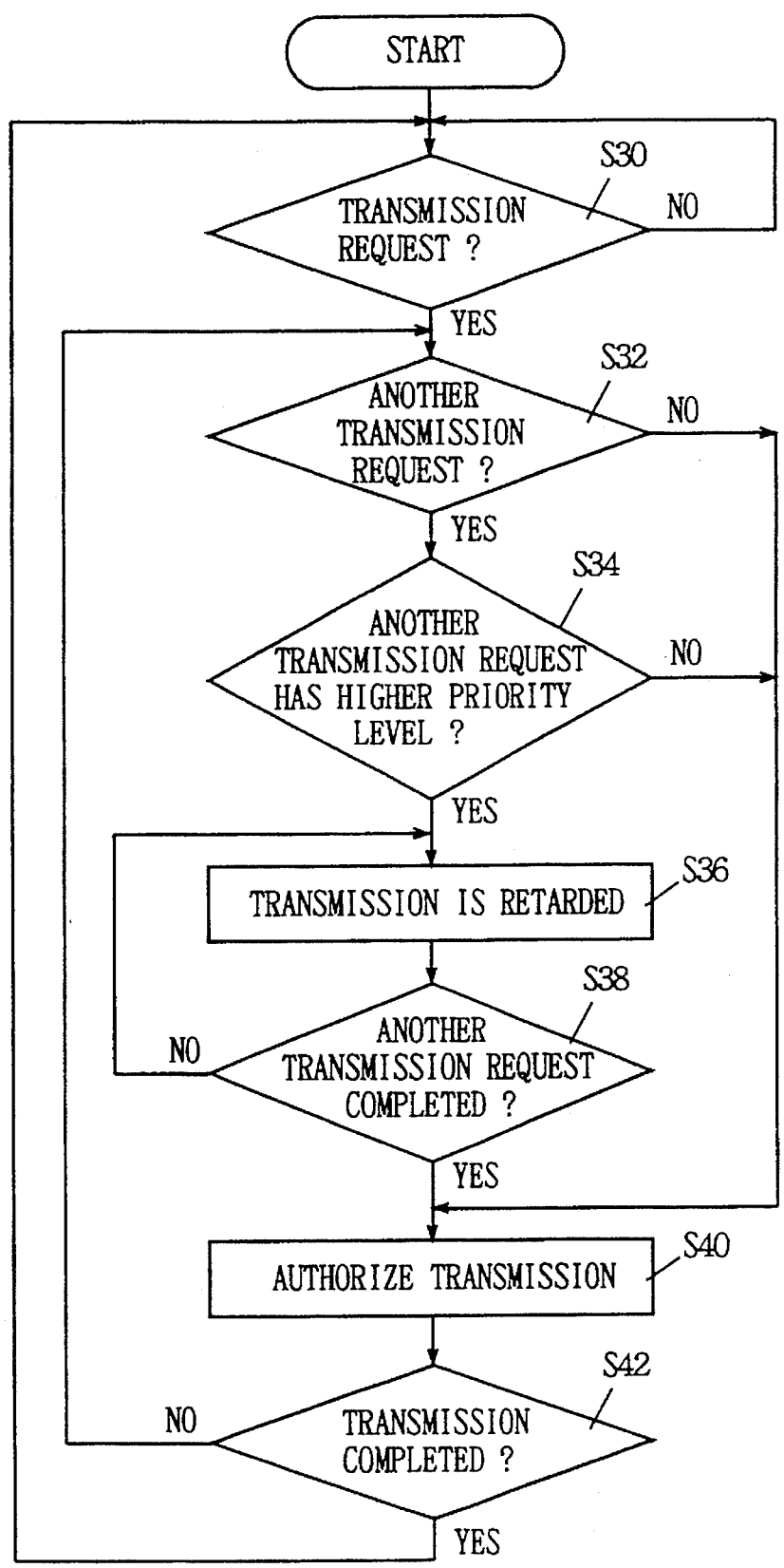
FIG. 30 is a flow chart showing an operation of a priority level decision circuit shown in FIG. 29.

FIG. 29 schematically illustrates the structure of the physical layer transmission block 10-X3 shown in FIG. 28. Referring to FIG. 29, the physical layer transmission block 10-X3 includes a physical layer processing block 402 for performing prescribed physical layer processing on data supplied through signal line 400, and a priority level decision circuit 409 receiving transmission authorization request signals supplied through signal lines 430, 431 and 432 and outputting a transmission authorization signal (enable signal) to any one of the signal lines 440, 441 and 442 in accordance with the previously set priority levels. In transmission of the transmission authorization signal (active enable signal), the priority level decision circuit 409 supplies a signal corresponding to the transmission authorization signal also to the physical layer processing block 402. The physical layer processing block 402 recognizes that valid data (data to be transmitted (ATM cell)) is supplied through the signal line 400 by the signal from the priority level decision circuit 409, executes prescribed physical layer processing on the valid data, and transmits output data to ATM transmission line 500. The priority level decision circuit 409 can be structured by hardware such as a logic gate, or can be implemented by a processor or the like. FIG. 30 shows an operation flow of the priority level decision circuit 409.

FIG. 30 shows the operation flow of the priority level decision circuit 409 with respect to one ATM layer transmission block. First, a determination is made as to whether or not a transmission authorization request signal is received from the corresponding ATM layer transmission block (step S30). The presence/absence of the transmission request is identified by monitoring signals on the signal lines 430, 431 and 432.

When the transmission request is present, i.e., when a transmission authorization request signal is supplied from the corresponding ATM layer transmission block, a determination is made as to whether or not a transmission request is outputted from another ATM layer transmission block (step S321). When no other ATM layer transmission block issues a transmission request (when a transmission authorization request signal is outputted (activated)), a transmission authorization signal is supplied to the corresponding ATM layer transmission block (step S40).

When any ATM layer transmission block supplies a transmission request, on the other hand, a determination is made as to whether or not the priority level of this ATM layer transmission block is higher than that of the corresponding ATM layer transmission block (step S34). If the priority level of the ATM layer transmission block issuing another transmission request is lower than that of the corresponding ATM layer transmission block, the process advances to the step S40, to authorize transmission to the corresponding ATM layer transmission block (transmission authorization signal (active enable signal) is issued). If the priority level of the ATM layer transmission block issuing another transmission request is higher than that of the corresponding ATM layer transmission block, on the other hand, the corresponding ATM layer transmission block has the data transmission retarded (step S36). At this time, the corresponding ATM layer transmission block maintains the transmission authorization request signal in an active state. This block is kept in this transmission standby state until data transmission of the ATM layer transmission block outputting another transmission request having the higher priority level is completed.

When the data transmission of the ATM layer transmission block having the higher priority level is completed, data transmission is authorized for the corresponding ATM layer transmission block (step S38). Then, the process advances to a step S42 to determine whether or not transmission of the corresponding ATM layer transmission block is completed, so that the processing flow of the steps S32 to S38 is executed during data transmission of the corresponding ATM layer transmission block, while the data transmission of the corresponding ATM layer transmission block is retarded when an ATM layer transmission block having a higher priority level issues a transmission request (step S42). When the data transmission of the corresponding ATM layer transmission block is completed, the process returns to the step S30 again, to wait for supply of a new transmission request.

Figure 31:
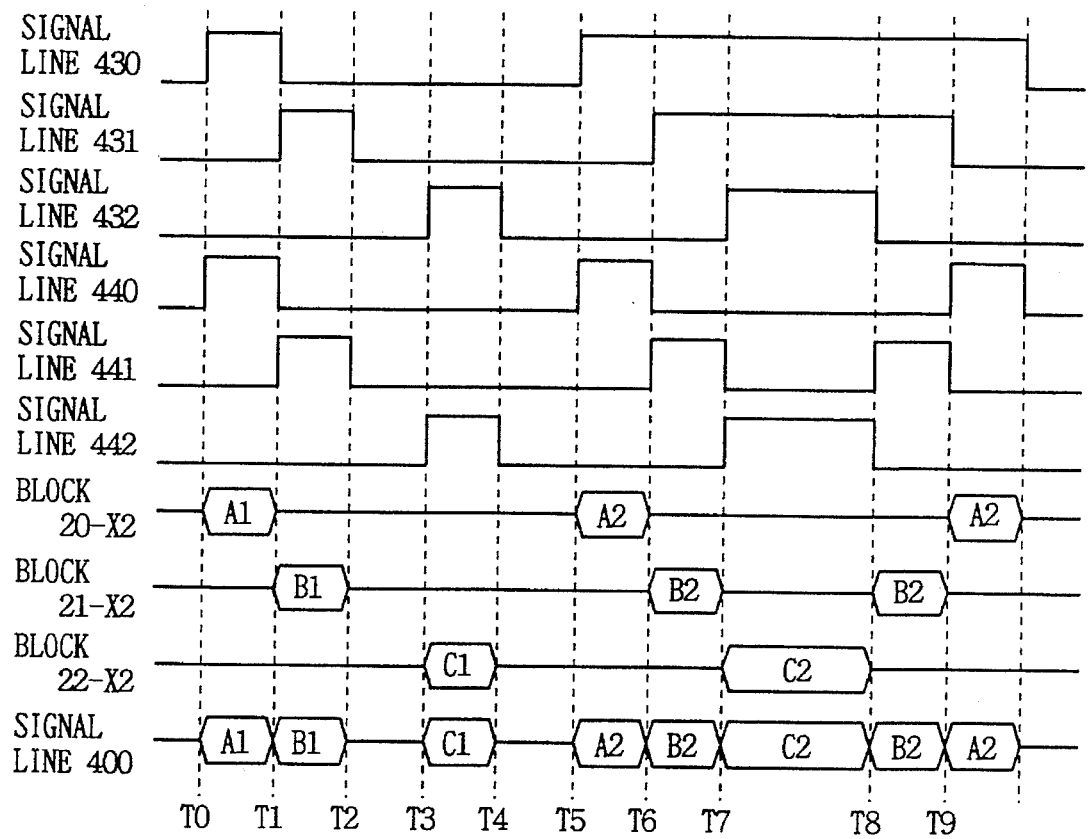
FIG. 31 is a timing chart for illustrating the operation of a protocol processor according to the tenth embodiment of the present invention.

FIG. 31 is a timing chart showing the operation of the protocol processor according to the tenth embodiment of the present invention. The operation of this protocol processor is now described with reference to FIGS. 28, 29 and 31. Referring to FIG. 31, the ATM layer transmission blocks 22-X2, 21-X2 and 20-X2 are assumed to have the highest, intermediate and lowest priority levels, for example.

At a time T0, the ATM layer transmission block 20-X2 issues a transmission request, so that a signal on the signal line 430 is activated. Since the ATM layer transmission block 20-X2 alone issues the transmission request, the physical layer transmission block 10-X2 supplies a transmission authorization signal to the ATM layer transmission block 20-X2 through the signal line 440. The ATM layer transmission block 20-X2 transmits data (A1) to be transmitted to the signal line 400 in accordance with the transmission authorization signal. At a time T1, the ATM layer transmission block 21-X2 issues a transmission request, and is supplied with a transmission authorization signal, to transmit data B1 onto the signal line 400 in response thereto. At a time T3, the ATM layer transmission block 22-X2 issues a transmission request, so that data C1 is transmitted onto the signal line 400 in accordance with a transmission authorization signal which is issued on the signal line 442 in response to the issued request.

At a time T5, the ATM layer transmission block 20-X2 issues a transmission request. Since the ATM layer transmission block 20-X2 alone issues the transmission request, the physical layer transmission block 10-X3 accepts this transmission request so that the ATM layer transmission block 20-X2 transmits data (A2) onto the signal line 400. At a time T6, the ATM layer transmission block 21-X2 transmits a transmission request. The priority level of the ATM layer transmission block 21-X2 is higher than that of the ATM layer transmission block 20-X2 which is currently permitted of data transmission. In this case, the priority level decision circuit 409 shown in FIG. 21 inactivates the transmission authorization signal which is supplied onto the signal line 440, to interrupt the data transmission of the ATM layer transmission block 20-X2. In response to such inactivation of the transmission authorization signal supplied onto the signal line 440, the ATM layer transmission block 20-X2 enters a data transmission wait state. On the other hand, the physical layer transmission block 10-X3 (priority level decision circuit 409) outputs a transmission authorization signal onto the signal line 441 and supplies the same to the ATM layer transmission block 21-X2. The ATM layer transmission block 21-X2 executes data transmission in response to the transmission authorization signal on the signal line 441.

At a time T7, the ATM layer transmission block 22-X2 issues a transmission request (outputs a transmission authorization request signal onto the signal line 432). The priority level of the ATM layer transmission block 22-X2 is higher than that of the ATM layer transmission block 21-X2 which is current in data transmission, and hence the physical layer transmission block 10-X3 (priority level decision circuit 409) inactivates the transmission authorization signal on the signal line 441, and outputs a transmission authorization signal onto the signal line 442. Thus, the ATM layer transmission block 21-X2 is brought into a data transmission wait state, so that the ATM layer transmission block 22-X2 executes data transmission.

The data transmission of the ATM layer transmission block 22-X2 is completed at a time T8, whereby the transmission authorization signal on the signal line 432 is inactivated and the transmission authorization signal on the signal line 442 is also inactivated under control by the priority level decision circuit 409. At this time, the transmission authorization signal which is supplied onto the signal line 431 from the ATM layer transmission block 21-X2 is in an active state, whereby the physical layer transmission block 10-X3 (priority level decision circuit 409) issues a transmission authorization signal to the ATM layer transmission block 21-X2 through the signal line 441. Thus, the ATM layer transmission block 21-X2 kept in the data transmission wait state transmits the remaining data.

The data transmission of the ATM layer transmission block 21-X2 is completed at a time T9, whereby the transmission authorization request signal on the signal line 431 is inactivated. At this time, the ATM layer transmission block 20-X2 has data transmission waited and outputs a transmission authorization request signal on the signal line 430, and hence the physical layer transmission block 10-X3 issues a transmission authorization signal to the ATM layer transmission block 20-X2 waiting for data transmission, through the signal line 440 under control by the priority level decision circuit 409. Thus, the ATM layer transmission block 20-X2 starts the data transmission again.

In order to correctly reproduce time-series data such as voice data and image data, it is necessary to correctly set timing conditions for the respective data. In order to transfer these data in real time, it is necessary to minimize delays caused in data transmission due to halting of data transmission, for example. Therefore, applications requiring strict or severe timing conditions and delay conditions can continuously transmit required transmission data by utilizing ATM layer transmission blocks having high priority levels, whereby it is possible to provide service quality (QOS)

required by the applications having strict timing and delay conditions.

As hereinabove described, it is possible to implement a protocol processor which can provide service quality (QOS) required by applications by providing ATM layer transmission blocks with priority levels so that transmission authorization is given to an ATM layer transmission block having a higher priority level when transmission requests are conflicted.

[Embodiment 11]

Figure 32:
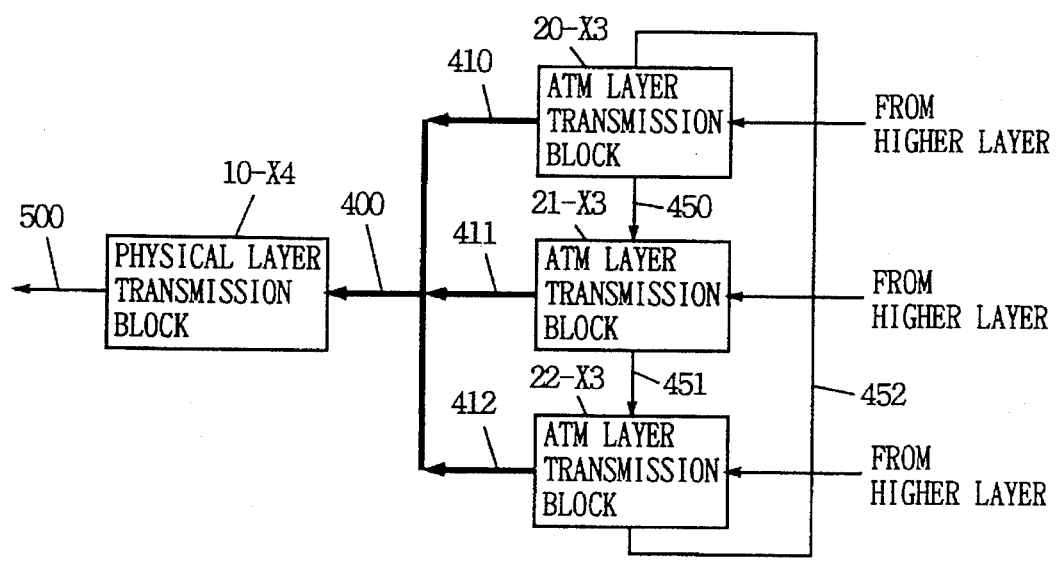
FIG. 32 schematically illustrates the structure of a protocol processor according to an eleventh embodiment of the present invention.

FIG. 32 illustrates the structure of a protocol processor according to an eleventh embodiment of the present invention. The protocol processor shown in FIG. 32 is provided with signal lines 450, 451 and 452 for successively circulating transmission right data through ATM layer processing blocks 20-X3, 21-X3 and 22-X3. The ATM layer processing blocks 20-X3, 21-X3 and 22-X3 execute data transmission processing only when the transmission right data is supplied. The transmission right data from the ATM layer processing block 20-X3 is supplied to the ATM layer processing block 21-X3 through the signal line 450. The transmission right data from the ATM layer processing block 21-X3 is supplied to the ATM layer processing block 22-X3 through the signal line 451. The transmission right data from the ATM layer processing block 20-X3 is supplied to the ATM layer processing block 22-X3 through the signal line 452. The transmission data from the ATM layer processing block 20-X3 is supplied to a physical layer processing block 10-X4 through signal lines 411 and 400. The transmission data of the ATM layer processing block 22-X3 is supplied to the physical layer processing block 10-X4 through a signal line 412 and the signal line 400.

Figure 33:
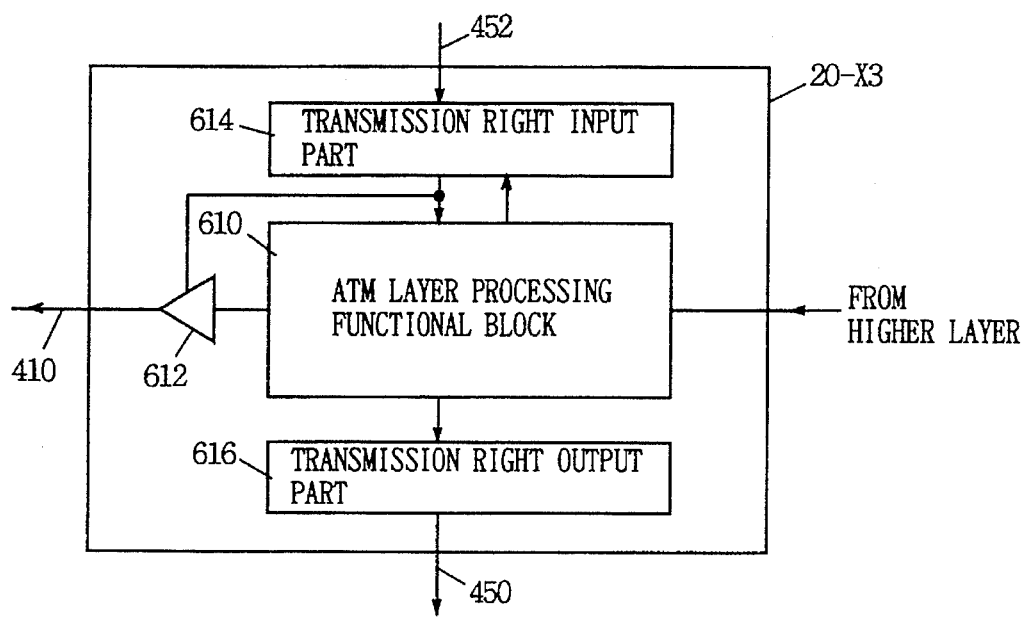
FIG. 33 schematically illustrates the structure of an ATM layer transmission block shown in FIG. 32.

FIG. 33 schematically illustrates the structure of the ATM layer processing block 20-X3 shown in FIG. 32. The ATM layer processing blocks 21-X3 and 22-X3 shown in FIG. 32 have structures similar to that of the ATM layer processing block 20-X3 shown in FIG. 33.

Referring to FIG. 33, the ATM layer processing block 20-X3 includes a transmission right input part 614 which receives the transmission right data supplied through the signal line 452 and generates a transmission enable signal, an ATM layer processing functional block 610 which carries out prescribed ATM layer processing on data supplied from a corresponding processing functional block of a higher layer and generates an ATM cell, a tri-state buffer 612 which is activated by the transmission enable signal from the transmission right input part 614 and transmits the transmission data (ATM cell) received from the ATM layer processing functional block 610, and a transmission right output part 616 which transmits the transmission right data onto the signal line 450 in response to a transmission completion command signal from the ATM layer processing functional block 610.

After completion of the transmission, the ATM layer processing functional block 610 generates a signal for resetting the transmission enable signal to the transmission right input part 614. The transmission enable signal which is generated by the transmission right input part 614 is also supplied to the ATM layer processing functional block 610, which in turn transfers the transmission data to the tri-state buffer 612 in response to the transmission enable signal. The transmission right input part 614, which includes the structure of a set/reset latch, for example, incorporates the transmission right data supplied onto the signal line 452, and persistently brings the transmission enable signal into an active state until the reset signal indicating transmission completion is supplied from the ATM layer processing functional block 610. The tri-state buffer 612 is activated when the transmission enable signal is in an active state, while the former enters an output high impedance state when the latter is in an inactive state.

Figure 34:
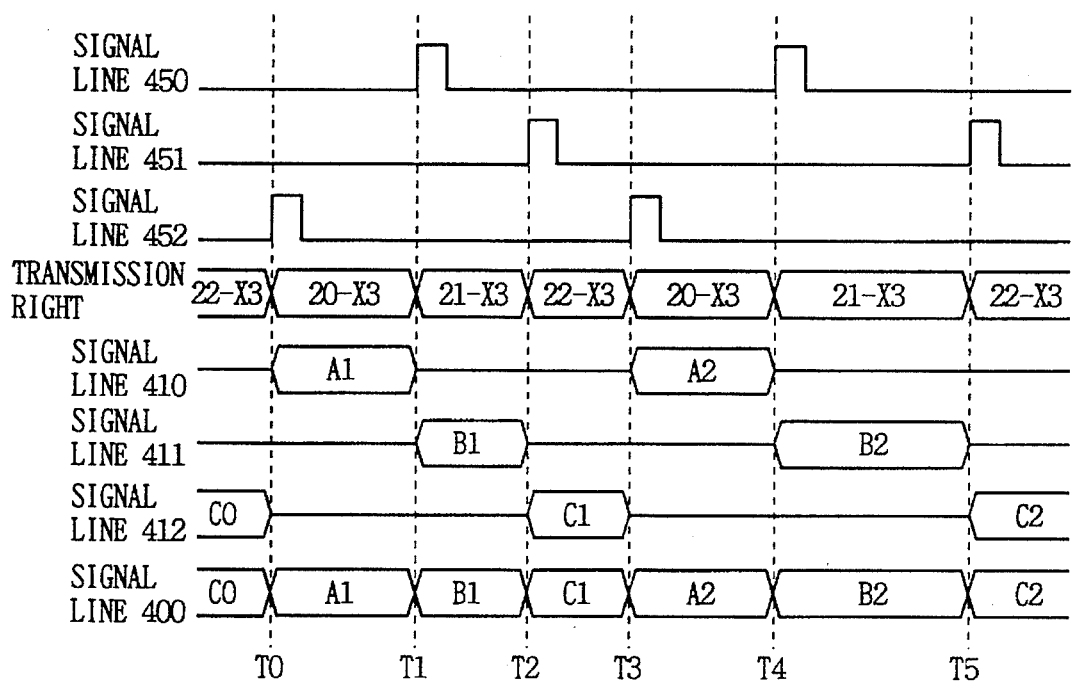
FIG. 34 is a timing chart for illustrating an operation of the protocol processor shown in FIG. 32.

FIG. 34 is a timing chart showing the operation of the protocol processor according to the eleventh embodiment of the present invention. The operation of the protocol processor according to this embodiment is now described with reference to FIGS. 32 to 34.

An application which is under execution issues a data transmission request to a corresponding one of the ATM layer transmission blocks 20-X3 to 22-X3. The ATM layer transmission block receiving the transmission request executes prescribed ATM layer processing on data supplied from a higher layer and generates an ATM cell, to prepare for transmission. The transmission right data is supplied through the signal line 452 at a time T0, whereby the transmission right input part 614 of the ATM layer transmission block 20-X3 generates a transmission enable signal in response to the transmission right data for supply to the tri-state buffer 612 and the ATM layer processing functional block 610. The tri-state buffer 612 is activated to transmit the transmission data supplied from the ATM layer processing functional block 610 onto the signal line 410. When transmission of transmission data (A1) is completed in the ATM layer transmission block 20-X3, the ATM layer processing functional block 610 resets the transmission enable signal from the transmission right input part 614 and supplies the transmission right output part 616 with a signal indicating the transmission completion. The transmission right output part 616 transmits the transmission right data onto the signal line 450 in response to the transmission completion indicating signal from the ATM layer processing functional block 610.

The transmission right of the ATM layer transmission block 21-X3 is established in accordance with the transmission right data which is supplied onto the signal line 450 at a time T1, so that transmission data (B1) is transmitted onto the signal line 411. The transmission is completed at a time T2, and the ATM layer transmission block 21-X3 transmits the transmission right data onto the signal line 451, to transfer the transmission right to the next ATM layer transmission block 22-X3. Thereafter transmission data are successively transmitted to the physical layer processing block 10-X4 through corresponding signal lines to ATM layer transmission blocks supplied with the transmission right data.

The physical layer transmission block 10-X3 carries out prescribed physical layer processing on the data supplied onto the signal line 400 for transmission onto an ATM transmission line 500. In this case, the physical layer transmission block 10-X4 may not generate signals for controlling transmission operations to the ATM layer transmission blocks 20-X3 to 22-X3. Thus, a control load is reduced in the physical layer transmission block 10-X4.

In the eleventh embodiment, as hereinabove described, the transmission right data is circulated through a plurality of ATM layer transmission blocks so that only the ATM layer transmission block receiving the transmission right data executes transmission, whereby the physical layer transmission block 10-X4 may not carry out transmission control with respect to the ATM layer transmission blocks and the control load thereof is reduced.

[Embodiment 12]

Figure 35:
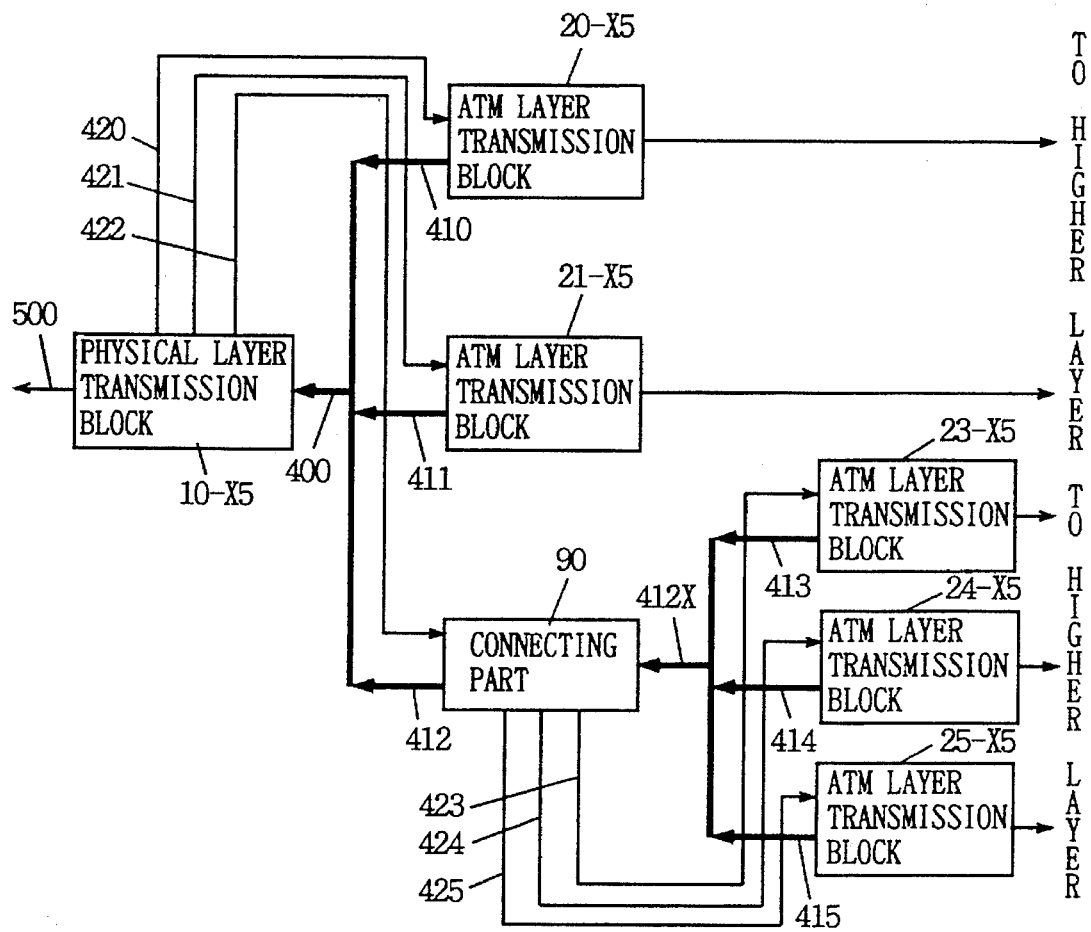
FIG. 35 schematically illustrates the structure of a protocol processor according to a twelfth embodiment of the present invention.

FIG. 35 schematically illustrates the structure of a protocol processor according to a twelfth embodiment of the present invention. Referring to FIG. 35, the protocol processor includes a physical layer transmission block 10-X5, and a plurality of (five in FIG. 35) ATM layer transmission blocks 20-X5, 21-X5, 23-X5, 24-X5 and 25-X5 which transmit transmission data to the physical layer transmission block 10-X5.

The ATM layer transmission blocks 20-X5 and 21-X5 are connected to a signal line 400 through signal lines 410 and 411 respectively. The signal line 400 supplies transmission data to the physical layer transmission block 10-X5. The ATM layer transmission blocks 23-X5, 24-X5 and 25-X5 are connected to a connecting part 90 through signal lines 413, 414 and 415 respectively. A signal line 412 is provided between the signal lines 413, 414 and 415 and the connecting part 90.

The physical layer transmission block 10-X5 periodically issues a transmission authorization signal to the ATM layer transmission blocks 20-X5 and 21-X5 and the connecting part 90 through the signal lines 420, 421 and 422 respectively. The ATM layer transmission blocks 20-X5 and 21-X5 and the connecting part 90 transmit transmission data to the physical layer transmission block 10-X5 through the corresponding signal lines when the transmission authorization signal is supplied from the physical layer transmission block 10-X5.

When the transmission authorization signal is supplied from the physical layer transmission block 10-X5, the connecting part 90 periodically issues a transmission authorization signal to the ATM layer transmission blocks 23-X5, 24-X5 and 25-X5 which are connected thereto through the signal lines 423, 424 and 425 respectively. The ATM layer transmission blocks 20-X5, 21-X5, 23-X5, 24-X5 and 25-X5 have structures which are similar to that shown in FIG. 19, while the physical layer transmission block 10-X5 has a structure which is similar to that shown in FIG. 18.

Figure 36:
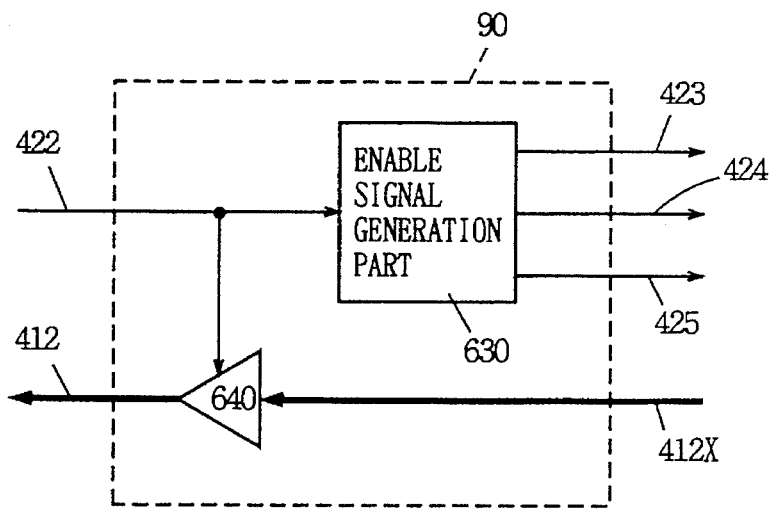
FIG. 36 schematically illustrates the structure of a connecting part shown in FIG. 35.

FIG. 36 illustrates an exemplary structure of the connecting part 90 appearing in FIG. 35. Referring to FIG. 36, the connecting part 90 includes an enable signal generation part 630 which successively issues a transmission authorization signal (active enable signal) onto the signal lines 423, 424 and 425 in response to the transmission authorization signal supplied from the physical layer transmission block 10-X5 through the signal line 422, and a tri-state buffer 640 which is activated in response to the transmission authorization signal supplied onto the signal line 422 and transmits the transmission data supplied on the signal line 412X onto the signal line 412.

Figure 37:
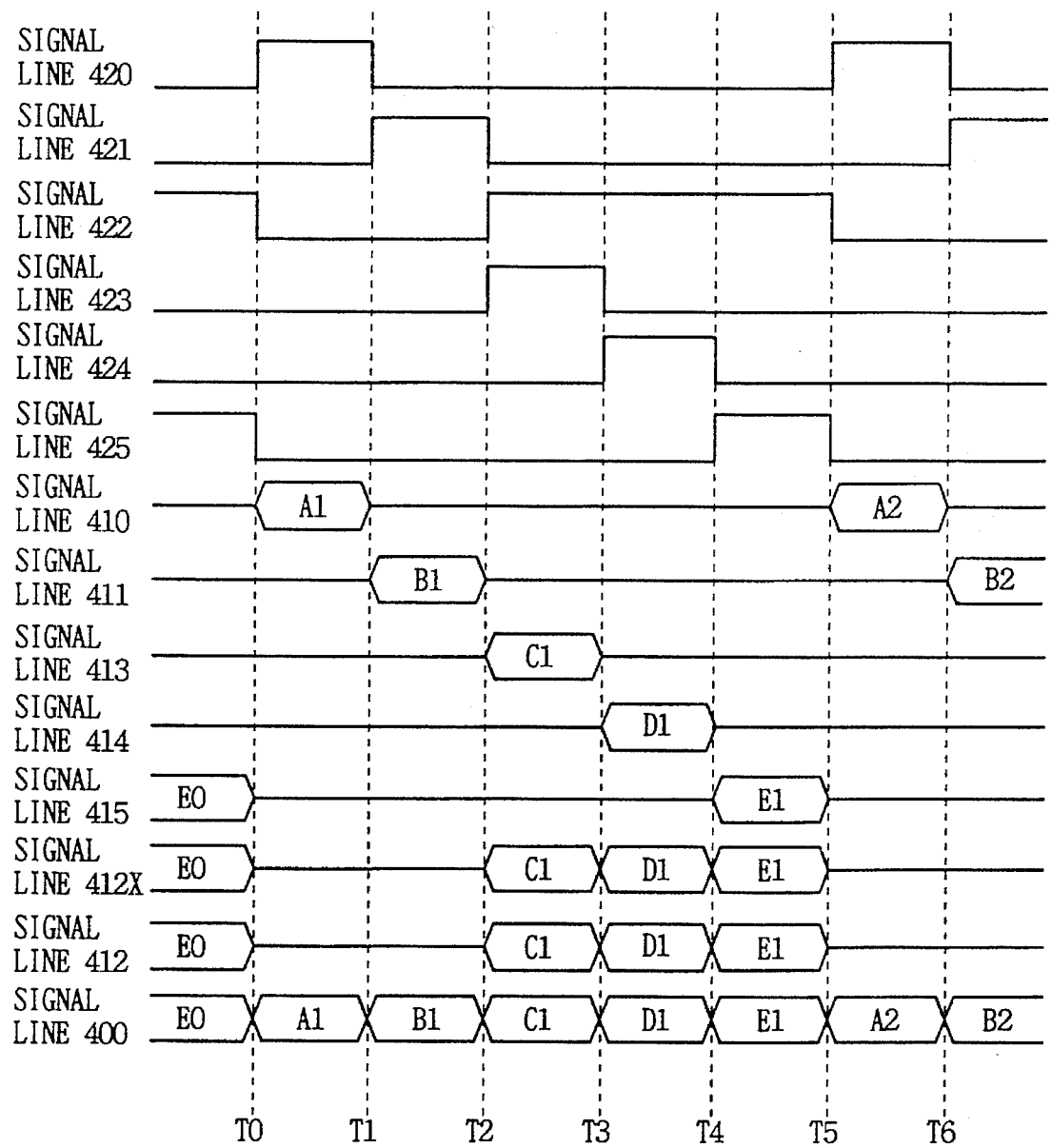
FIG. 37 is a timing chart for illustrating an operation of the protocol processor shown in FIG. 35.

FIG. 37 is a timing chart showing the operation of the protocol processor appearing in FIGS. 35 and 36. The operation of the protocol processor according to the twelfth embodiment of the present invention is now described with reference to FIGS. 35 to 37.

The ATM layer transmission blocks 20-X5, 21-X5, 23-X5, 24-X5 and 25-X5 execute transmission processing in accordance with transmission requests received from previously allocated applications, execute prescribed ATM layer processing on data supplied from higher layers, and generate ATM cells for preparing for transmission. The physical layer transmission block 10-X5 periodically supplies transmission authorization signals at regular intervals through the signal lines 420, 421 and 422. Referring to FIG. 37, the transmission authorization signals are generated for the ATM layer transmission blocks 20-X5 and 21-X5 and the connecting part 90 at times T0, T1 and T2 respectively. When the transmission authorization signals are supplied from the physical layer transmission block 10-X5, the ATM layer transmission blocks 20-X5 and 21-X5 output the generated transmission data to the physical layer transmission block 10-X5.

When the transmission authorization signal is supplied to the connecting part 90 from the physical layer transmission block 10-X5, the connecting part 90 periodically supplies transmission authorization signals to the ATM layer transmission blocks 23-X5, 24-X5 and 25-X5 through the signal lines 423, 424 and 425 respectively. At this time, the tri-state buffer 640 is brought into an output enable state in the connecting part 90 as shown in FIG. 36, to transmit a data signal which is supplied on the signal line 412X onto the signal line 412. When transmission authorization signals are supplied from the connecting part 90 (enable signal generation part 630) to the ATM layer transmission blocks 23-X5, 24-X5 and 25-X5, they supply the transmission data thereof to the connecting part 90. Referring to FIG. 37, the ATM layer transmission blocks 23-X5, 24-X5 and 25-X5 are supplied with the transmission authorization signals at times T2, T3 and T4 respectively. Thus, the physical layer transmission block 10-X5 is successively supplied with the transmission data from the ATM layer transmission blocks 20-X5, 21-X5 and 23-X5 to 25-X5 through the signal line 400.

The activation period for the transmission authorization signal which is supplied to the connecting part 90 from the physical layer transmission block 10-X5 is made longer than those for the transmission authorization signals which are supplied to the ATM layer transmission blocks 20-X5 and 21-X5 from the physical layer transmission block 10-X5. Thus, the ATM layer transmission blocks 20-X5, 21-X5 and 23-X5 to 25-X5 are authorized of transmission for a common time duration, to be capable of executing transmission.

In the timing chart shown in FIG. 37, the time periods of all transmission authorization signals for the ATM layer transmission blocks 20-X5, 21-X5 and 23-X5 to 25-X5 are equal to each other. Alternatively, the ATM layer transmission blocks 20-X5, 21-X5 and 23-X5 to 25-X5 may be authorized of transmission for different time periods (see FIG. 21).

[Modification]

Figure 38:
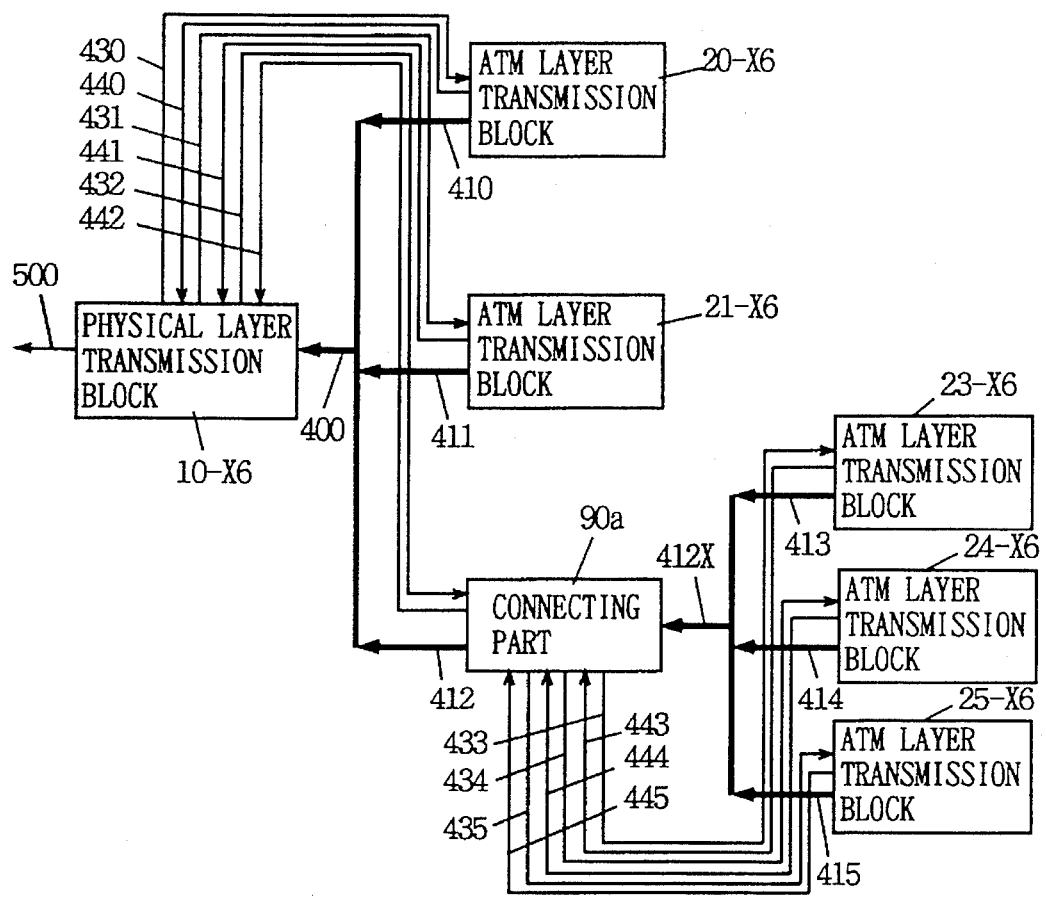
FIG. 38 schematically illustrates the structure of a protocol processor according to a modification of the twelfth embodiment of the present invention.
Figure 39:
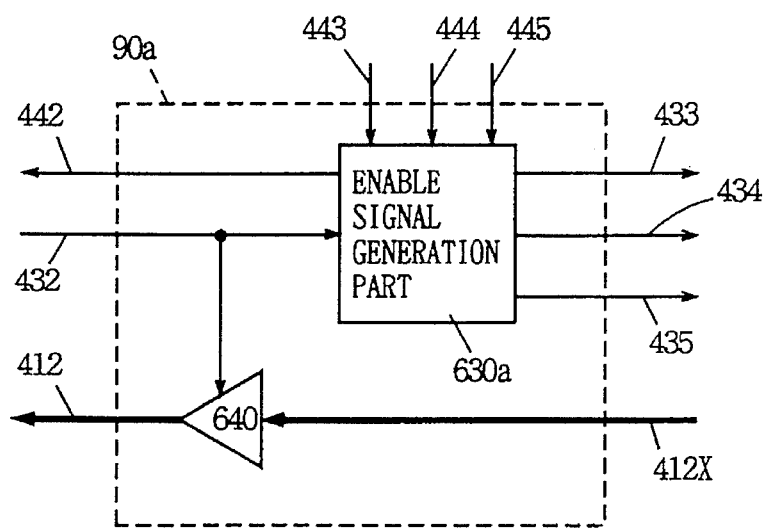
FIG. 39 schematically illustrates the structure of a connecting part shown in FIG. 38.

FIG. 38 illustrates the structure of a modification of the protocol processor according to the twelfth embodiment of the present invention. In the structure shown in FIG. 38, transmission authorization request signals and transmission authorization signals are transferred between a physical layer transmission block 10-X6 and ATM layer transmission blocks 20-X6, 21-X6, 23-X6, 24-X6 and 25-X6. A connecting part 90a is provided between the physical layer transmission block 10-X6 and the ATM layer transmission blocks 23-X6 to 25-X6. The structure of the physical layer transmission block 10-X6 is identical to that shown in FIG. 26 or 29. The structures of the ATM layer transmission blocks 20-X6, 21-X6, 23-X6, 24-X6 and 25-X6 are identical to that shown in FIG. 25. FIG. 39 shows the structure of the connecting part 90a.

Referring to FIG. 39, the connecting part 90a includes an enable signal generation part 630a which transmits a transmission authorization request signal to the physical layer transmission block 10-X6 in response to transmission authorization request signals received from the ATM layer transmission blocks 23-X6 to 25-X6 through signal lines 443, 444 and 445, makes a determination as to onto which one of ATM layer transmission blocks 23-X6 to 25-X6 a transmission authorization signal should be supplied in accordance with a prescribed rule in response to the transmission authorization request signals on the signal lines 443 to 445, and transmits the transmission authorization signal to the determined one of the signal lines 433, 434 and 435 in accordance with the previously set rule when a transmission authorization signal is received from the physical layer transmission block 10-X6 through the signal line 432, and a tri-state buffer 640 which is brought into an output enable state in response to the transmission authorization signal received through the signal line 432.

The transmission authorization signal which is supplied onto the signal line 442 can be formed by wired-OR connecting the signal lines 443 to 445. In order to transmit a transmission authorization signal from the enable signal generation part 630a to any of the signal lines 433, 434 and 435, a determination may be made as to which ATM layer transmission block should have the transmission authorization signal transmitted in accordance with the prescribed rule (decided along the earliest transmission request signal or a prescribed priority level) in response to the signals supplied to the signal lines 443, 444 and 445, and the transmission authorization signal is transmitted to the corresponding ATM layer transmission block in accordance with the result of the determination when the transmission authorization signal is supplied through the signal line 432. The operation is now briefly described.

The ATM layer transmission blocks 20-X6, 21-X6 and 23-X6 to 25-X6 issue transmission authorization request signals when the they generate transmission data (ATM cells) in accordance with the associated applications. The physical layer transmission block 10-X6 receives the transmission authorization request signals through the signal lines 430, 431 and 432, make a determination with the prescribed rule (earliest one or that having the highest priority level) and transmits the transmission authorization signal onto a corresponding one of the signal lines 440 to 442 in accordance with the result of the determination. When the ATM layer transmission block 20-X6 or 21-X6 is supplied with the transmission authorization signal, this ATM layer transmission block transmits transmission data to the physical layer transmission block 10-X6. When the transmission authorization signal is supplied to the connecting part 90a through the signal line 432, on the other hand, the enable signal generation part 630a of the connecting part 90a transmits a transmission authorization signal to a corresponding ATM layer transmission block through one of the signal lines 433 to 435 in accordance with the prescribed rule (earliest one or that having the highest priority level).

In the embodiment utilizing the connecting part 90a as described above, another structure of successively circulating transmission right data or the like is also applicable, as a matter of course.

According to the twelfth embodiment, where ATM layer transmission blocks are provided in a large number, the use of cascade-connection through the connecting part 90a reduces the number of ATM layer transmission blocks connected to a single signal line, so that the load accompanying this signal line is reduced and the data can be transmitted at a high speed. Further, the number of the applications is increased due to the cascade connection of the ATM layer transmission blocks by the connecting part 90a, whereby the device can be readily expanded even when additional ATM layer transmission blocks are required. The structure for expanding the transmission part is also applicable to expansion of a receiving part.

[Embodiment 13]

Figure 40:
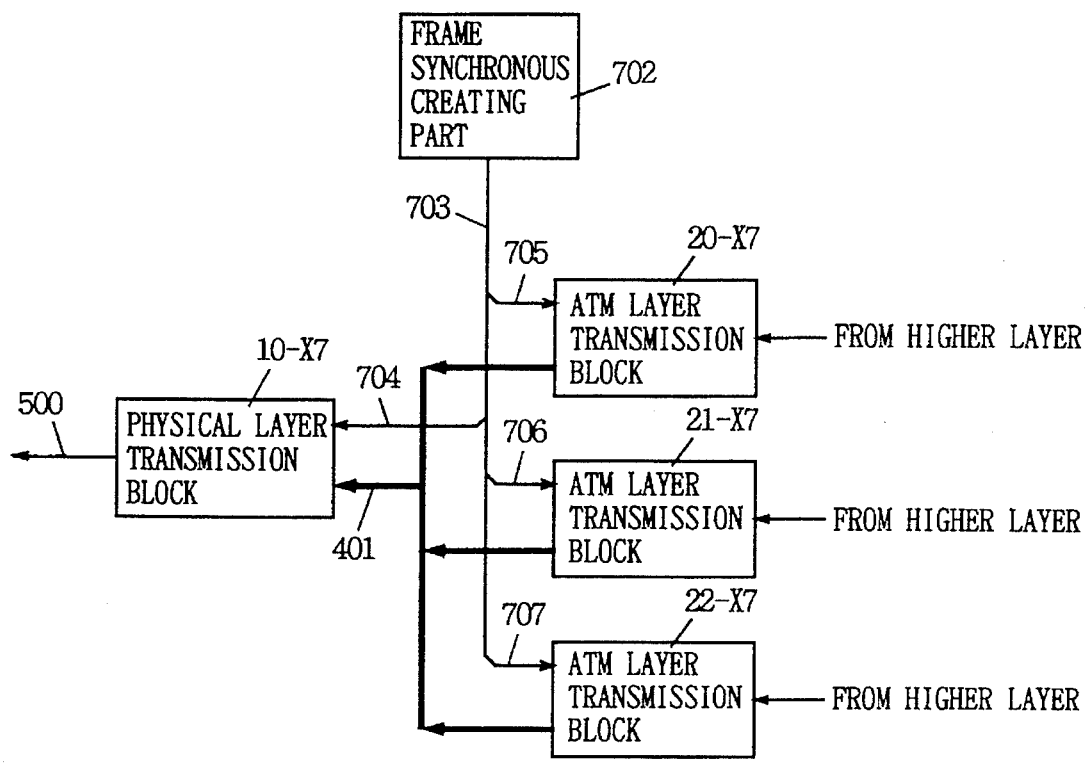
FIG. 40 schematically illustrates the structure of a protocol processor according to a thirteenth embodiment of the present invention.

FIG. 40 illustrates the structure of a protocol processor according to a thirteenth embodiment of the present invention. Referring to FIG. 40, the protocol processor includes ATM layer transmission blocks 20-X7, 21-X7 and 22-X7 which are started by different applications for executing prescribed ATM layer processing on data supplied from higher layers (corresponding higher layer processing functional blocks) upon starting thereof, a physical layer transmission block 10-X7 which carries out prescribed physical layer processing on signals received from the plurality of ATM layer transmission blocks 20-X7 to 22-X7 through a signal line 401 and transmits the same to an ATM transmission line 500, and a frame synchronous creating part 702 which creates a frame synchronizing signal for supplying the same to the physical layer transmission block 10-X7 while successively activating the ATM layer transmission blocks 20-X7 to 22-X7 in synchronization with the frame synchronization signal. The frame synchronization signal which is created in the frame synchronous creating part 702 is supplied to the ATM layer transmission blocks 20-X7 to 22-X7 and the physical layer transmission block 10-X7 through a bus 703. The physical layer transmission block 10-X7 is supplied with the frame synchronizing signal defining one frame through a signal line 704. The ATM layer transmission block 20-X7 is supplied not only with the frame synchronizing signal but also with an enable signal for activating the ATM layer transmission block 20-X7 through a signal line 705. The ATM layer transmission block 21-X7 is supplied not only with the frame synchronizing signal but also with an enable signal for activating the ATM layer transmission block 21-X7 from the bus 703 through a signal line 706. The ATM layer transmission block 22-X7 is supplied not only with the frame synchronizing signal but also with all enable signal for activating the ATM layer transmission block 22-X7 through a signal line 707. The ATM layer transmission blocks 20-X7 to 22-X7 output transmission data onto the signal line 401 only when the same are supplied with the enable signals from the frame synchronous creating part 702. When the enable signals are in inactive states, the ATM layer transmission blocks 20-X7 to 22-X7 are brought into output high impedance states.

Figure 41:
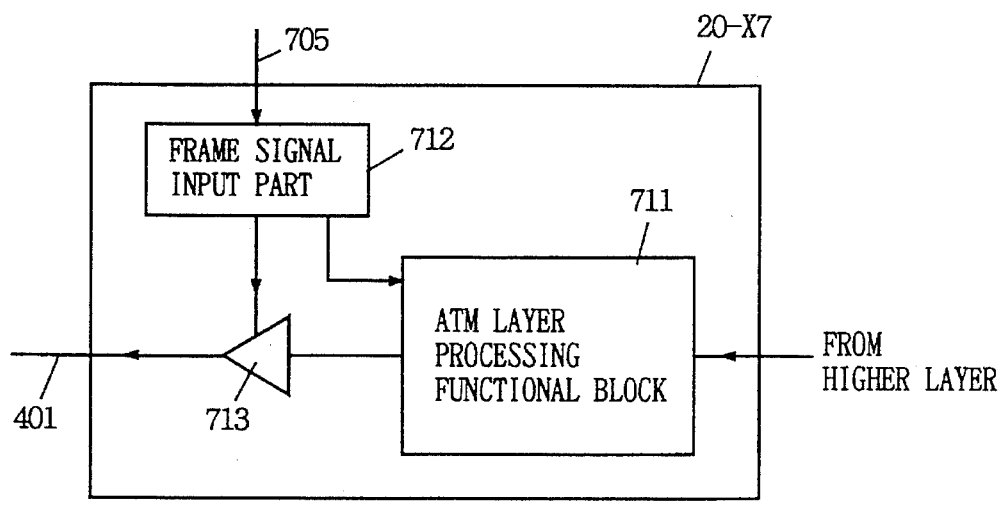
FIG. 41 schematically illustrates the structure of an ATM layer transmission block shown in FIG. 40.

FIG. 41 illustrates an exemplary structure of the ATM layer transmission block 20-X7 shown in FIG. 40. The ATM layer transmission blocks 21-X7 and 22-X7 have structures which are similar to that of the ATM layer transmission block 20-X7 shown in FIG. 41.

Referring to FIG. 41, the ATM layer transmission block 20-X7 includes a frame signal input part 712 which receives the frame synchronizing signal and the enable signal synchronized with the synchronizing signal supplied through the signal line 705 for generating an internal enable signal and an internal frame synchronizing signal, an ATM layer processing functional block 711 which operates in synchronization with the frame synchronizing signal received from the frame signal input part 712 for performing prescribed ATM layer processing on data supplied from a corresponding processing functional block of a higher layer and forming an ATM cell and preparing for transmission thereof, and a tri-state buffer 713 which is brought into an output enable state in response to the internal enable signal from the frame signal input part 712 for outputting the data (ATM cell) to be transmitted from the ATM layer processing functional block 711 onto the signal line 401.

It is possible to multiplex as-formed ATM cells in synchronization with the frame synchronizing signal by supplying the ATM layer processing functional block 711 with the frame synchronizing signal from the frame signal input part 712, thereby simplifying creation of the frame data. The tri-state buffer 713 is brought into an output enable state when the internal enable signal from the frame signal input part 712 is in an active state, while the former is brought into an output high impedance state when the latter is in an inactive state.

Figure 42:
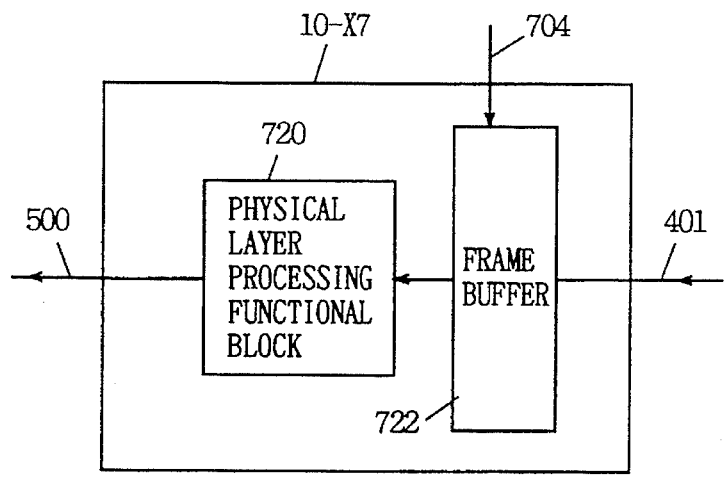
FIG. 42 schematically illustrates the structure of a physical layer transmission block shown in FIG. 40.

FIG. 42 illustrates the structure of the physical layer processing block 10-X7 shown in FIG. 40. Referring to FIG. 42, the physical layer transmission block 10-X7 includes a frame buffer 722 which incorporates the data supplied through the signal line 401 for forming frame type data in accordance with the frame synchronizing signal received through the signal line 704, and a physical layer processing functional block 720 which receives the data from the frame buffer 722 for executing prescribed physical layer processing. The data processed by the physical layer processing functional block 720 is transmitted to the ATM transmission line 500. The frame synchronization signal created by the frame synchronous creating part 702 may merely decide the frame period, and actual 8-bit parallel data are transmitted between the ATM layer transmission blocks 20-X7 to 22-X7 and the physical layer transmission block 10-X7 in response to another synchronizing signal (clock signal for transferring byte data (8-bit parallel data) generated from the frame synchronous creating part 702).

Figure 43:
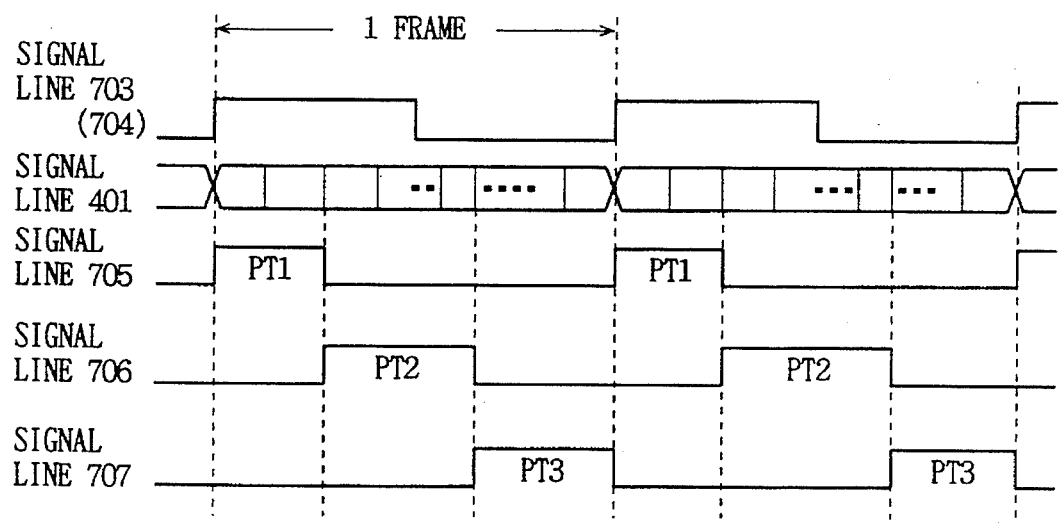
FIG. 43 is a timing chart for illustrating an operation of the thirteenth embodiment of the present invention.

FIG. 43 is a timing chart showing the operation of the thirteenth embodiment. The operation of the thirteenth embodiment according to the present invention is now described with reference to FIGS. 40 to 43.

The frame synchronous creating part 702 generates the frame synchronizing signal which decides one frame period on the bus 703 (and the signal line 704). At this time, the frame synchronous creating part 702 also generates the enable signals which are transmitted to the signal lines 705, 706 and 707 on this bus 703. FIG. 43 shows such an exemplary state that enable signals which are brought into active states for time widths PT1, PT2 and PT3 in one frame period are transmitted to the signal lines 705, 706 and 707 respectively. The ATM layer transmission blocks 20-X7 to 22-X7 successively transmit the transmission data (ATM cells) generated by transmission requests from corresponding applications onto the signal line 401 through the tri-state buffers 713 provided therein. The physical layer transmission block 10-X7 incorporates the data supplied onto the signal line 401 in synchronization with the frame synchronizing signal which in turn is supplied through the signal line 704, to generate frame type data. The physical layer processing functional block 720 receives the incorporated one frame data through the frame buffer 722, executes prescribed physical layer processing thereon, and transmits the processed data to the transmission line 500.

Thus, the data are transmitted from the ATM layer transmission blocks 20-X7 to 22-X7 to the physical layer transmission block 10-X7 in response to the frame synchronizing signal, whereby the physical layer transmission block 10-X7 needs not regularly monitor data bit patterns for identifying the heads of the ATM cells, and the circuit structure is simplified. Further, the use of frame buffer 722 can readily cope with such a case that the speed of the data transmitted from the physical layer transmission block 10-X7 to the transmission line 500 and that of the data transmitted from the ATM layer transmission blocks 20-X7 to 22-X7 are different from each other. When the positions of the head cell can be identified in accordance with the frame synchronizing signal, the head positions of the following cells can be readily identified (ATM cell is fixed-length data of 53 bytes).

According to the structure of the thirteenth embodiment, as hereinabove described, the data are transmitted from the ATM layer transmission blocks 20-X7 to 22-X7 to the physical layer transmission block 10-X7 in the frame system, whereby no structure for identifying the heads of the ATM cells is required in the physical layer transmission block 10-X7, and the circuit structure is simplified. Also when the operating speeds of the ATM layer transmission blocks 20-X7 to 22-X7 and the physical layer transmission block 10-X7 are different from each other, this difference can be readily absorbed by providing the frame buffer 722 in the physical layer transmission block 10-X7. Alternatively, the frame buffer 722 may be provided not in the physical layer transmission block 10-X7 but between the ATM layer transmission blocks 20-X7 to 22-X7 and the physical layer transmission block 10-X7.

The ATM layer transmission blocks 20-X7 to 22-X7 may be activated for the same or different time duration for executing transmission processing under control by the frame synchronous creating part 702.

[Embodiment 14]

Figure 44:
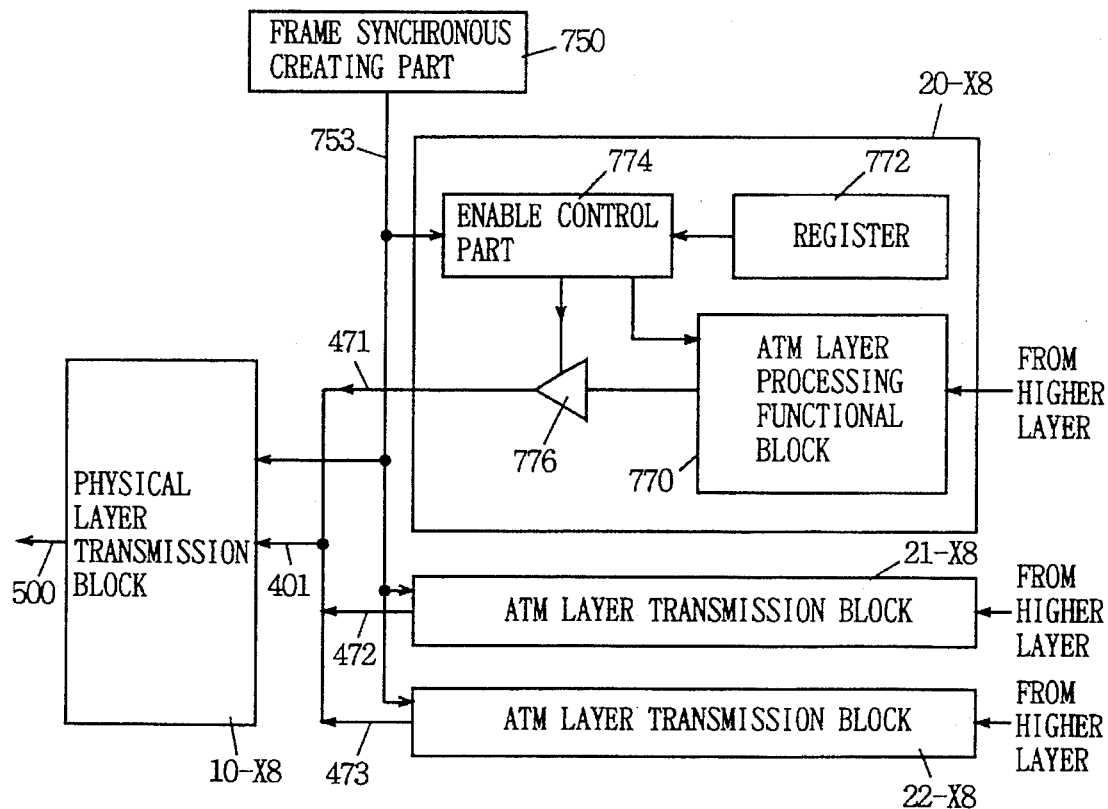
FIG. 44 schematically illustrates the structure of a protocol processor according to a fourteenth embodiment of the present invention.

FIG. 44 illustrates the structure of a protocol processor according to a fourteenth embodiment of the present invention. Referring to FIG. 44, the protocol processor includes a physical layer transmission block 10-X8, a plurality of (three in FIG. 44) ATM layer transmission blocks 20-X8, 21-X8 and 22-X8 which are provided in parallel with each other in correspondence to the physical layer transmission block 10-X8, and a frame synchronous creating part 750 which generates a frame synchronizing signal for deciding data transfer timing between the ATM layer transmission blocks 20-X8 to 22-X8 and the physical layer transmission block 10-X8. The frame synchronous creating part 750 supplies the frame synchronizing signal to the physical layer transmission block 10-X8 and the ATM layer transmission blocks 20-X8 to 22-X8 through a signal line 753.

The structure of the physical layer transmission block 10-X8 is identical to that shown in FIG. 42. The ATM layer transmission blocks 20-X8 to 22-X8 are identical in structure to each other. FIG. 44 illustrates a specific structure of the ATM layer transmission block 20-X8.

The ATM layer transmission block 20-X8 includes an ATM layer processing functional block 770 which executes prescribed ATM layer processing on data supplied from a higher layer, a register 772 which stores information indicating an activation time period (transmission processing executing period) of the ATM layer transmission block 20-X8, an enable control part 774 which generates an enable signal only for a time period corresponding to the information storied in the register 772 in response to the frame synchronizing signal received from the frame synchronous creating part 750, and a tri-state buffer 776 which is activated in response to an active enable signal from the enable control part 774 for transmitting the data received from the ATM layer processing functional block 770 to the physical layer transmission block 10-X8 through signal lines 471 and 401.

The enable control part 774 further supplies a transmission enable signal to the ATM layer processing functional block 770, and informs the ATM layer processing functional block 770 of the fact that data can be transmitted from the tri-state buffer 776. The register 772 stores the information indicating the transmission processing period (processing period for transmitting the data through the tri-state buffer 776) for activating the ATM layer transmission block 20-X8 in one frame period of the frame synchronizing signal received from the frame synchronous creating part 750. As to the storage of the information indicating the activation time period in the register 772, the data may be written from a terminal (not shown), or a DIP switch or the like may be employed so that the user sets the information upon attachment of the protocol processor.

The enable control part 774 includes a counter in its interior and counts a clock signal (not shown) for deciding cell data transfer timing in synchronization with the frame synchronization signal received from the frame synchronous creating part 750, for activating the enable signal during the activation period indicated by the information stored in the register 772. In this case, count values at the start and the end of the activation period may be stored in the register 772 so that the enable signal is activated while the count value at the counter of the enable control part 774 is between the start and end count values. Alternatively, another structure may be utilized.

Figure 45:
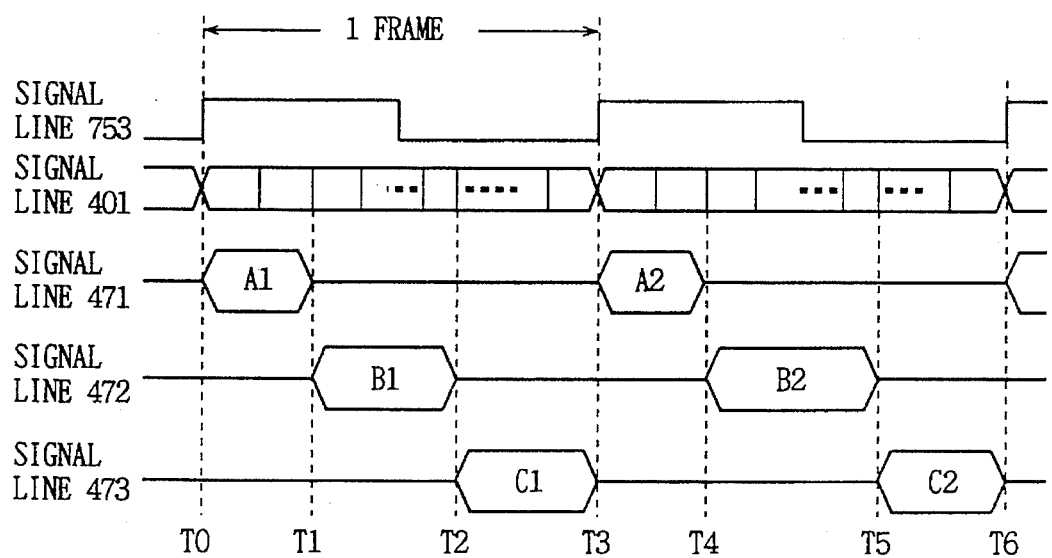
FIG. 45 is a timing chart for illustrating an operation of the device shown in FIG. 44.

FIG. 45 is a timing chart showing the operation of the protocol processor shown in FIG. 44. FIG. 45 illustrates such an exemplary sequence that the ATM layer transmission blocks 20-X8, 21-X8 and 22-X8 are successively activated in this order for transmitting the data. The operation is now described with reference to FIGS. 44 and 45.

In advance of communication, the registers 772 of the ATM layer transmission blocks 20-X8 to 22-X8 previously store information indicating sections (activation periods) of one frame period to be utilized by the associated ATM layer transmission blocks 20-X8 to 22-X8 respectively. In order to store the information, a user may write the information in the registers 772 of the ATM layer transmission blocks 20-X8 to 22-X8 in accordance with the control program (program for initializing the protocol processor) which is independent of the contents of the applications in accordance with correspondence between the ATM layer transmission blocks 20-X8 to 22-X8 and the applications related thereto, or the user may semi-fixedly set the information by a DIP switch or the like upon attachment of the protocol processor, as described above.

The ATM layer transmission blocks 20-X8 to 22-X8 execute prescribed ATM layer processing on data supplied from higher layers in accordance with transmission requests from the corresponding applications, to generate ATM cells.

In each of the ATM layer transmission blocks 20-X8 to 22-X8, the enable control part 774 executes a counting operation in synchronization with the synchronizing signal received from the frame synchronous creating part 750 through the signal line 753, to determine whether or not the period for transmitting the data of this associated ATM layer transmission block is reached. When the transmission period allocated thereto in one frame period is reached, the enable control part 774 generates an enable signal and supplies the same to the tri-state buffer 776 and the ATM layer processing functional block 770. As shown in FIG. 45, the ATM layer transmission block 20-X8 is first authorized for transmission between times T0 and T1 so that the enable control part 774 thereof generates an enable signal and transmission data (ATM cell) is transmitted from the ATM layer transmission block 20-X8 onto the signal line 471 through the tri-state buffer 776. The ATM layer transmission blocks 21-X8 and 22-X8 execute data transmission in a period between times T1 and T2 and in a period between times T2 and T3 respectively. The physical layer transmission block 10-X8 receives the data which are transmitted in a frame system to execute prescribed physical layer processing, and transmits the processed data to the transmission line 502.

According to the fourteenth embodiment of the present invention, as hereinabove described, the data are transmitted from the ATM layer transmission blocks 20-X8 to 22-X8 to the physical layer transmission block 10-X8 in the frame systems, whereby the physical layer transmission block 10-X8 can readily detect the heads of ATM cells and the circuit structure is simplified, in addition to the advantages of improvement in communication efficiency by dispersion of processing due to provision of a plurality of ATM layer transmission blocks 20-X8 to 22-X8 and simplification of the circuit structure

[Embodiment 15]

Figure 46:
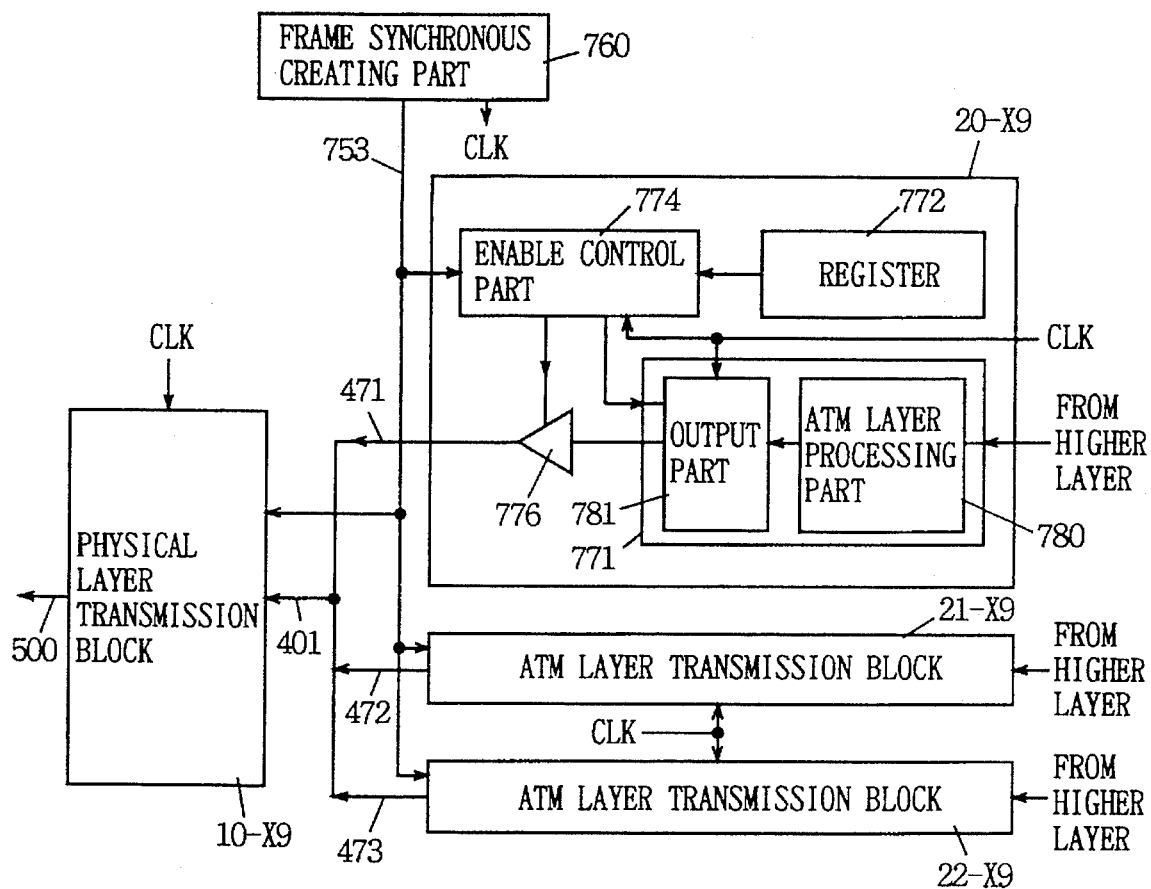
FIG. 46 schematically illustrates the structure of a protocol processor according to a fifteenth embodiment of the present invention.

FIG. 46 schematically illustrates the structure of a protocol processor according to a fifteenth embodiment of the present invention. In the structure of a transmission processing part of the protocol processor shown in FIG. 46, a frame synchronous creating part 760 transmits a frame synchronizing signal for forming frame data on a signal line 753, while the same generates and outputs a clock signal CLK for deciding the speed for transferring the frame type data. The clock signal CLK is set at a speed which is applicable in common to data transfer speeds available at ATM transmission line 500. For example, the speed of the clock signal CLK is equalized with as high a transfer speed as possible among a plurality of data transfer speeds available at the ATM transmission line 500.

The frame synchronizing signal from the frame synchronous creating part 760 is supplied to a physical layer transmission block 10-X9 and ATM layer transmission blocks 20-X9, 21-X9 and 22-X9 through the signal line 753. The clock signal CLK from the frame synchronous creating part 760 is also supplied to the physical layer transmission block 10-X9 and the ATM layer transmission blocks 20-X9, 21-X9 and 22-X9 through a transmission path which is not clearly shown in FIG. 46. The frame synchronizing signal creates frame type data, and the clock signal CLK decides the speed for transferring the data forming the frame. Upon activation thereof, the ATM layer transmission blocks 20-X9 to 22-X9 transmit data (ATM cells) onto signal lines 471, 472 and 473 in synchronization with the clock signal CLK (head and end positions of the frame of the transmission data are decided by the frame synchronizing signal). The physical layer transmission block 10-X9 incorporates the data supplied through a signal line 401 to which the signal lines 471 to 473 are wired-OR connected in synchronization with the clock signal CLK, incorporates frame-unit data, and executes prescribed physical layer processing. Employed for the physical layer transmission block 10-X9 is such a structure that the clock signal CLK is supplied to the frame buffer 722 in the structure shown in FIG. 42 and the frame buffer 722 incorporates and stores the data supplied in synchronization with the clock signal CLK.

The ATM layer transmission blocks 20-X9 to 22-X9 are identical in structure to each other, and FIG. 46 specifically illustrates the structure of the ATM layer transmission block 20-X9. The ATM layer transmission block 20-X9 includes a register 772 which stores information indicating an activation period in one frame, an enable control part 774 which generates an enable signal indicating that transmission processing must be executed in accordance with the frame synchronization signal, the clock signal CLK and the information stored in the register 772, an ATM layer processing functional block 771 which executes prescribed ATM layer processing and outputs the processed data in accordance with the enable signal from the enable control part 774 and the clock signal CLK, and a tri-state buffer 776 which is brought into an output enable state in response to the enable signal from the enable control part 774 for successively outputting data from the ATM layer processing functional block 771 onto the signal line 471.

The enable control part 774 counts the clock signal CLK in response to the frame synchronizing signal which is supplied from the frame synchronous creating part 760 to the signal line 753, and generates an enable signal when the count value for the clock signal CLK reaches that indicating the activation period stored in the register 772.

The ATM layer processing functional block 771 includes an ATM layer processing part 780 which is started in response to a transmission request from the application (not shown) for executing prescribed ATM layer processing on data received from a higher layer and generating data (ATM cell) to be transmitted, and an output part 781 which is started in response to the enable signal from the enable control part 774 for outputting processed data received from the ATM layer processing part 780 and supplying the same to the tri-state buffer 776 in synchronization with the clock signal CLK. The ATM layer processing part 780 executes the processing at the same speed as the transfer speed of the transmission data from the application (not shown), i.e., the data transfer speed of the ATM transmission line 500. The output part 781 also has a function of a buffer for absorbing speed difference when the operating speed of the ATM layer processing part 780 is different from the speed of the clock signal CLK.

Figure 47:
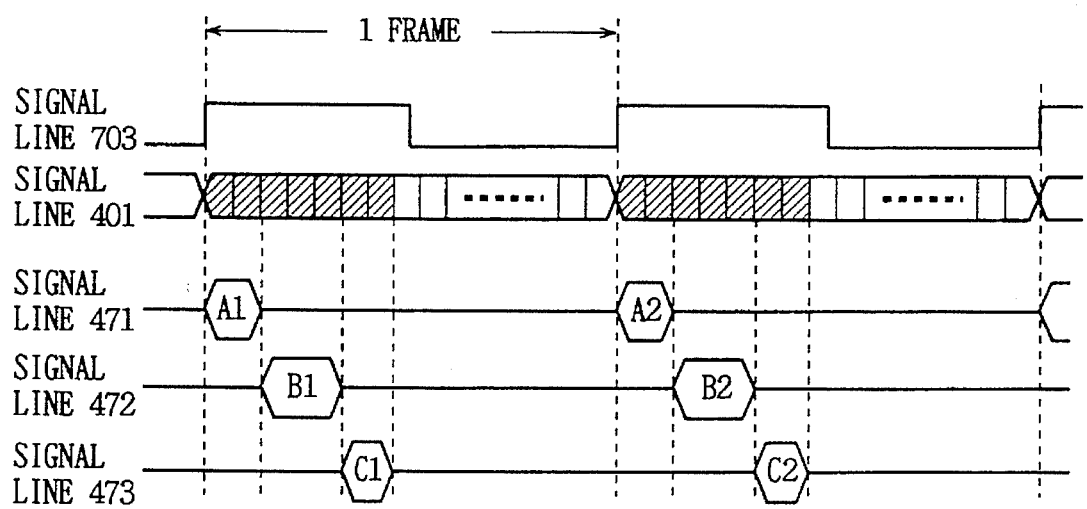
FIG. 47 is a timing chart for illustrating an operation of the device shown in FIG. 46.

FIG. 47 is a timing chart showing the operation of the fifteenth embodiment of the present invention. Referring to FIG. 47, the transfer speed for the frame type data, i.e., the speed of the clock signal CLK, is higher than the data transfer speed in the ATM transmission line 500. The operation of the fifteenth embodiment of the present invention is now described with reference to FIGS. 46 and 47.

The ATM layer transmission blocks 20-X9, 21-X9 and 22-X9 execute prescribed ATM layer processing in accordance with transmission requests from the applications (not shown), to generate data (ATM cells) to be transmitted. The ATM layer processing parts 780 of the ATM layer transmission blocks 20-X9, 21-X9 and 22-X9 generate the ATM cells for preparing for transmission, and the transmission speeds of the data which are supplied to the ATM layer processing parts 780 at this time are identical to the transfer speeds for the data from the corresponding applications. In synchronization with the frame synchronizing signal, the ATM layer transmission blocks 20-X9, 21-X9 and 22-X9 successively transmit the data in prescribed sections (activation periods) in the frame period respectively. It is assumed here that the data transfer speed of the ATM transmission line 500 is 50 Mbps when the frame speed (corresponding to the speed of the clock signal CLK) is set at 100 Mbps. In this case, the data are transferred from the applications at the speed corresponding to the transfer speed of the ATM transmission line 500 as shown in FIG. 47, so that the ATM layer processing parts 780 generate the ATM cell data at the same speed. Namely, the cells are generated at the speed of 50 Mbps. Therefore, unused regions are formed in one frame period. When the frame speed is 100 Mbps and the speed of the ATM transmission line 500 is 50 Mbps as described above, a half region of each frame is unused. Referring to FIG. 47, valid data are shown by slant lines among data appearing on the signal line 401. These valid regions (slant line regions) correspond to data A1, B1, C1, A2, B2 and C2 appearing on the signal lines 471, 472 and 473.

As hereinabove described, it is possible to cope with a plurality of types of physical layer transmission blocks by ATM layer transmission blocks of the same structure by equalizing the speed for transmitting frame data from the ATM layer transmission blocks to the physical layer transmission block with as high a speed as possible among a plurality of data transfer speeds available at the ATM transmission line, whereby the physical layer transmission block and the ATM layer transmission blocks can be selected independently of each other and the system design is simplified.

[Embodiment 16]

Figure 48:
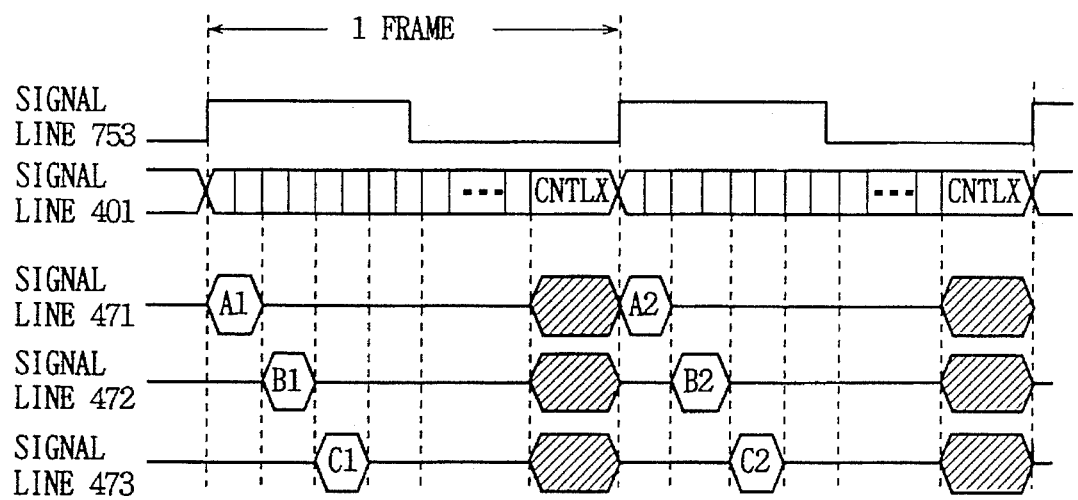
FIG. 48 is a timing chart for illustrating an operation of a protocol processor according to a sixteenth embodiment of the present invention.

FIG. 48 is a timing chart showing an operation of a transmission processing part of a protocol processor according to a sixteenth embodiment of the present invention. The structure of the transmission part of the protocol processor according to the sixteenth embodiment is similar to that shown in FIG. 46. ATM layer transmission blocks transfer frames (frame type data) to the physical layer transmission block, and the speeds of the frames are rendered higher than a data transfer speed of the ATM transmission line. In this case, a free area exists in every frame period, as shown in FIG. 48. Control information CNTLX which is utilized in the physical layer is inserted in the free area. As to the control information CNTLX, necessary control information may be transmitted from the ATM layer transmission blocks respectively through signal lines 471, 472 and 473 successively at prescribed timing, or control information from a control circuit (not shown) such as a control unit with an ATM layer control function, for example, may be included. The contents of such control information CNTLX are data indicating the ATM layer transmission block currently transmitting a valid ATM cell and the length of the valid ATM cells, a signal for bit synchronization, and the like.

[Modification]

Figure 49:
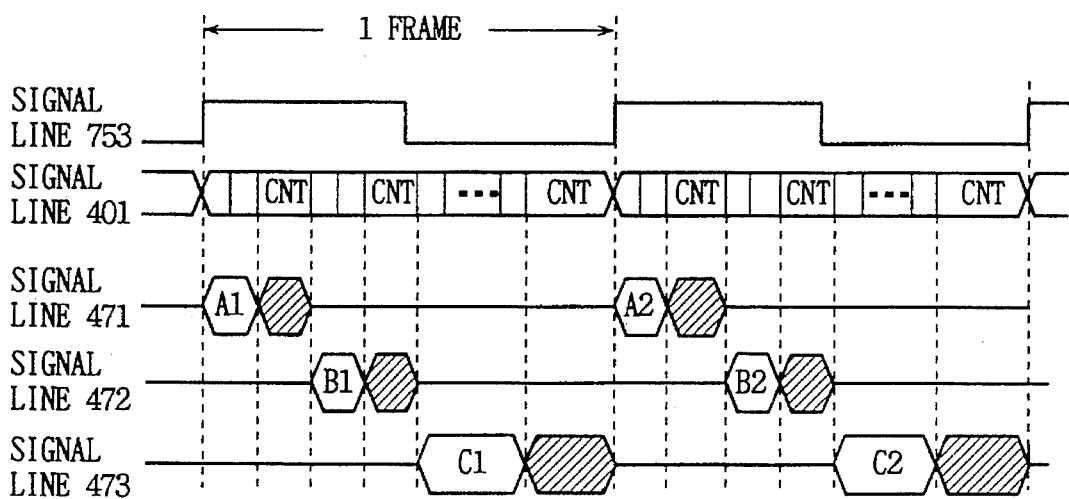
FIG. 49 is an illustration for describing an operation of a modification of the protocol processor according to the sixteenth embodiment of the present invention.
Figure 50:
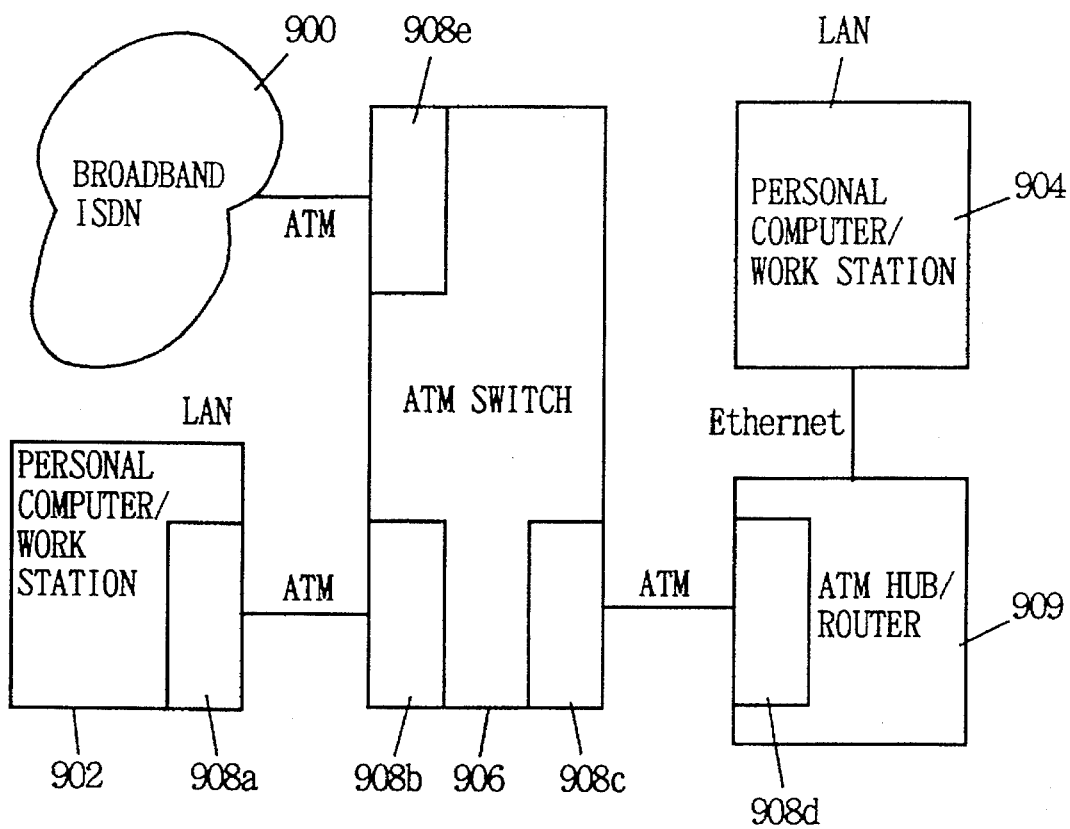
FIG. 50 illustrates an exemplary structure of a system for carrying out data communication in a general ATM mode.
Figure 51:
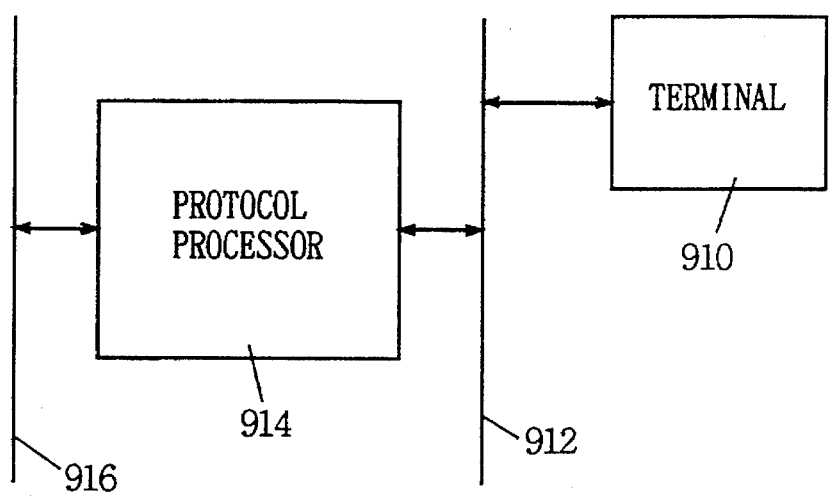
FIG. 51 schematically illustrates the structure of a user-network interface.

FIG. 49 is a timing chart showing an operation of a modification of the sixteenth embodiment of the present invention. In the structure of this modification, control information is transmitted following the transmission data from an ATM layer transmission block. Namely, control information is inserted following valid ATM cell data, then a valid ATM cell is transmitted from another ATM layer transmission block, and then control information (CNT) is transmitted. In the case of this structure, it is possible to transmit control information supplied from the respective ATM layer transmission blocks to the physical layer transmission block.

As hereinabove described, the control information is inserted in prescribed regions of frame type data and transmitted from the ATM layer transmission blocks to the physical layer transmission block, whereby no additional signal lines are required for transmitting the control information, and the layout of the device is simplified.

In each of the first to sixteenth embodiments, a single ATM layer transmission or receiving block may process either one or a plurality of types of cells.

According to the present invention, as hereinabove described, the physical layer processing (transmission or receiving) block and the ATM layer processing (transmission or receiving) blocks can be connected with each other by a general interface, whereby the device can be readily expanded even in increase of applications of the communication while a single physical layer processing block can cope with ATM layer processing blocks having different transfer speeds and transmission systems.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A protocol processor including a physical layer being coupled to a transmission line for carrying out prescribed processing on data for transmission to said transmission line and an ATM layer for carrying out prescribed processing on received data for transmission to said physical layer, and employed for a communication network in which data communication is carried out in an asynchronous transfer mode, said protocol processor comprising;

a plurality of ATM layer transmission means provided in correspondence to different applications respectively for carrying out preallocated ATM layer processing on received data, each of said plurality of ATM layer transmission means including output means for outputting processed data in activation thereof; and physical layer transmission means coupled to receive said output data from said plurality of ATM layer transmission means for carrying out physical layer processing on received data for transmission onto said transmission line.

2. The protocol processor in accordance with claim 1, wherein said physical layer transmission means includes activation means for successively activating said output means of said plurality of ATM layer transmission means.

3. The protocol processor in accordance with claim 2, wherein said activation means includes means for periodically activating said plurality of ATM layer transmission means for time periods predetermined for respective ones of said plurality of ATM layer transmission means.

4. The protocol processor in accordance with claim 3, wherein said time periods being predetermined for respective ones of said plurality of ATM layer transmission means are a same time duration common to all said plurality of ATM layer transmission means.

5. The protocol processor in accordance with claim 3, wherein at least two of said plurality of ATM layer transmission means have predetermined time periods different from each other for activation.

6. The protocol processor in accordance with claim 2, wherein said activation means includes for successively activating said plurality of ATM layer transmission means for time periods changed in accordance with control data indicating an occupation state of said transmission line included in the received data.

7. The protocol processor in accordance with claim 1, further comprising an annular transmission line for annularly connecting said plurality of ATM layer transmission means with each other and for transmitting data indicating transmission right, and wherein each of said plurality of ATM transmission means comprises:

input means for accepting said data indicating transmission right supplied through said annular transmission line, means for activating said output means in response to said data indicating transmission right from said input means, and means for transmitting said data indicating transmission right to a next-stage ATM layer transmission means through said annular transmission line after completion of data transmission by said output means.

8. The protocol processor in accordance with claim 1, further comprising timing signal generation means, and wherein said physical layer transmission means includes means for incorporating said received data in synchronization with a timing signal from said timing signal generation means, and each of said output means of said plurality of ATM layer transmission means includes means for transmitting said received data in synchronization with said timing signal.

9. The protocol processor in accordance with claim 8, wherein respective ones of said plurality of ATM layer transmission means include means for transmitting data to said physical layer transmission means at predetermined timings for predetermined periods in response to said timing signal, said predetermined timings being different for different ATM layer transmission means.

10. The protocol processor in accordance with claim 8, wherein said plurality of ATM layer transmission means are set at such a data transmission speed that one cycle period of said timing signal is filled up with the output data of said plurality of ATM layer transmission means.

11. The protocol processor in accordance with claim 8, wherein said plurality of ATM layer transmission means are set at such a data transmission speed that a free area exists in one cycle period of said timing signal.

12. The protocol processor in accordance with claim 8, wherein said physical layer transmission means includes means for accepting the received data in one cycle period of said timing signal as one frame.

13. The protocol processor in accordance with claim 11, wherein each of said plurality of ATM layer transmission means includes means for inserting control information utilized by said physical transmission means in said free area.

14. The protocol processor in accordance with claim 13, wherein said free area is provided in common to said plurality of ATM layer transmission means at an end portion of the one cycle period of said timing signal.

15. The protocol processor in accordance with claim 13, wherein said free area is provided for each respective ATM layer transmission means at a portion following the predetermined period of an associated ATM layer transmission means.

16. The protocol processor in accordance with claim 1, wherein respective ones of said plurality of ATM layer transmission means include means for transmitting transmission authorization request signals to said physical layer transmission means, and said physical layer transmission means includes authorization means for outputting a transmission authorization signal in accordance with a predetermined rule in response to said transmission authorization request signals from said plurality of ATM layer transmission means, and said output means of said plurality of ATM layer transmission means is activated in response to said transmission authorization signal from said physical layer transmission means.

17. The protocol processor in accordance with claim 16, wherein said authorization means includes means for outputting said transmission authorization signal to the ATM layer transmission means outputting said transmission authorization request signal the earliest when said transmission authorization request signals are supplied from a plurality of ATM layer transmission means.

18. The protocol processor in accordance with claim 16, wherein said plurality of ATM layer transmission means each are preallocated with priority levels dependent on each other, and wherein said physical layer transmission means includes means for outputting said transmission authorization signal to an ATM layer transmission means having the highest priority level in accordance with said priority levels when said transmission authorization request signal is supplied from a plurality of ATM layer transmission means.

19. The protocol processor in accordance with claim 1, further comprising, another ATM layer transmission means for carrying out prescribed processing on data received from a higher layer for transmission, and connecting means for coupling said another ATM layer transmission means and said physical layer transmission means for controlling data transmission of said another ATM layer transmission means to said physical layer transmission means.

20. The protocol processor in accordance with claim 19, wherein said physical layer transmission means includes means generating and supplying a transmission enable signal to said connecting means, and said connecting means includes enabling means responsive to said transmission enable signal for enabling data transmission of said another ATM layer transmission means, and means responsive to said transmission enable signal for receiving data from said another ATM layer transmission means for transmission to said physical layer transmission means.

21. The protocol processor in accordance with claim 19, wherein said additional ATM layer transmission means includes a plurality of ATM layer transmission blocks provided in parallel with each other, and said connecting means includes means for enabling data transmission of one of said plurality of ATM layer transmission blocks in accordance with a predetermined rule.

22. A protocol processor including a physical layer coupled to a transmission line for carrying out prescribed processing on data for transmission to said transmission line and an ATM layer for carrying out prescribed processing on data received from said physical layer for transmission to a higher layer, for a communication network in which data communication is carried out in an asynchronous transfer mode, said protocol processor comprising:

a physical layer receiving block coupled to said transmission line for carrying out processing of said physical layer on data transmitted through said transmission line; and a plurality of ATM layer receiving means provided in correspondence to different applications respectively and connected in parallel with each other for receiving output data from said physical layer receiving means, each of said plurality of ATM receiving means including processing means for executing predetermined ATM layer processing on said output data in activation thereof transmission to a corresponding higher layer.

23. The protocol processor in accordance with claim 22 wherein said output data of said physical layer receiving means include application specifying information specifying corresponding said application, and wherein each of said plurality of ATM layer receiving means includes:

holding means for holding identifying information identifying the application allocated thereto, and activation means for receiving said output data from said physical layer receiving means and comparing said application specifying information included in the output data with said identifying information held in said holding means for activating an associated processing means when the result of said comparison indicates coincidence.

24. The protocol processor in accordance with claim 22, further including timing signal generation means, and wherein said physical layer receiving means includes means for outputting said output data in synchronization with a timing signal generated from said timing signal generation means, and said plurality of ATM layer receiving means includes means for incorporating said output data from said physical layer receiving means in synchronization with said timing signal.

25. The protocol processor in accordance with claim 23, wherein said activation means includes means for activating a corresponding processing means for a prescribed period in response to said timing signal.

26. The protocol processor in accordance with claim 22, wherein said physical layer receiving means includes means for transmitting said output data to said plurality of ATM layer receiving means at a speed higher than that for receiving data transmitted through said transmission line.

27. The protocol processor in accordance with claim 22, wherein said physical layer receiving means includes means for inserting control information utilized by said plurality of ATM layer receiving means in one cycle period of said timing signal for transmission to said plurality of ATM layer receiving means.

28. The protocol processor in accordance with claim 24, wherein said physical layer receiving means includes means for successively supplying said output data to said plurality of ATM layer receiving means in response to said timing signal, and each of said plurality of ATM layer receiving means includes means for incorporating the data supplied in response to said timing signal for supplying to the corresponding processing means, respective ones of said plurality of ATM layer receiving means incorporating the supplied data at different timings.

29. The protocol processor in accordance with claim 24, wherein said physical layer receiving means includes means responsive to said timing signal for forming data subject to physical layer processing into a frame format data, a cycle time of one frame defined by said timing signal.

30. The protocol processor in accordance with claim 29, wherein each of said plurality of ATM layer receiving means includes enable means responsive to said timing signal for activating an associated processing means for a predetermined time period in one frame.

31. The protocol processor in accordance with claim 30, wherein said enabled means includes register means for storing data indicating a specific time period in one frame, and means responsive to said timing signal and said register means for activating an associated processing means for the specific time period.

32. A protocol processor including a physical layer coupled to a transmission line for carrying out prescribed processing on data for transmission to said transmission line and an ATM layer for carrying out prescribed processing on received data for transmission to said physical layer, a communication network in which data communication is effected in an asynchronous transfer mode, said protocol processor comprising;

a plurality of first ATM layer transmission means provided in correspondence to different applications respectively, for carrying out preallocated ATM layer processing on received data for outputting;

a plurality of second ATM layer transmission means provided in correspondence to different applications respectively, for carrying out preallocated ATM layer processing on received data for outputting;

control means connected to receive data transmitted from said plurality of second ATM layer transmission means; and physical layer transmission means coupled to receive data transmitted from said plurality of first ATM layer transmission means and said control means for carrying out physical layer processing on received data for transmission onto said transmission line, said physical layer transmission means including means for activating said plurality of first ATM layer transmission means and said control means in accordance with a predetermined rule, said control means including means for activating said plurality of second ATM layer transmission means in accordance with said predetermined rule when activated.

* * * * *